US006289375B1

United States Patent
Knight et al.

(10) Patent No.: US 6,289,375 B1
(45) Date of Patent: Sep. 11, 2001

(54) METHOD AND APPARATUS FOR INVOKING NETWORK AGENT FUNCTIONS USING A HASH TABLE

(75) Inventors: Greg Knight, Rochester, MN (US); Robert Bruce Nicholson, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/183,716

(22) Filed: Oct. 30, 1998

(51) Int. Cl.[7] .............................. G06F 15/16; G06F 13/14; G06F 17/30
(52) U.S. Cl. ...................... 709/217; 709/202; 709/219; 709/225; 709/229; 707/1; 707/10
(58) Field of Search .................................. 709/200–202, 709/217–219, 223–226, 229, 250; 707/1, 10, 100–101, 200, 203; 711/216–218, 220–221, 161–164

(56) References Cited

U.S. PATENT DOCUMENTS

| | | | |
|---|---|---|---|
| 5,371,499 | * 12/1994 | Graybill et al. | 341/51 |
| 5,542,087 | * 7/1996 | Neimat et al. | 707/10 |
| 5,634,009 | * 5/1997 | Iddon et al. | 709/223 |
| 5,694,615 | 12/1997 | Thapar et al. | 710/2 |
| 5,862,313 | 1/1999 | Johnson et al. | 714/6 |
| 5,867,668 | 2/1999 | Spirakis et al. | 709/234 |
| 5,897,637 | * 4/1999 | Guha | 707/101 |
| 5,926,463 | 7/1999 | Ahearn et al. | 370/254 |
| 5,933,603 | 8/1999 | Vahalia et al. | 709/225 |
| 5,933,604 | * 8/1999 | Inakoshi | 709/226 |
| 5,960,434 | * 9/1999 | Schimmel | 707/100 |
| 5,974,455 | * 10/1999 | Monier | 709/217 |
| 5,978,875 | 11/1999 | Asano et al. | 709/200 |
| 5,987,516 | 11/1999 | Rao et al. | 709/227 |
| 6,009,466 | 12/1999 | Axberg et al. | 709/220 |
| 6,047,323 | * 4/2000 | Krause | 709/227 |
| 6,067,093 | 5/2000 | Grau et al. | 345/440 |
| 6,157,955 | * 12/2000 | Narad et al. | 709/228 |

\* cited by examiner

*Primary Examiner*—Bharat Barot
(74) *Attorney, Agent, or Firm*—Roy W. Truelson

(57) ABSTRACT

An agent receives requests containing multiple parameters over an information processing network. The process of obtaining information responsive to the request varies depending on the values of the parameters. The agent constructs a hash key using the parameter values, and uses the hash key to index an entry in a hash function table, the entry having a set of parameter values and a pointer corresponding to the function used to service a request for the indicated parameter values. The agent uses the pointer to call the function to service the request Preferably, the parameters may include wild cards, which are expanded into multiple requests, from which multiple hash keys are derived and multiple functions are called. The agent is preferably part of a larger distributed storage management program, comprising a central manager and a separate agent in each of multiple host computer systems. Each agent independently collects data from the network(s) attached to its host, analyzes the network(s), builds data structures representing the network(s), and uses the data structures to service information requests from the central manager. The manager collates the data from different agents to produce a coherent view of the network.

15 Claims, 41 Drawing Sheets

|  | 903 | 904 | 905 | 901 906 |
|---|---|---|---|---|
| 902 → | TC_Undef | Host | 1 | 000048381C00 |
|  | TC_Undef | HostBus | 1 | 000048381C00627573300000 |
|  | TC_SSA | Adapter | 1 | 0000000629541E2C |
|  | TC_SSA | LogDisk | 1 | 3030334414335530444641313 |
|  | TC_SSA | PhyDisk | 1 | 000008005AEA3932 |
|  | TC_SSA | PhyDisk | 1 | 00000004AC50DFA1 |

FIG. 9A

|  | 913 | 914 | 915 | 916 | 911 917 |
|---|---|---|---|---|---|
| 912 → | TC_Undef | HostBus | 0 | 1 | No |
|  | TC_SSA | LogDisk | 0 | 0 | Yes |
|  | TC_SSA | DevBus | 0 | 2 | Yes |

FIG. 9B

| | 923 | 924 | 925 | 926 | 921 ↙ | 928 | 929 | |
|---|---|---|---|---|---|---|---|---|
| | TC_Udf | HBus | 1 | 0000048381C00 | | CDT_HstBusSlt# | | 2 |
| | TC_Ssa | LDisk | 1 | 303030344143353044446 | | CDT_None | | |
| 922 ↗ | TC_Ssa | DBus | 1 | 0000080005AEA3932 | | CDT_SSAUID | | 00006295553798 |

| Header Block | 1201 |

| Adapter Information | 1202 |

| SSANodes Information
(For Device & Topology Info, Etc.) | 1203 |

| UID Hash Table Information
(For Rapid Random Device Access) | 1204 |

| String Number UIDs
(For Device String Relationships) | 1205 |

FIG. 12A

1220 

| Adapter Name | | 1221 | |
|---|---|---|---|
| Adapter UID | | 1222 | |
| Adapter Serial Number | | 1223 | |
| 1224 Smart Adapter Flag | | 1225 Adapter Node Number | |
| Bus Number 1226 | | Slot Number 1227 | |
| Daughter Number 1228 | | Partner Number 1229 | |
| 1230 SIC A SSANodes Ptr | | SIC B SSANodes Ptr | |
| 1231 Port1 Len | 1232 Port2 Len | Port1 Len | Port2 Len |
| 1233 ChangeCount | 1234 Topology Ver | ChangeCount | Topology Ver |
| 1235 Logical Ver | 1236 Error Ver | Logical Ver | Error Ver |
| 1237 Need Rescan | 1238 Loop Flag | Need Rescan | Loop Flag |
| 1239 Using List | 1240 PosUncertain | Using List | PosUncertain |

FIG. 12B

| | | | |
|---|---|---|---|
| Previous Hash Entry 1251 | | Next Hash Entry 1252 | |
| Device UID 1253 | | | |
| Device Type 1254 | | UID Is Valid Flag 1255 | |
| String Number 1256 | | Next Free Entry 1257 | |
| This Adapter Number 1258 | | This Network Index 1259 | |
| In Use Flag 1260 | | Port Uncertain Flag 1261 | |
| Reserved (for DSI Enabled) 1262 | | Total Ports Number 1263 | |
| Error Event Time 1264 | | Map Position Uncertain 1265 | |
| Map X Coord 1266 | | Map Y Coord 1267 | |
| Screen Map X Coord 1268 | | Screen Map Y Coord 1269 | |
| Port1 Next Device Index 1270 | | Port2 Next Device Index 1271 | |
| Port1 Next Device Port 1272 | | Port2 Next Device Port 1273 | |

FIG. 12C

| 2001 | 2002 | 2003 | 2004 | 2010 | 2011 | 2012 | 2013 | 2014 | 2015 | 2016 |
|---|---|---|---|---|---|---|---|---|---|---|
| DL | UDL | LPC | BL | Host | Adtr | Disk | DBus | HBus | Ukn | Connect |
| H111<br>H112<br>H113 | H111<br>H112<br>H113 | | | H111<br>H112<br>H113 | | | | | | |

FIG. 20A

| DL | UDL | LPC | BL | Host | Adtr | Disk | DBus | HBus | Ukn | Connect |
|---|---|---|---|---|---|---|---|---|---|---|
| H111<br>H112<br>H113<br>B111 | H112<br>H113<br>B111 | B111 | | H111<br>H112<br>H113 | | | | B111 | | |

FIG. 20B

| DL | UDL | LPC | BL | Host | Adtr | Disk | DBus | HBus | Ukn | Connect |
|---|---|---|---|---|---|---|---|---|---|---|
| H111<br>H112<br>H113<br>B111<br>B112<br>B113 | B111<br>B112<br>B113 | B113 | | H111<br>H112<br>H113 | | | | B111<br>B112<br>B113 | | |

FIG. 20C

| DL | UDL | LPC | BL | Host | Adtr | Disk | DBus | HBus | Ukn | Connect |
|---|---|---|---|---|---|---|---|---|---|---|
| H111 | B112 | H111 |  | H111 | C130 |  |  | B111 |  |  |
| H112 | B113 | C130 |  | H112 | C131 |  |  | B112 |  |  |
| H113 | C130 | C131 |  | H113 |  |  |  | B113 |  |  |
| B111 | C131 |  |  |  |  |  |  |  |  |  |
| B112 |  |  |  |  |  |  |  |  |  |  |
| B113 |  |  |  |  |  |  |  |  |  |  |
| C130 |  |  |  |  |  |  |  |  |  |  |
| C131 |  |  |  |  |  |  |  |  |  |  |

FIG. 20D

| DL | UDL | LPC | BL | Host | Adtr | Disk | DBus | HBus | Ukn | Connect |
|---|---|---|---|---|---|---|---|---|---|---|
| H111 | C130 | H113 |  | H111 | C130 |  |  | B111 |  |  |
| H112 | C131 | C133 |  | H112 | C131 |  |  | B112 |  |  |
| H113 | C132 |  |  | H113 | C132 |  |  | B113 |  |  |
| B111 | C133 |  |  |  | C133 |  |  |  |  |  |
| B112 |  |  |  |  |  |  |  |  |  |  |
| B113 |  |  |  |  |  |  |  |  |  |  |
| C130 |  |  |  |  |  |  |  |  |  |  |
| C131 |  |  |  |  |  |  |  |  |  |  |
| C132 |  |  |  |  |  |  |  |  |  |  |
| C133 |  |  |  |  |  |  |  |  |  |  |

FIG. 20E

| DL | UDL | LPC | BL | Host | Adtr | Disk | DBus | HBus | Ukn | Connect |
|---|---|---|---|---|---|---|---|---|---|---|
| H111<br>H112<br>H113<br>B111<br>B112<br>B113<br>C130<br>C131<br>C132<br>C133<br>L120 | C131<br>C132<br>C133<br>L120 | B111<br>L120 | | H111<br>H112<br>H113 | C130<br>C131<br>C132<br>C133 | | L120 | B111<br>B112<br>B113 | | |

FIG. 20F

| DL | UDL | LPC | BL | Host | Adtr | Disk | DBus | HBus | Ukn | Connect |
|---|---|---|---|---|---|---|---|---|---|---|
| H111 | C132 | B111 | | H111 | C130 | D120 | L120 | B111 | U1a | C131-C130 |
| H112 | C133 | L120 | | H112 | C131 | D121 | | B112 | U1b | C130-D120 |
| H113 | L120 | | | H113 | C132 | D122 | | B113 | | D120-D121 |
| B111 | D120 | | | | C133 | D123 | | | | D121-D122 |
| B112 | D121 | | | | | D124 | | | | D122-D123 |
| B113 | D122 | | | | | D125 | | | | D123-D124 |
| C130 | D123 | | | | | D126 | | | | D129-D128 |
| C131 | D124 | | | | | D127 | | | | D128-D127 |
| C132 | U1a | | | | | D128 | | | | D127-D126 |
| C133 | U1b | | | | | D129 | | | | D126-D125 |
| L120 | D125 | | | | | | | | | D125-C131 |
| D120 | D126 | | | | | | | | | |
| D121 | D127 | | | | | | | | | |
| D122 | D128 | | | | | | | | | |
| D123 | D129 | | | | | | | | | |
| D124 | | | | | | | | | | |
| U1a | | | | | | | | | | |
| U1b | | | | | | | | | | |
| D125 | | | | | | | | | | |
| D126 | | | | | | | | | | |
| D127 | | | | | | | | | | |
| D128 | | | | | | | | | | |
| D129 | | | | | | | | | | |

FIG. 20G

| DL | UDL | LPC | BL | Host | Adtr | Disk | DBus | HBus | Ukn | Connect |
|---|---|---|---|---|---|---|---|---|---|---|
| H111 | L120 | B113 | | H111 | C130 | D120 | L120 | B111 | U1a | C131-C130 |
| H112 | D120 | L120 | | H112 | C131 | D121 | | B112 | U1b | C130-D120 |
| H113 | D121 | | | H113 | C132 | D122 | | B113 | U2a | D120-D121 |
| B111 | D122 | | | | C133 | D123 | | | U2b | D121-D122 |
| B112 | D123 | | | | | D124 | | | U2c | D122-D123 |
| B113 | D124 | | | | | D125 | | | U3a | D123-D124 |
| C130 | U1a | | | | | D126 | | | U3b | D129-D128 |
| C131 | U1b | | | | | D127 | | | U3c | D128-D127 |
| C132 | D125 | | | | | D128 | | | | D127-D126 |
| C133 | D126 | | | | | D129 | | | | D126-D125 |
| L120 | D127 | | | | | | | | | D125-C131 |
| D120 | D128 | | | | | | | | | C132-D124 |
| D121 | D129 | | | | | | | | | C133-D129 |
| D122 | U2a | | | | | | | | | |
| D123 | U2b | | | | | | | | | |
| D124 | U2c | | | | | | | | | |
| U1a | U3a | | | | | | | | | |
| U1b | U3b | | | | | | | | | |
| D125 | U3c | | | | | | | | | |
| D126 | | | | | | | | | | |
| D127 | | | | | | | | | | |
| D128 | | | | | | | | | | |
| D129 | | | | | | | | | | |
| U2a | | | | | | | | | | |
| U2b | | | | | | | | | | |
| U2c | | | | | | | | | | |
| U3a | | | | | | | | | | |
| U3b | | | | | | | | | | |
| U3c | | | | | | | | | | |

FIG. 20H

| DL | UDL | LPC | BL | Host | Adtr | Disk | DBus | HBus | Ukn | Connect |
|---|---|---|---|---|---|---|---|---|---|---|
| H111 | D120 | C130 |  | H111 | C130 | D120 | L120 | B111 | U1a | C131-C130 |
| H112 | D121 | C131 |  | H112 | C131 | D121 |  | B112 | U1b | C130-D120 |
| H113 | D122 | D120 |  | H113 | C132 | D122 |  | B113 | U2a | D120-D121 |
| B111 | D123 | D121 |  |  | C133 | D123 |  |  | U2b | D121-D122 |
| B112 | D124 | D122 |  |  |  | D124 |  |  | U2c | D122-D123 |
| B113 | U1a | D123 |  |  |  | D125 |  |  | U3a | D123-D124 |
| C130 | U1b | D124 |  |  |  | D126 |  |  | U3b | D129-D128 |
| C131 | D125 | U1a |  |  |  | D127 |  |  | U3c | D128-D127 |
| C132 | D126 | U1b |  |  |  | D128 |  |  |  | D127-D126 |
| C133 | D127 | D125 |  |  |  | D129 |  |  |  | D126-D125 |
| L120 | D128 | D126 |  |  |  |  |  |  |  | D125-C131 |
| D120 | D129 | D127 |  |  |  |  |  |  |  | C132-D124 |
| D121 | U2a | D128 |  |  |  |  |  |  |  | C133-D129 |
| D122 | U2b | D129 |  |  |  |  |  |  |  |  |
| D123 | U2c |  |  |  |  |  |  |  |  |  |
| D124 | U3a |  |  |  |  |  |  |  |  |  |
| U1a | U3b |  |  |  |  |  |  |  |  |  |
| U1b | U3c |  |  |  |  |  |  |  |  |  |
| D125 |  |  |  |  |  |  |  |  |  |  |
| D126 |  |  |  |  |  |  |  |  |  |  |
| D127 |  |  |  |  |  |  |  |  |  |  |
| D128 |  |  |  |  |  |  |  |  |  |  |
| D129 |  |  |  |  |  |  |  |  |  |  |
| U2a |  |  |  |  |  |  |  |  |  |  |
| U2b |  |  |  |  |  |  |  |  |  |  |
| U2c |  |  |  |  |  |  |  |  |  |  |
| U3a |  |  |  |  |  |  |  |  |  |  |
| U3b |  |  |  |  |  |  |  |  |  |  |
| U3c |  |  |  |  |  |  |  |  |  |  |

FIG. 20I

| DL | UDL | LPC | BL | Host | Adtr | Disk | DBus | HBus | Ukn | Connect |
|---|---|---|---|---|---|---|---|---|---|---|
| H111 | | | | H111 | C130 | D120 | L120 | B111 | U1a | C131-C130 |
| H112 | | | | H112 | C131 | D121 | | B112 | U1b | C130-D120 |
| H113 | | | | H113 | C132 | D122 | | B113 | U2a | D120-D121 |
| B111 | | | | | C133 | D123 | | | U2b | D121-D122 |
| B112 | | | | | | D124 | | | U2c | D122-D123 |
| B113 | | | | | | D125 | | | U3a | D123-D124 |
| C130 | | | | | | D126 | | | U3b | D129-D128 |
| C131 | | | | | | D127 | | | U3c | D128-D127 |
| C132 | | | | | | D128 | | | | D127-D126 |
| C133 | | | | | | D129 | | | | D126-D125 |
| L120 | | | | | | | | | | D125-C131 |
| D120 | | | | | | | | | | C132-D124 |
| D121 | | | | | | | | | | C133-D129 |
| D122 | | | | | | | | | | |
| D123 | | | | | | | | | | |
| D124 | | | | | | | | | | |
| U1a | | | | | | | | | | |
| U1b | | | | | | | | | | |
| D125 | | | | | | | | | | |
| D126 | | | | | | | | | | |
| D127 | | | | | | | | | | |
| D128 | | | | | | | | | | |
| D129 | | | | | | | | | | |
| U2a | | | | | | | | | | |
| U2b | | | | | | | | | | |
| U2c | | | | | | | | | | |
| U3a | | | | | | | | | | |
| U3b | | | | | | | | | | |
| U3c | | | | | | | | | | |

FIG. 20J

| DL | UDL | LPC | BL | Host | Adtr | Disk | DBus | HBus | Ukn | Connect |
|---|---|---|---|---|---|---|---|---|---|---|
| H111 | | | | H111 | C130 | D120 | L120 | B111 | | C131-C130 |
| H112 | | | | H112 | C131 | D121 | | B112 | | C130-D120 |
| H113 | | | | H113 | C132 | D122 | | B113 | | D120-D121 |
| B111 | | | | | C133 | D123 | | | | D121-D122 |
| B112 | | | | | | D124 | | | | D122-D123 |
| B113 | | | | | | D125 | | | | D123-D124 |
| C130 | | | | | | D126 | | | | D129-D128 |
| C131 | | | | | | D127 | | | | D128-D127 |
| C132 | | | | | | D128 | | | | D127-D126 |
| C133 | | | | | | D129 | | | | D126-D125 |
| L120 | | | | | | | | | | D125-C131 |
| D120 | | | | | | | | | | C132-D124 |
| D121 | | | | | | | | | | C133-D129 |
| D122 | | | | | | | | | | C132-C133 |
| D123 | | | | | | | | | | |
| D124 | | | | | | | | | | |
| D125 | | | | | | | | | | |
| D126 | | | | | | | | | | |
| D127 | | | | | | | | | | |
| D128 | | | | | | | | | | |
| D129 | | | | | | | | | | |

FIG. 20K $2101 \begin{cases} C130-D120-D121-D122-D123-D124-U1a-U1b-D129-D128-D127- \\ D126-D125-C131 \end{cases}$ $2102 \begin{cases} C130-C131-D125-D126-D127-D128-D129-U1b-U1a-D124-D123- \\ D122-D121-D120 \end{cases}$ $2103 \begin{cases} C131-C130-D120-D121-D122-D123-D124-U1a-U1b-D129-D128- \\ D127-D126-D125 \end{cases}$ $2104 \begin{cases} C131-D125-D126-D127-D128-D129-U1b-U1a-D124-D123-D122- \\ D121-D120-C130 \end{cases}$ $2105 \begin{cases} C132-D124-D123-D122-D121-D120-U2a-U2b-D125-D126-D127- \\ D128-D129-U2c \end{cases}$ $2106 \begin{cases} C132-U2c-D129-D128-D127-D126-D125-U2b-U2a-D120-D121- \\ D122-D123-D124 \end{cases}$ $2107 \begin{cases} C133-U3a-D124-D123-D122-D121-D120-U3b-U3c-D125-D126- \\ D127-D128-D129 \end{cases}$ $2108 \begin{cases} C133-D129-D128-D127-D126-D125-U3c-U3b-D120-D121-D122- \\ D123-D124-U3a \end{cases}$

FIG. 21A

2111 { U1a-U1b-D129-D128-D127-D126-D125-UIC1311-UIC1301-D120-
D121-D122-D123-D124

2112 { U1b-D129-D128-D127-D126-D125-UIC1311-UIC1301-D120-D121-
D122-D123-D124-U1a

2113 { U1b-U1a-D124-D123-D122-D121-D120-UIC1301-UIC1311-D125-
D126-D127-D128-D129

2114 { U1a-D124-D123-D122-D121-D120-UIC1301-UIC1311-D125-D126-
D127-D128-U1b

METHOD AND APPARATUS FOR INVOKING NETWORK AGENT FUNCTIONS USING A HASH TABLE

RELATED APPLICATIONS

The present application is related to commonly assigned application Ser. No. 08/962,201, filed Oct. 31, 1997, by Gary T. Axberg et al., entitled "Storage Network Management Mechanism", now U.S. Pat. No. 6,009,466 which is herein incorporated by reference.

The present application is also related to the following commonly assigned co-pending applications:

Ser. No. 09/183,647, filed Oct. 30, 1998, by Gary T. Axberg, et al., entitled "Storage Network Management Mechanism", still pending which is herein incorporated by reference.

Ser. No. 09/183,711, filed Oct. 30, 1998, by Greg Knight et al., entitled "Storage Network Analyzer", still pending which is herein incorporated by reference.

FIELD OF THE INVENTION

The present invention relates generally to digital data processing, and more particularly to the management of networks of digital data storage devices.

BACKGROUND OF THE INVENTION

Modern computer systems have driven a demand for enormous amounts of data storage. Data traditionally has been stored in one or more mass data storage devices, such as rotating magnetic disk drives or tape drives, attached to a single computer system. As computer systems have become larger, faster, and more reliable, there has been a corresponding increase in need for storage capacity, speed and reliability of the storage devices. Increases in the data storage capacity and reliability of storage devices have been dramatic in recent years. But with all the improvements to the devices themselves, there are certain limitations to what can be accomplished. Additional configurations of storage devices have increasingly been offered in recent years to meet demand for larger capacity, faster, more reliable, and more accessible data storage.

One example of alternative configurations is the rapidly increasing popularity of so-called "RAIDs", i.e., redundant arrays of independent disks. A RAID stores data on multiple storage devices in a redundant fashion, such that data can be recovered in the event of failure of any one of the storage devices in the redundant array. RAIDs are usually constructed with rotating magnetic hard disk drive storage devices, but may be constructed with other types of storage devices, such as optical disk drives, magnetic tape drives, floppy disk drives, etc. Various types of RAIDs providing different forms of redundancy are described in a paper entitled "A Case for Redundant Arrays of Inexpensive Disks (RAID)", by Patterson, Gibson and Katz, presented at the ACM SIGMOD Conference, June, 1988. Patterson, et al., classify five types of RAIDs designated levels 1 through 5. The Patterson nomenclature has become standard in the industry.

Another example of a storage alternative is the concept of a storage subsysteim A storage subsystem implies a greater degree of independence from a host computer system than is typically found in an isolated storage device. For example, the subsystem may be packaged in a separate cabinet, with its own power supply, control software, diagnostics, etc. The subsystem may have a single storage device, but more typically contains multiple storage devices. The notion of a storage subsystem and a RAID are not necessarily mutually exchlsive; in fact many RAIDs are constructed as semi-independent storage subsystems, which communicate with a host through a communication link having a defined protocol. It is possible in such subsystems that the host is not even aware of the existence of multiple data storage units or data redundancy in the storage subsystem. To the host, the subsystem may appear to be a single very large storage device.

A configuration of multiple storage devices need not be attached to only a single host computer system. It might be that multiple computer systems are configured to share multiple storage devices. Thus, configurations of storage devices can be generalized to the concept of a storage network.

As used herein, a storage network is a configuration of multiple data storage devices, connected to one or more host computer systems, such that there is a communication path from each storage device to each host system which does not cross the system bus of another host system Because there exists a direct communication path from each system to each storage device, data on any device is readily accessible to any of the systems. Storage devices in a storage network are not necessarily identified with or controlled by a host This latter feature distinguishes a storage network from a simple network of computer systems, each having its own local storage devices. Thus, in certain computing environments, a storage network facilitates sharing of data and improved performance over a conventional network of host systems.

While it is theoretically possible to construct and maintain complex storage networks shared among multiple host computer systems using prior art hardware, in reality this is an error-prone and difficult task. Documentation and software support may be primitive or non-existent. A user must determine how to operate, configure and attach devices, and may have to write his own custom software routines to provide proper support for the network. Optimum physical configurations may depend on logical configurations and modes of operation, such as one or more RAID levels. There may be numerous hardware dependencies and limitations, such as number and type of devices that may communicate with a single I/O controller or adapter. Data may have to be collected from multiple sources and analyzed to provide needed information. All these requirements place substantial demands on the time, expertise and other resources of the user.

It would be desirable to support the construction and maintenance of storage networks with software which assists the user.

SUMMARY OF THE INVENTION

It is therefore an object of the present invention to provide enhanced data processing capability.

Another object of this invention is to provide enhanced support for calls to a server from an information processing network.

Another object of this invention is to provide enhanced support for distributed programs.

Another object of this invention is to enhance the capability to monitor devices using a distributed monitoring program.

Another object of this invention is to provide enhanced support for storage networks attached to multiple host computer systems.

An agent receives requests over an information processing network. Each request contains a plurality of parameters. The process of responding to the request varies depending on the values of the parameters. The agent includes a plurality of functions used to respond, each function being used for one or more sets of parameter values. Upon receipt of a request, the agent constructs a hash key using the parameter values, and uses the hash key to index an entry in a hash function table. The hash function table contains a plurality of entries, each entry having a set of parameter values and a pointer corresponding to the function used to service an information request for the indicated parameter values. Upon locating the appropriate entry, the pointer is used to call the function to service the request.

Preferably, requests may include wild card parameters. The agent refers to a wild card table to expand a wild card parameter into multiple parameter values which the wild card may assume. These parameter values are then used to construct a set of expanded requests, each request of the set corresponding to one of the parameter values. The set of expanded requests are then used to generate a corresponding set of hash keys, and the appropriate function is called for each respective expanded request.

In the preferred embodiment, the agent (also called a local agent) is part of a larger distributed storage management program which supports management of storage networks connected to multiple host computer systems through one or more controllers in each respective host. The distributed storage management program comprises a central manager portion and a separate agent in each of the host computer systems. The agents gather data and communicate with the manager across the information processing network, which is a communications path independent of the storage network. The manager collates the data from different agents to produce a coherent view of the network.

In accordance with the preferred embodiment, requests are generally for information concerning storage networks attached to a local host computer system. Each local agent independently collects data from the storage network(s) attached to the respective host in which the agent is located. Thus the view of the network obtained by any particular local agent is the view of its host. The agent operates as a server, responding to data requests from the central manager. The local agent is not a mere passive entity responding only to data requests, but actively builds an internal topological view of the network as seen by its host and collects data such as error events. This view is stored in a complex series of data structures which permit rapid access to individual device data, as well as to topological data, for use in responding to a variety of information requests from the central manager. The local agent also includes unknown device resolution capability to resolve the identities of certain devices connected to the network by analyzing information received from multiple controllers.

In the preferred embodiment, the storage network is a network of storage devices and host adapter devices connected by a communications medium employing the IBM Serial Storage Architecture (SSA) communications protocol. This protocol is designed to efficiently support transmission of data between multiple hosts and storage devices in a storage network, but does not easily support communication of data at a higher programning level. Specifically, it does not readily support typical client-server communication, such as remote procedure calls. The hosts are connected to each other (and optionally to a separate computer system which executes the manager) via a second network, designated the information processing (IP) network. The IP network typically operates in accordance with a TCP/IP. The IP network is designed to readily support client-server communication. Therefore, the IP network supports communication among manager and agents.

The agent described herein provides a rapid and easily maintainable mechanism for servicing heterogeneous information requests.

The details of the present invention, both as to its structure and operation, can best be understood in reference to the accompanying drawings, in which like reference numerals refer to like parts, and in which:

BRIEF DESCRIPTION OF THE DRAWING

FIGS. 9A through 9E show the major data structures used to communicate information from a local agent to a central manager, according to the preferred embodiment.

FIGS. 12A through 12C illustrate the major data structures held in shared memory 1003 of a local agent, in accordance with the preferred embodiment.

FIGS. 20A through 20K illustate the collection of found object lists at various stages of a discovery operation for an example configuration, according to the preferred embodiment.

FIGS. 21A through 21C illustrate the strings and substrings created during the process of resolving unknown network devices for an example configuration, according to the preferred embodiment

DETAILED DESCRIPTION OF THE PREFERRED EMBODIMENT

I. Architectural Overview

A distributed storage network management program manages a network of storage devices, which may be attached to multiple host computer systems. As a preliminary matter, it is necessary to understand the essential elements of a configured storage network in accordance with the preferred embodiment.

The storage management program of the preferred embodiment is occasionally referred to herein as "StoX". One or more versions of a program product having that name are being or are expected to be marketed by International Business Machines Corporation. While it is expected that all such versions will have similar overall structure and purpose, no statement is made that each and every detail described herein is consistent with each and every publicly released version of StorX, or with any publicly released version of StorX.

The Storage Network Concept

As explained above, a storage network as used herein is an interconnected group of storage devices and controllers. It is possible for a host to communicate with any storage device in a storage network to which the host is connected, without crossing another host's backplane bus (although the communication may go through hardware devices, such as storage adapters, associated with other host systems). Because the backplane bus of other hosts need not be crossed, it is possible to efficiently and rapidly transmit data through one or more controllers in other host systems to a remote destination. Controller-to-controller communication takes place via the storage interface itself.

Figure 1:
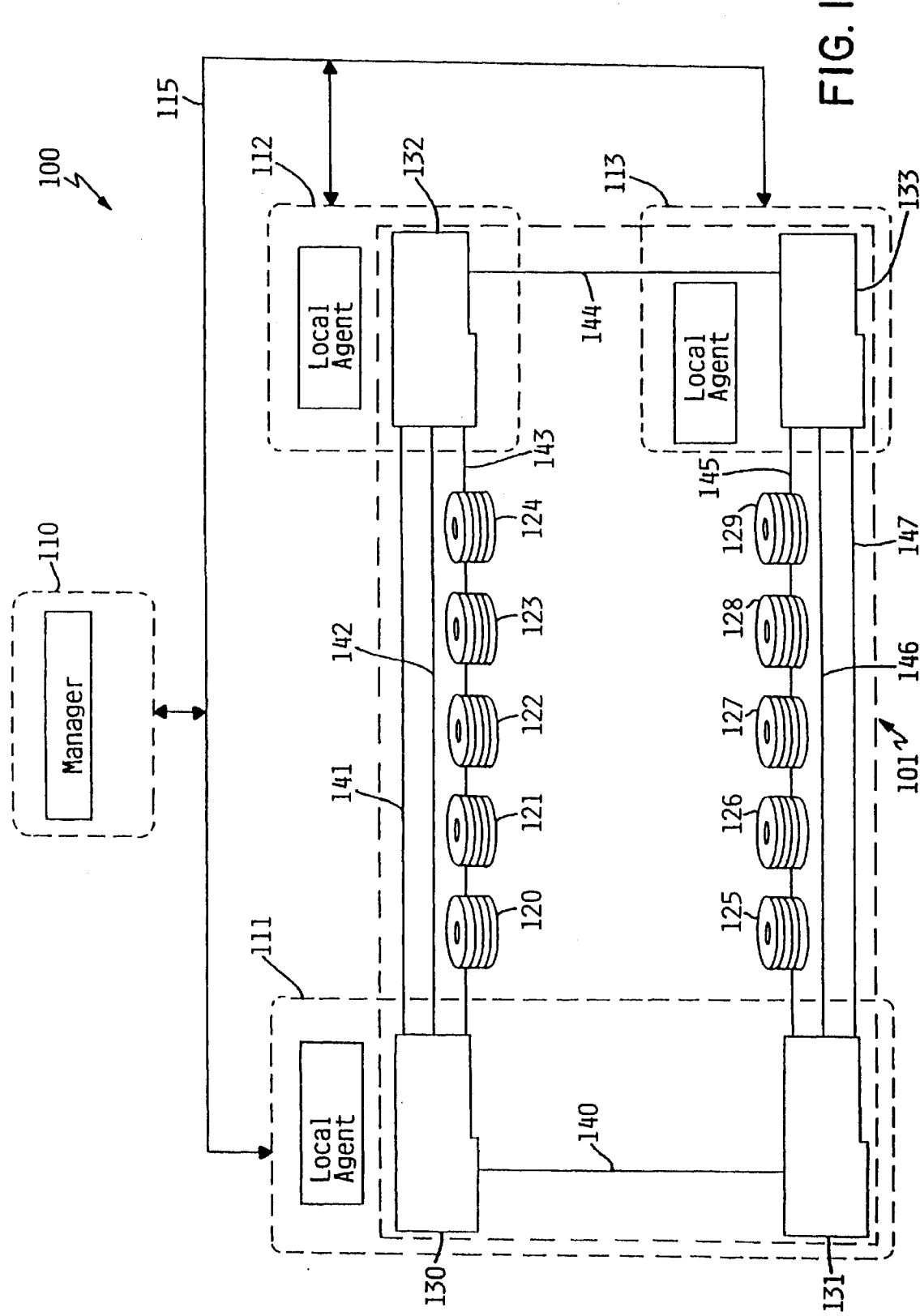
FIG. 1 is a high level diagram of an interconnected network of computer systems utilizing a storage network, in accordance with the preferred embodiment of the present invention.

FIG. 1 shows an illustrative example of one possible configuration of storage network, in accordance with the preferred embodiment. Host systems 111–113 store data in storage network 101. Storage network 101 comprises storage devices 120–129, which are coupled to network storage controllers 130–133 via communications links 140–147, as shown. Each host system 111–113 connected directly to storage network 101 contains at least one respective storage controller, host system 111 contains two network storage controllers 130,131.

Figure 2A:
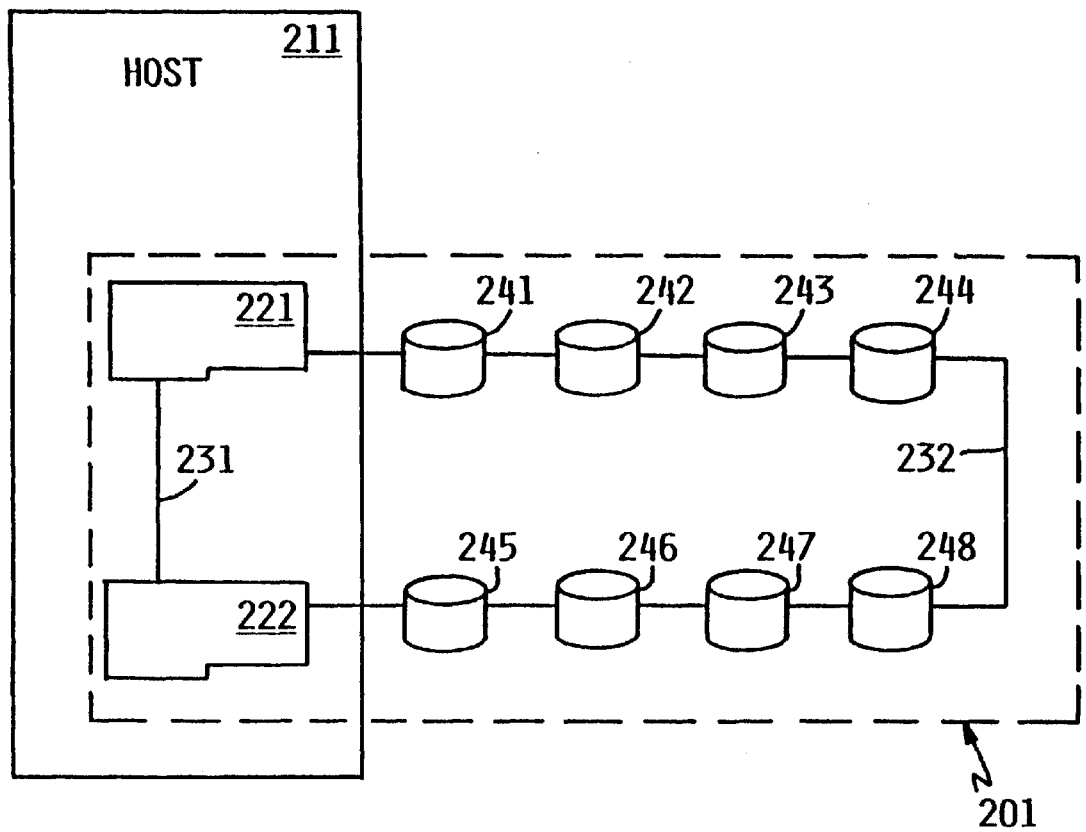
FIG. 2 is a high level diagram of an alternative example of a storage network configuration, wherein multiple storage networks serve multiple host computer systems, according to an alternative embodiment.
Figure 2B:
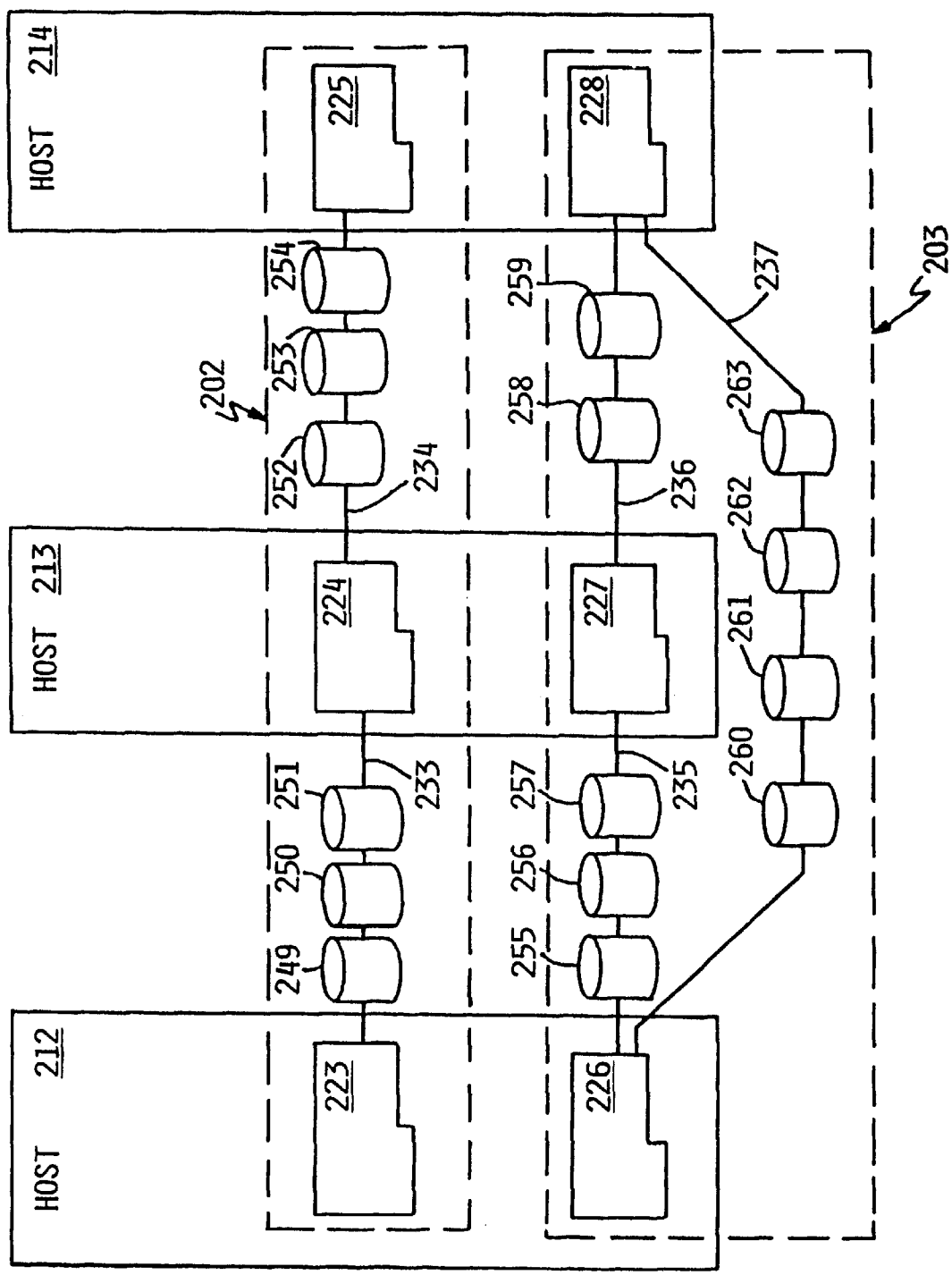

Storage network 101 is merely an illustrative example of one possible configuration of storage network. FIGS. 2A, and 2B illustrate at a high level various alternative configuration examples of storage networks.

FIG. 2A illustrates the case where a single storage network 201 is connected to a single host computer system 211. Storage network 201 comprises storage controllers 221,222, which communicate via links 231,232 with storage devices 241–248. FIG. 2B illustrates a firther alternative storage network configuration, in which multiple storage networks 202,203 are connected to multiple host computer systems 212–214. Storage network 202 comprises storage controllers 223–225, which communicate via links 233–234 with storage devices 249–254. Storage network 203 comprises storage controllers 226–228, which communicate via link 235–237 with storage devices 255–263. It will be observed that storage network 203 is connected in a loop, which provides redundancy in case any single communications link fails, while storage network 202 is configured in a non-redundant fashion.

It will be understood that the storage network configurations shown in FIGS. 1, 2A and 2B are merely illustrative of a few different types of configurations, and are not intended as an exhaustive compilation of the different configurations possible. The number of host systems, I/O controllers, buses, and storage devices may vary considerably. Devices may be connected in redundant or non-redundant fashion. Controllers and buses may support connections to other devices. Typical storage network configurations are in fact much larger, but a relatively small number of devices is used for ease of illustration and understanding.

While all three of the storage networks shown in FIGS. 1, 2A and 2B can be monitored and managed using the storage management program described herein, certain features of the program described as the preferred embodiment are particularly designed to accommodate large, multi-host storage networks. For example, a distributed storage management program is usefull for managing a multi-host network, for reasons explained herein. But the single-host network of FIG. 2A could be managed by a storage management program residing entirely within the single host system.

The Manager/Agent Architecture

In accordance with the preferred embodiment, the functions of a storage network management program are divided between a central manager and a plurality of local agents. FIG. 1 illustrates at a high level a typical interconnected network of computer systems (information processing network) utilizing a storage network, in accordance with the preferred embodiment of the present invention. Information processing network 100 comprises host computer systems 110–113, which communicate with each other via information processing network communication medium 115. The network communication medium 115 is preferably a wired local area network (LAN) such as an Ethernet LAN or IBM Token Ring LAN, it being understood that communications media of other types and protocols could be used. Data is stored in multiple storage devices 120–129 in storage network 101. Host system 110 is not directly connected to storage network 101 in this example. Host system 110 performs the function of managing storage network 101.

Typically, storage devices 120–129,241–263, are rotating magnetic hard disk drive storage devices, sometimes also called "direct access storage devices", or DASD. However, storage devices 120–129, 241–263 could be other types of mass data storage devices, such as magnetic tape, optical disk, floppy disk, etc. Additionally, within any single network the storage devices may be a heterogeneous collection of storage devices of differing types, capacities, and other characteristics. Similarly, controllers 130–133, 221–228, communication links 140–147, 231–237 and hosts 110–113, 211–214 may be of the same type, or may be of mixed characteristics.

Figure 3:
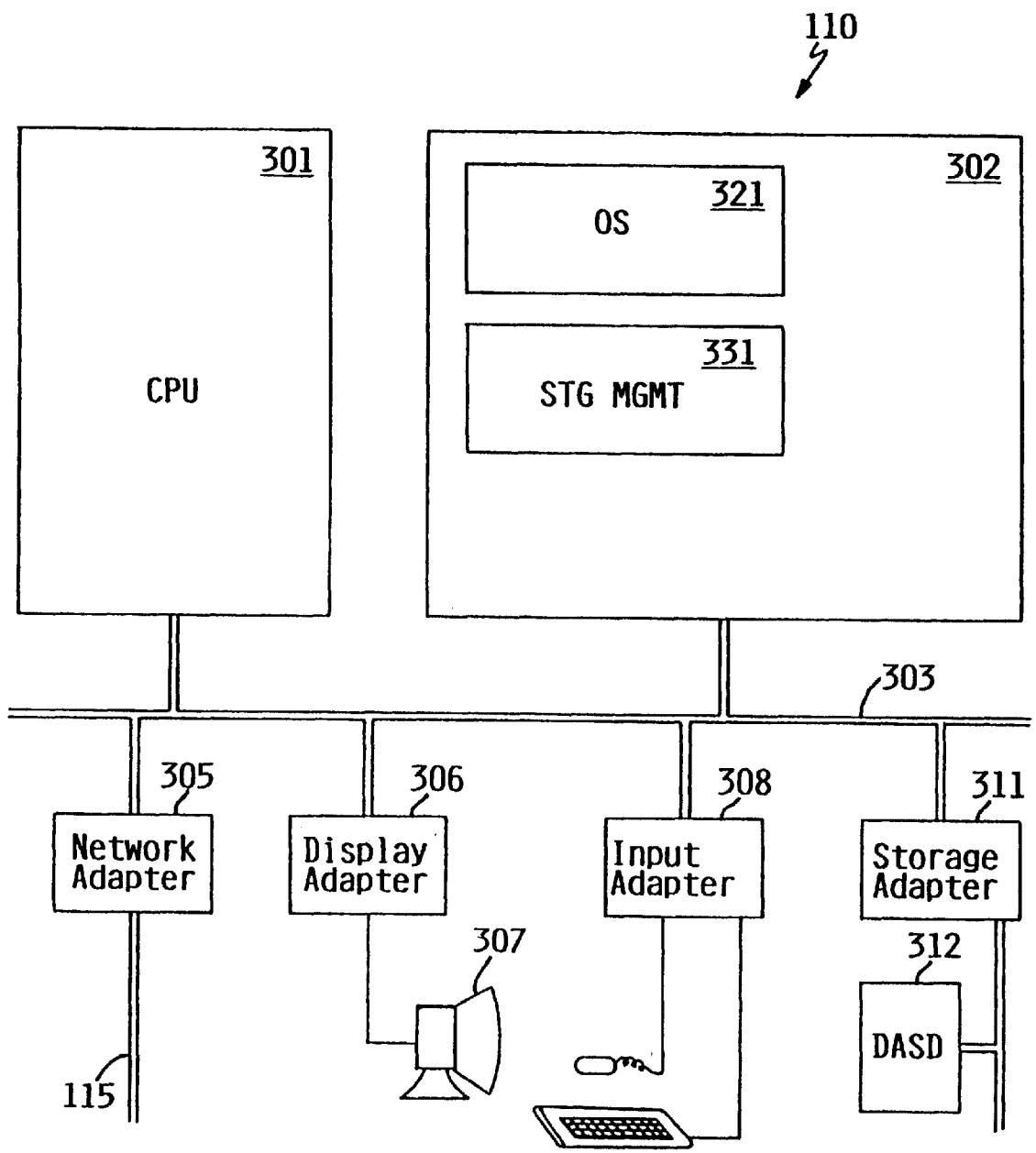
FIG. 3 illustrates in greater detail a host computer system which functions as the manager of a storage network, in accordance with the preferred embodiment of the present invention.

In the preferred embodiment, one of the host computer systems functions as a storage network manager, while the other systems function as agents of the network manager. Host system 110 is designated as the system which functions as a storage network manager. FIG. 3 is a block diagram showing the major components of host system 110 in accordance with the preferred embodiment. Central processing unit (CPU) 301 and system memory 302 are coupled to system bus 303. Bus 303 is used for communicating data among various components of system 110. Network adapter 305 coupled to system bus 303 is connected to network communications medium 115, allowing system 110 to communicate with other systems in the information processing network. Display adapter 306 coupled to bus 303 drives visual display 307 for displaying information to a user. Display 307 is preferably a cathode ray tube display, although other types may be used. Input adapter 308 receives input from an user through one or more input devices, such as keyboard 309 or mouse 310, it being understood that other input devices could be used. Local storage adapter 311 communicates with disk drive storage device 312 for storing data local to system 110. In the preferred embodiment, system 110 is an IBM Personal Computer, it being understood that other types of computer system could be used. It should further be understood that the major components shown above are by way of example, and many different configurations are possible.

Operating system 321 is stored in system memory 302 of system 110. In the preferred embodiment, operating system 321 is a Microsoft Windows 95 operating system, it being understood that other operating systems could be used. Also contained in memory 302 is a master portion of storage management program 331. Storage management program 331 is used to manage storage network 101. Program 331 runs in the environment of operating system 321, and preferably performs display related graphical user interface functions through operating system calls. While operating system 321 and program 331 are shown conceptually in FIG. 3 stored in system memory 302, it will be understood by those skilled in the art that typically the full program code will be stored in mass storage such as disk drive device 312, that only a portion of such programs may be resident in memory at any one time, and that program segments are loaded into memory 302 from storage as needed.

While in the preferred enibodiment, the master portion of storage management program 331 resides on a host system separate from the storage network 101, it would alternatively be possible for storage management program 331 to reside in one of the host systems directly connected to storage network 101.

Figure 4:
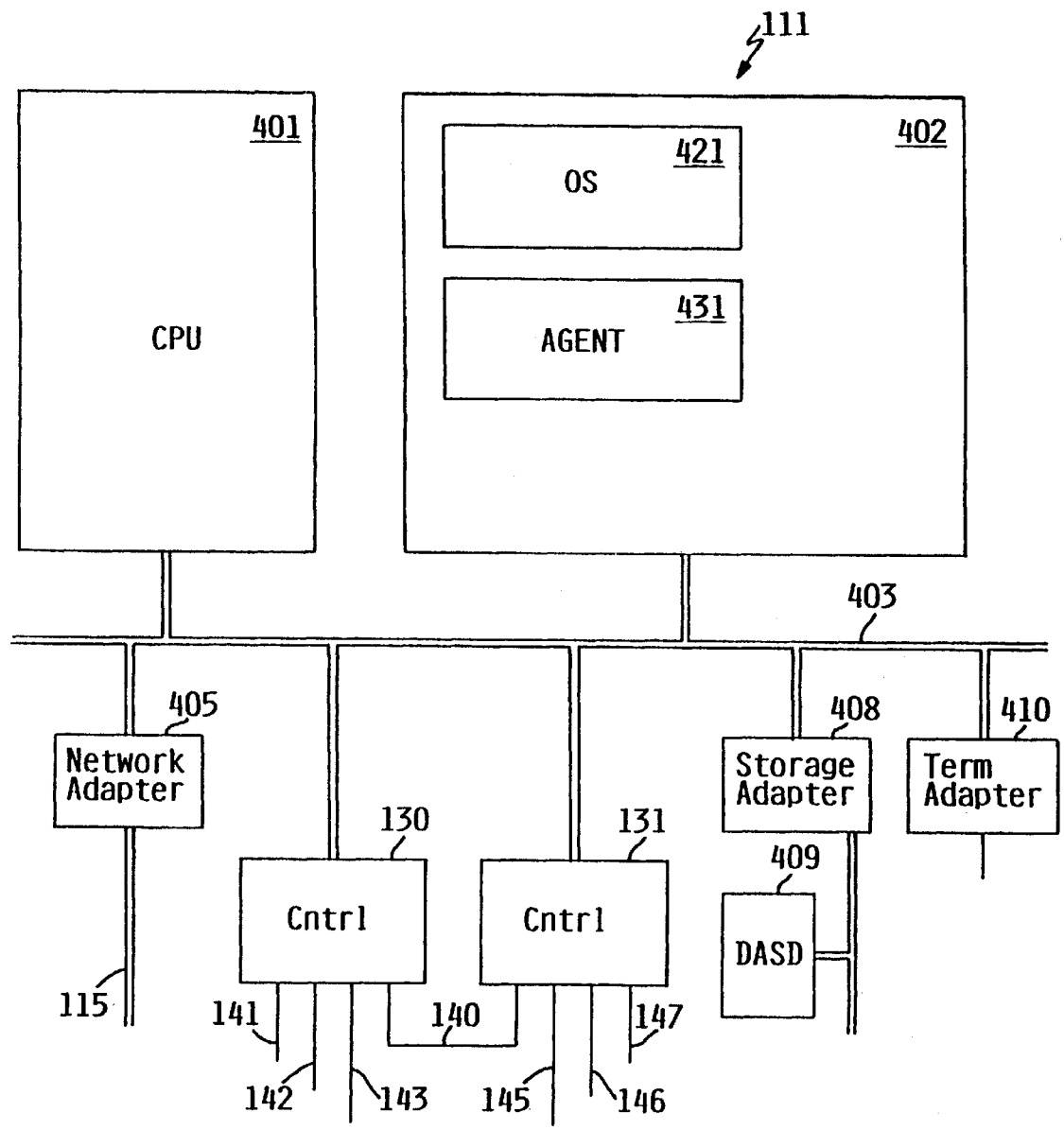
FIG. 4 illustrates in greater detail a host computer system attached directly to a storage network, in accordance with the preferred embodiment of the present invention.

In the preferred embodiment, host systems 111–113 which are directly connected to storage network 101 execute agent portions of the storage management program. FIG. 4 is a block diagram showing the major components of a typical host system 111, which is directly connected to network 101, in accordance with the preferred embodiment. Central processing unit (CPU) 401 and system memory 402 are coupled to system bus 403. Bus 403 is used for communicating data among various components of system 111. Network adapter 405 coupled to system bus 403 is connected to network communications medium 115, allowing system 111 to communicate with other systems in the information processing network.

Network storage I/O controllers 130 and 131 are coupled to bus 403 for communicating with other components of host system 111. Controllers 130,131 additionally are coupled to similar controllers in hosts 112,113, and to storage devices 120–129, through communication links 140–147, which collectively form network 101.

Additional devices may be coupled to system bus 403. For example, local storage adapter 408 is coupled to bus 403, for enabling communication with another (local) disk drive storage device 409. Terminal adapter 410 enables communication with an interactive user terminal (not shown). The configuration shown in FIG. 4 is by way of example only, and other devices (not shown) may also be connected. In the preferred embodiment, host system 111 is an IBM RS/6000 computer system, it being understood that other computer systems could be used.

It will be observed in FIG. 4 that SSA link 140 connects I/O controllers 130 and 131 directly, without going through system bus 403, and this connection is therefore part of storage network 101. On the other band, local storage adapter 408 and device 409 have no direct connection to storage network 101. While it is theoretically possible to transfer data from device 409 to one of devices 120–129 or to another host system, such a transfer would be through system bus 403. Therefore, adapter 408 and storage device 409 are not included in storage network 101.

Operating system 421 is stored in system memory 402 of system 111. In the preferred embodiment, operating system 421 is an IBM AIX operating system, it being understood that other operating systems could be used with appropriate hardware. Also contained in memory 402 is an agent portion of storage management program 431. In the preferred embodiment, agent portion 431 is a part of the storage management program which performs data gathering and monitoring functions. For example, agent portion can poll hosts and I/O controllers to determine the existing topology of a storage network, can monitor and report error conditions, etc., as described more fully herein. While operating system 421 and program 431 are shown conceptually in FIG. 4 stored in system memory 402, it will be understood by those skilled in the art that typically the full program code will be stored in mass storage, and appropriate portions loaded into memory 403 from storage as needed.

The SSA Protocol

In the preferred embodiment, communication links 140–147 comprise wired connections using the IBM Serial Storage Architecture (SSA) communications protocol. In this protocol, the storage network comprises multiple dedicated, bi-directional connections, each connection between two and only two devices. Thus, at the physical hardware level, a separate connection exists in each segment of a communications path. E.g., a bi-directional wired connection exists between disk drive 120 and 121, while separate such connections exist between drive 121 and 122, and between adapter 130 and drive 120.

Because links typically do not exist between every possible pair of devices, data being transferred from one device to another may have to pass through multiple links and devices. The failure of a single device or link would break such a communication path. For this reason, it is desirable, although not required, to arrange such SSA networks in loops, which are inherently redundant. For example, referring to FIG. 2B, storage network 202 is arranged in a "string" configuration, which is non-redundant, while storage network 203 is arranged in a loop configuration. If, e.g., the link between disk drives 252 and 253 were to fail, adapter 224 would be unable to communicate with drive 253. On the other hand, if the link between drives 258 and 259 were to fail, adapter 227 would still be able to communicate with drive 259 by routing a message through disk drives 257, 256, 255, adapter 226, disk drives 260, 261, 262, 263, and adapter 228.

An adapter sends a message to another device on the network by imbedding a "hop count" in an information packet, which is then transmitted to an adjacent device across the dedicated bi directional link. The receiving device decrements the hop count, and, if the hop count is non-zero, forwards the information packet to the next sequential device. For example, referring to FIG. 1, adapter 130 may communicate with drive 123 by sending an information packet to drive 120, having a hop count of 4. Each of the devices 120, 121 and 122 decrements the hop count and forwards the packet to the next device. When the packet reaches drive 123 and drive 123 decrements the hop count, the hop count is now zero, indicating that the message was intended for drive 123.

In order for this scheme to work, each adapter needs to know the relative location of the various disk drives in the network It does not necessarily need to know the identity of the other adapters, since it will not store data on them (although it must know there is something at the adapter location, in order to specify correct hop counts). Accordingly, each adapter maintains a listing of storage devices and their respective hop counts in its local memory. This listing is initially generated at power-on time by polling the devices in the storage network. The adapter may also poll in response to certain network events, or in response to a command from local agent 431.

A sequential series of SSA links from device to device as described above is referred to as an "SSA bus", since it is capable of transmitting data among multiple attached devices. However, it is not a bus in the true sense, since no arbitration is required. The SSA protocol supports rapid transfer of data for writing or reading to a storage device. It is not intended to support higher level comnmnications, such as client/server calls.

Each device on an SSA bus (i.e., disk or adapter) has a unique universal identifier associated with it. This identifier is guaranteed by the protocol to be unique across all devices which can attach to an SSA bus.

It should be understood that other storage network protocols could be used, including protocols which imply different connection topologies. For example, a bus-based protocol (such as SCSI) in which all devices are connected to a common communication carrier (bus), and arbitrate for control of the bus, could be used. Furthermore, while in the preferred embodiment the SSA protocol is supported, certain aspects of the manager/agent architecture, particularly the manager/agent remote procedure call interface, are defined to support other protocols, or mixed protocols. In this manner, the distributed storage management program of the preferred embodiment may be extended to support other protocols in the future.

II. The Central Manager

In the preferred embodiment, storage management program central manager 331 is implemented in object-oriented programming code. This implementation facilitates the manipulation of objects displayed on a visual display as well as the interconnecting relationships between different representations of physical objects which make up the network. While the description below is directed to this implementation, it will be understood by those skilled in the art that the storage management functions could have been implemented in conventional procedural programming code, or using other programming paradigms.

The manager supports various functions, which can generally be divided into two groups: the planning functions and the monitoring functions. The planning functions enable a user to plan storage network configurations. The monitoring functions (also known as "live mode") automatically discover existing storage network configurations, display these configurations to the user, report events, device characteristics, etc., and perform diagnostics. There can be some overlap of function, in that the planning function can be used to plan extensions to existing storage networks which are first mapped using the automatic discovery function. Both of these groups of function use a common set of data structures, specifically an object-oriented class library. The fact that the library is shared by both groups of functions does not mean that every object in the library is used by every function.

In the preferred embodiment, the manager is developed using the IBM Visual Age programming development environment. This product provides an Open Class Library having various object-oriented facilities, which are used by the manager where necessary. Other development environments may provide analogous facilities, or it would be possible to create necessary facilities.

Figure 5A:
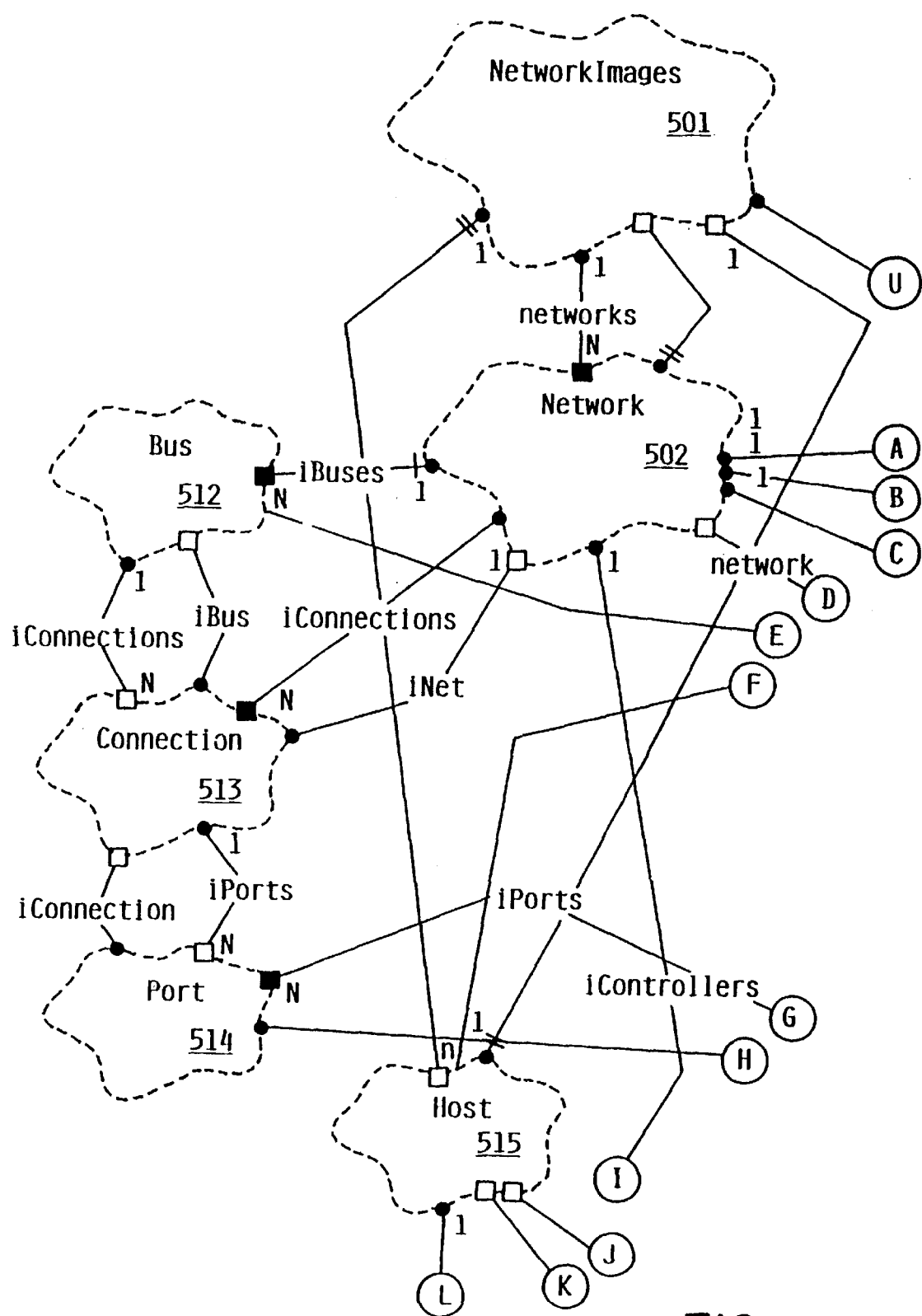
FIGS. 5A through 5C illustrate ahigh level view of the class library objects for logically representing storage networks, in accordance with the storage management program of the preferred embodiment.
Figure 5B:
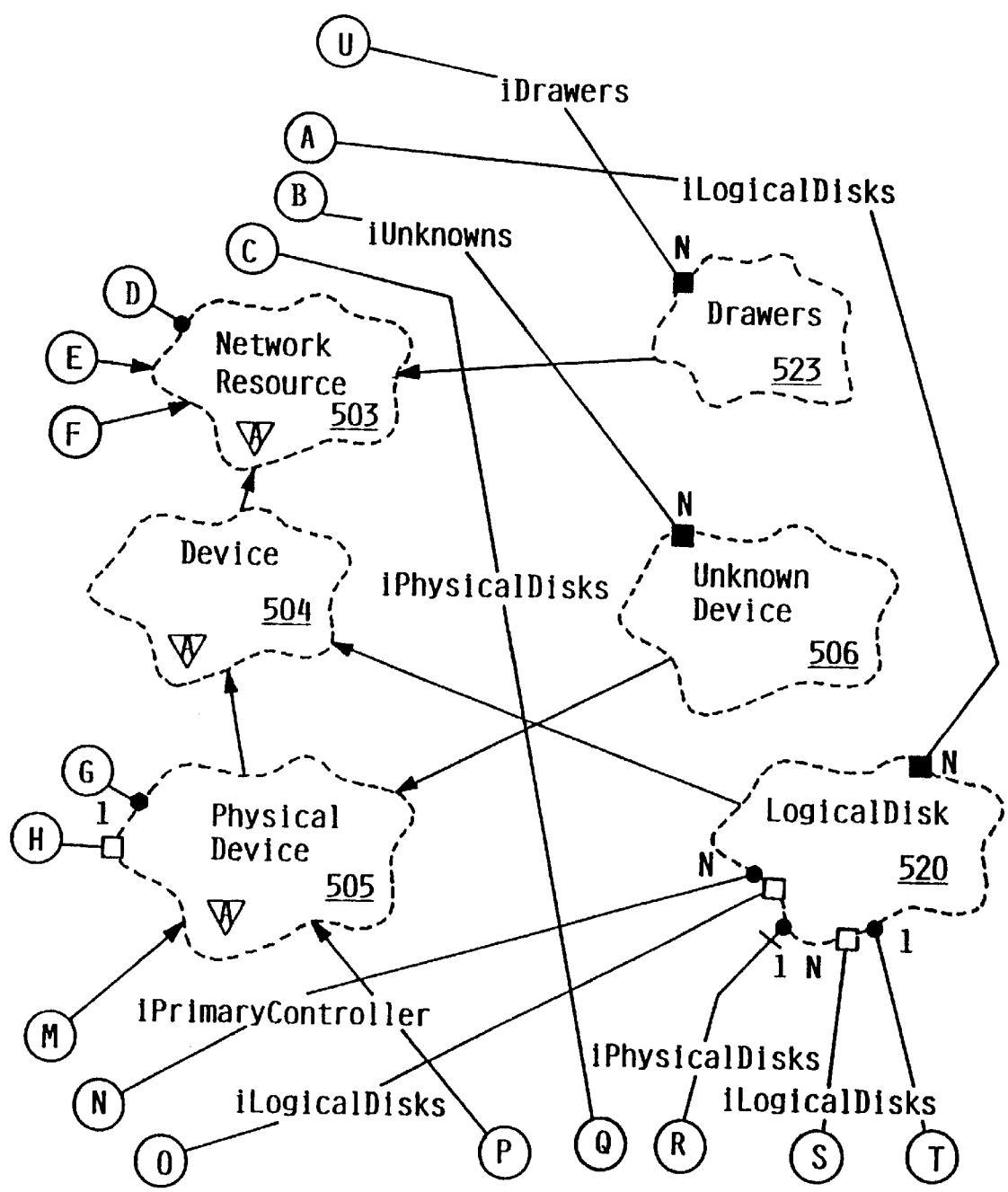
Figure 5C:
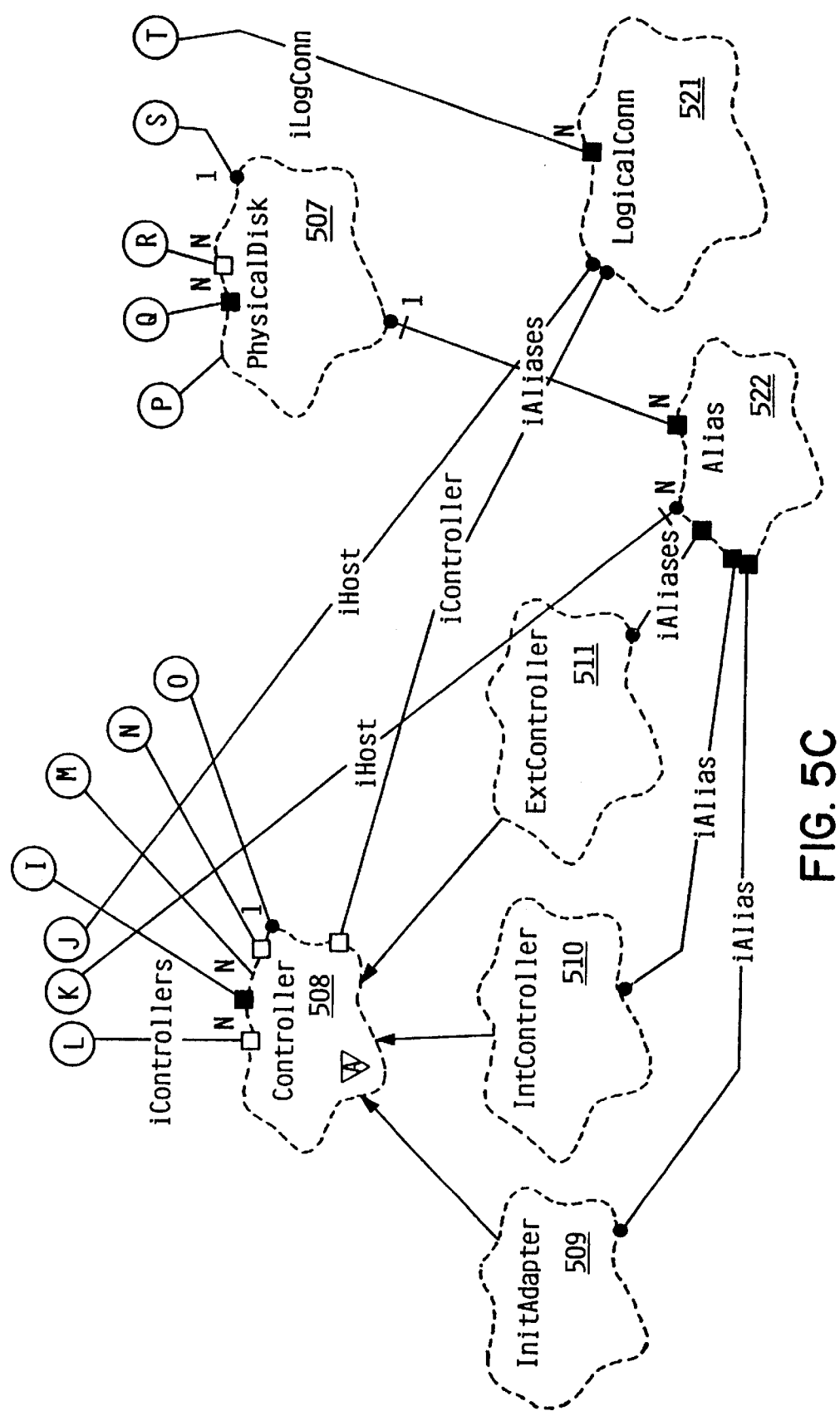

FIG. 5 illustrates a high level view of the class library objects of the storage management program of the preferred embodiment. FIG. 5 uses a notational system known as "Booch notation". This system is generally known among those skilled in the art of object-oriented programming. An explanation of the Booch notational system can be found in Booch, *Object-Oriented Analysis and Design With Applications*, 2nd ed. (Benjamin/Cummings Publishing Co., 1994), at Chapter 5, pp. 171–228. In FIG. 5, certain class relationships (which are actually containment by value) are depicted as contained by reference for ease of understanding. The actual code uses containment by value for reasons of performance, it being understood that it would be possible to write the code as either containment by value or by reference.

NetworkImages class 501 holds the objects which make up the current management set. The management set can be thought of as the global set of objects capable of being manipulated and configured by storage management program 331. It is possible to save and store multiple nanagement sets, but only one set is worked upon at any one time. The management set may contain one or more storage networks. When program 331 is initiated, it creates a single NetworkImages object. Methods can then be invoked to populate the NetworkImages object. E.g., the method open() populates NetworkImages with a previously saved management set. Alternatively, methods can be called to create objects (Hosts, PhysicalDisks, etc.) one at a time. All Device objects are added and removed using the add() and remove() methods, respectively. The program determines which Network object the Device object belongs in and places it in the appropriate Network.

Network class 502 is a container (collection) class for all of the primary objects (PhysicalDisks, Controllers, LogicalDisks, Hosts, UnknownDevices, Connections and Buses) contained in a single network image. The Network class corresponds to a single storage network. It is possible to have multiple Network objects in a single NetworkImages object (i.e., multiple storage networks in a single management set).

NetworkResource class 503 is an abstract base class which is used to provide an interface for classes that inherit from it. This class serves as the base class for the Host, Bus and Device classes. Although many of the object representing network resources could be lumped into a collection of NetworkResources or Devices, they are kept in separate collections for each device class, i.e., LogicalDisk, PhysicalDisk, etc. This provides some efficiencies when searching for particular objects or types of objects.

Device class 504 is an abstract base class which is used to provide a consistent interface for the devices that inherit from it, Device class 504 along with PhysicalDevice class 505 support extensibility. For example, if a magnetic tape device were to be added to the collection of devices configurable in a storage network, the new class could inherit from PhysicalDevice class 505, and thus maintain an interface consistent with other devices. Device class 504 groups all the functions that don't require a distinction between physical and logical device, e.g. serialNumbero, nameo, and stateo.

PhysicalDevice class 505 is also an abstract base class which provides a common interface for physical (as opposed to logical) devices, e.g., Controller, PhysicalDisk, and UnknownDevice. Because every physical device has ports or connectors which are used to connect the device to other physical devices, PhysicalDevice class 505 contains at least one Port object by value. These Port objects are used to make connections to other Physical Device objects. It is PhysicalDevice objects (representing physical devices) as opposed to LogicalDevice objects that the storage management program configures by forming connections therebetween.

PhysicalDisk class 507 is used to define a PhysicalDisk object, and is derived from the NetworkResource, Device and PhysicalDevice classes. PhysicalDisk objects represent rotating magnetic hard disk drive storage devices. In the preferred embodiment, disk drives are the only type of storage device supported for the network, although it would be possible as noted above to extend the application to other types of devices.

Controller class 508 is an abstract base class which provides a common interface for different types of objects representing I/O controllers. Controller class 508 is derived from NetworkResource 503, Device 504 and PhysicalDevice 505 classes. The classes ExtController, IntController and InitAdapter (representing external controllers, internal controllers, and initiator adapter cards, respectively) inherit from Controller class 508.

ExtController class 511 is derived from Controller class 508 and is used to represent controllers that are physically contained outside of a host system. For example, an external controller may be a RAID controller which is located in a separate storage subsystem housing having multiple storage devices and supporting hardware.

IntController class 510 is derived from Controller class 508 and is used to represent most I/O controllers of the type that are physically mounted within a host system, and typically connected directly to the host system's backplane bus.

InitAdapter class 509 is derived from Controller class 508 and is used to represent initiator adapters, i.e. I/O controllers which reside within a host system for connecting the host system to an external controller.

Bus class 512 is used to contain a group of Connection objects that are contained on a single loop or string. In the SSA protocol, this amounts to the collection of Connections that form a single SSA bus. If the architecture were used to represent other protocols such as SCSI, the Bus class might be used to represent a single SCSI bus or similar construct.

Figure 8A:
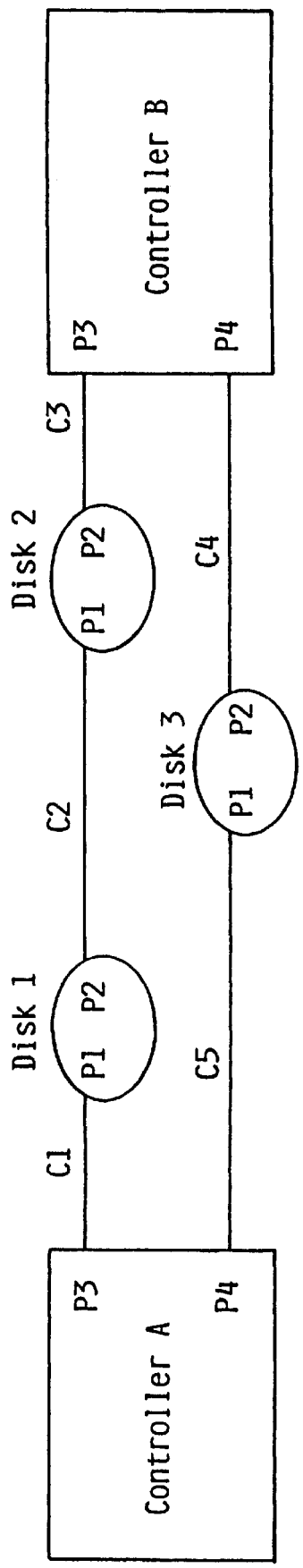
FIG. 8A shows a simple storage network loop configuration example.
Figure 8B:
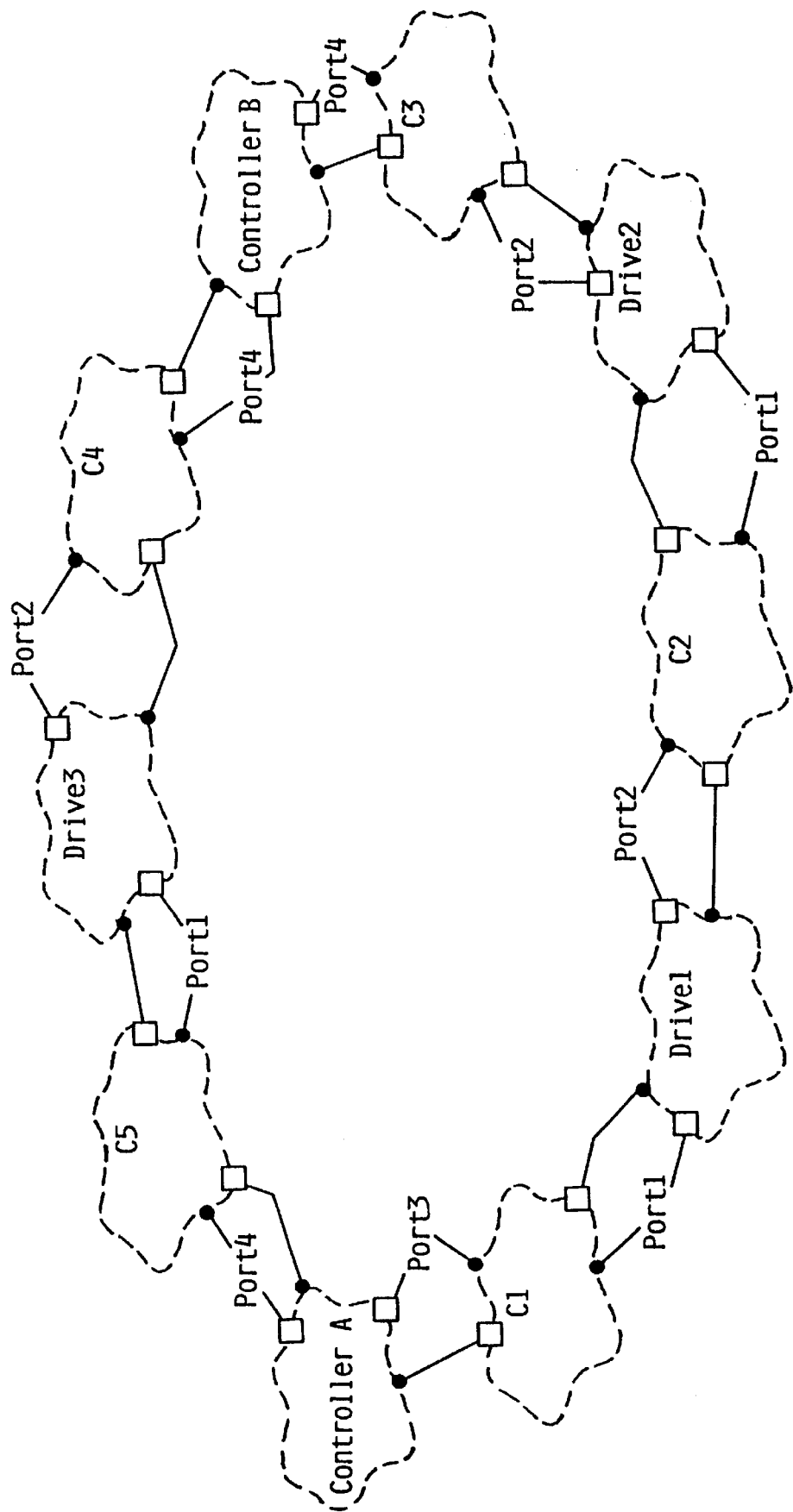
FIG. 8B is an object diagram showing the object representation of the storage network loop of FIG. 8A, according to the preferred embodiment.

Connection class 513 is used to provide information on the bus or link that is connecting PhysicalDevice objects. For the SSA protocol, a Connection object represents a single bidirectional link that joins two physical devices together. The Connection class contains one or more Port objects (described below). The Port class has a reference to a PhysicalDevice and contains an identifier which is used to store the port number that is associated with the port. For the SSA protocol, each Connection object contains two Port objects. FIG. 8A illustrates an example of a simple SSA storage network having two controllers and three disk drives. Each link is considered a connection. The connections are labeled C1 through C5. FIG. 8B shows an object diagram for the network of FIG. 8A., relating the Connection objects to the PhysicalDevice objects. All of the references with a PortX label and the Port object contained inside the Connection class. For example, Connection 5 (C5) is connected to Port4 of ControllerA and Port1of Drive3.

Port class 514 is contained by value inside of a concrete PhysicalDevice class. A Port object is used to contain the information on The location of a port by containing a reference to the corresponding PhysicalDevice and an identifier. The identifier stores the port number.

Host class 515 is used to define ahost system, i.e., a system in which at least one internal controller or initiator adapter resides. Only a host system having such an I/O controller can be connected to a storage network LogicalDisk class 520 is used to represent a "logical" view of disks from the perspective of a host system, which is different from the actual hardware (physical) view. In the AIX host operating system of the preferred embodiment, a collection of multiple physical disks can be treated as a single logical disk, whereby host I/O functions access an address in the logical disk space, which is ultimately mapped to one of the disks. In particular, a group of disks storing data redundantly in accordance with a RAID plan should be a single logical disk. Theoretically, the "logical disk" class could be used to represent logical disks which are actually partitions (portions) of a physical disk, although this is not done in the preferred AIX embodiment.

LogicalConn class 521 is used to represent a "logical" connection, and is a companion to the logical disk concept.

Alias class 522 contains alias names for physical devices, known to particular hosts. I.e., the same physical device may have different identifiers in different host systems.

UnknownDevice class 506 is used to represent physical devices which are of an unidentified type or a type not known to storage management program 331.

Figure 6:
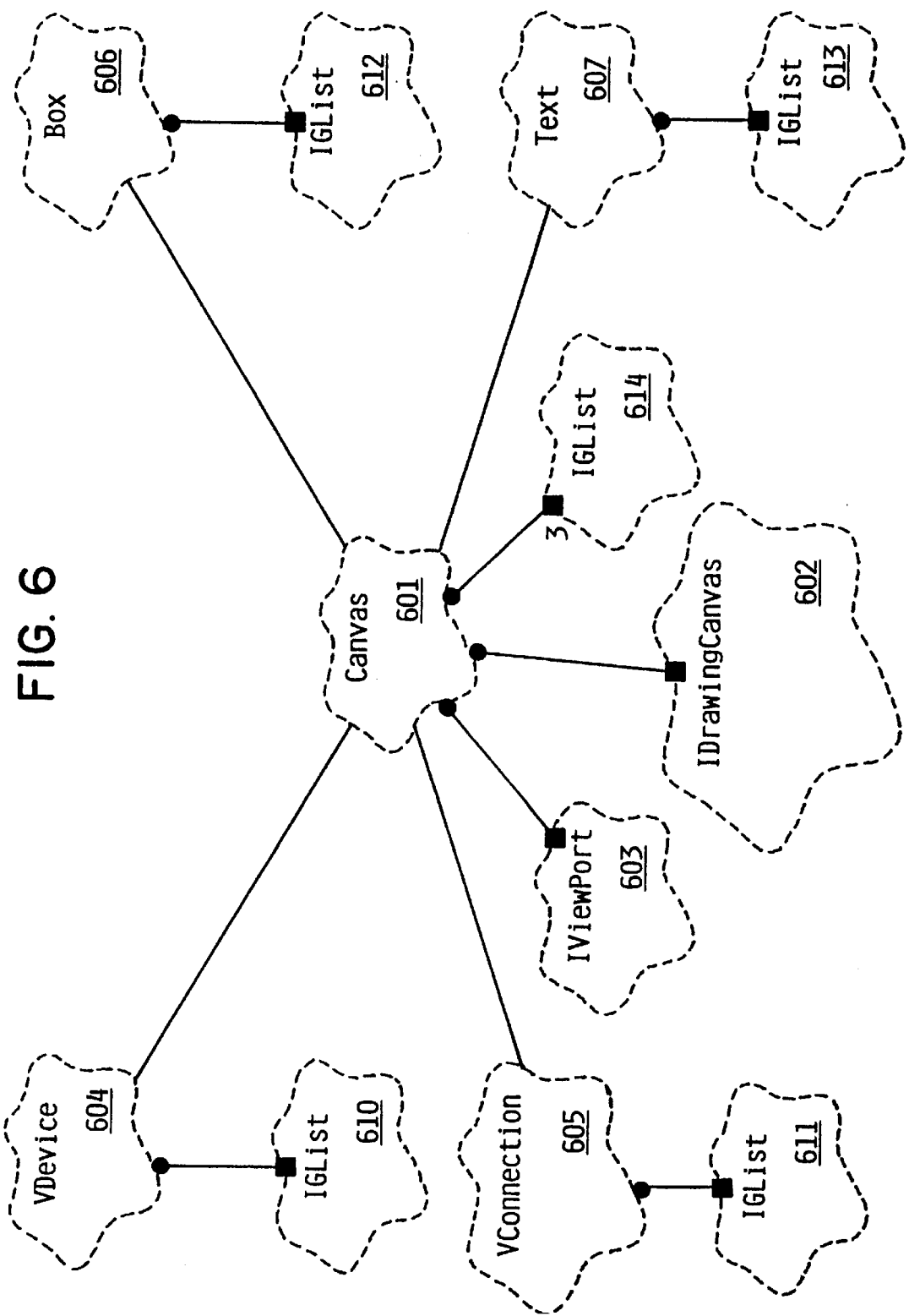
FIG. 6 illustrates a high level view of the canvas related objects which visually represent storage networks, in accordance with the storage management program of the preferred embodiment.

In operation, storage management program 331 presents the user with a virtual "canvas", which can be likened to an artist's canvas, i.e., the area for drawing and displaying things. The class library depicted in FIG. 5 is used internally within storage management program 331 for representing physical devices, connections, and logical relationships. Additional classes are used to generate the graphical display of storage networks on a display screen, for visualization by the user. The structure of these additional classes is shown in FIG. 6.

Canvas class 601 is the base class for holding all objects which define what can be displayed on the display screen.

IDrawingCanvas class 602 contains the current contents of the canvas. The "canvas" is a virtual area for representing storage networks. Typically, the canvas is larger than the size of the physical display screen. As a result, the display screen is capable of displaying only a portion of the complete canvas at any one time.

IViewPort class 603 contains the definition of the "viewport", i.e., the portion of the canvas which is currently visible on the display screen. This portion may be thought of as a movable rectangular viewport, which can be placed over any arbitrary section of the canvas. The viewport's location is manipulated by conventional horizontal and vertical scroll bars.

VDevice class 604 contains objects defining the appearance of corresponding network resource devices such as Controller or PhysicalDisk objects. For example, a VDevice object will contain color, size, coordinate location, etc., of a representation of a network resource device.

VConnection class 605 is similar to VDevice class, but contains objects defining the appearance of Connection objects on the screen.

Box class 606 and Text class 607 contain objects which define box and text annotations, respectively. Such annotations have screen location, size and appearance, but unlike VDevice and VConnection objects, have no corresponding object in the class library of FIG. 5. Box and Text objects support annotations which make the screen representation of a storage network easier to understand, but these annotations are not themselves part of the network IGList classes 610–614 contain information defining the icons or other graphical images and associated text, which are part of respective VDevice, VConnection, Box, Text and Canvas objects.

Figure 7:
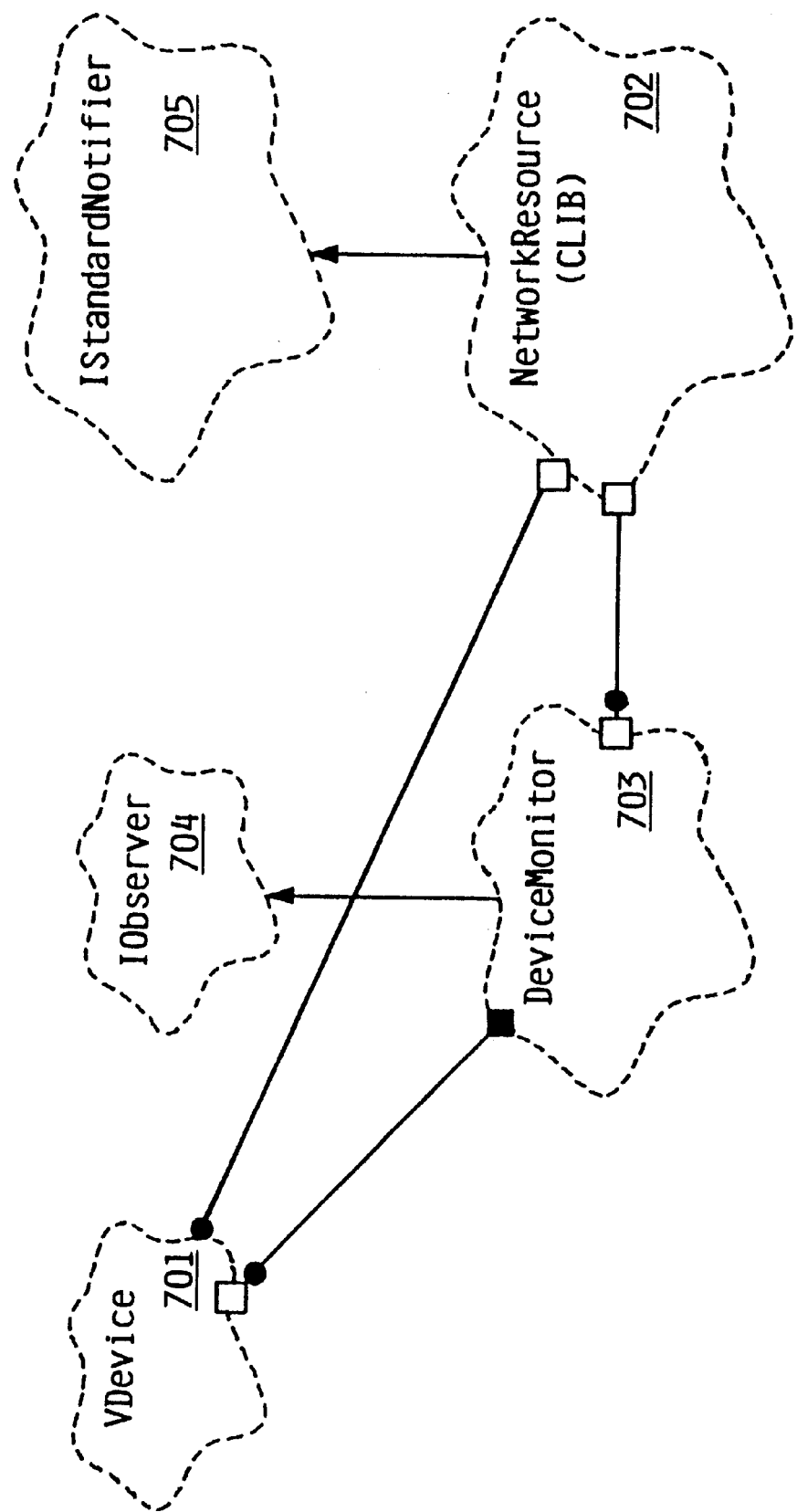
FIG. 7 illustrates the relationship between visual device representation objects and the network resource objects themselves, according to the preferred embodiment.

FIG. 7 illustrates the relationship between VDevice objects and the corresponding network resource objects themselves, according to the preferred embodiment. For each VDevice object 701, there exists a corresponding object 702 which inherits from NetworkResource class 503. NetworkResource, being an abstract class, does not directly contain objects, but objects inheriting from it would include, for example, PhysicalDisk, IntController, Adapter, etc. When storage management program 331 is operating in configuration planning mode, VDevice objects send messages directly to corresponding objects inheriting from NetworkResource. DeviceMonitor object 703 is used only for the storage management program's data gathering and monitoring functions, and can, for example, send a message to a VDevice object causing its screen representation to change in response to some event occurring on the network. IObserver 704 and IStandardNotifier 705 are similarly used only for network data gathering and monitoring.

The data representing a management set can be saved as a file containing a series of records, and later reloaded without having to generate the management set from scratch (either in planning mode or live mode). The format of saved records representing a management set is explained below in Appendix B.

The central manager obtains data from various sources. In live mode, most configuration data is obtained from the local agents, as explained herein. In planning mode, this data is generally provided by the user. Additionally, data can be saved as a file (as noted above) and reloaded. Finally, a considerable amount of configuration information concerns the capabilities of types of devices and how they may be connected to other devices, which change only when hardware or software changes. Much of this information is contained in a rules file, which is loaded into the manager at its invocation. For example, information such as the speed of a device, number of ports, etc., would be contained in the rules file. By including this information in a separate file, it is possible to more easily support hardware and software changes, addition of new device offerings, etc. The format of data in the rules file is explained below in Appendix C.

It will be understood that the above described object-oriented class structures are illustrative of a single embodiment only, and that many variations of data structures are possible. For example, in addition to varying forms of class libraries, the function described herein could have been implemented in conventional procedural code, in which data is encoded in tables, linked lists, or any of various forms. Furthernore, depending on the exact form of the implementation, some attributes or fields may be unnecessary, while additional attributes or fields may be required It will further be understood that the class structures described above are not necessarily the only class structures used by storage management program 331.

III. The Manager/Agent Interface

In the preferred embodiment, the local agent communicates with the manager across an information processing network medium which is independent of the storage network medium. Specifically, multiple host systems are connected via an information processing network operating in accordance with a TCP/IP protocol, it being understood that other protocols could be used. This protocol is intended to readily support client-server communication. The manager and agent utilize remote procedure call interfaces 322, 422 in the respective operating systems 321, 421 of the manager's computer system 110 and the agent's computer system 111.

In general, the local agent provides information to the manager in response to a command from the manager. Some commands may require the local agent to perform some action, such as a command to turn on an indicator light as part of a diagnostic routine. In this operating mode, the agent is acting as a server and the manager as a client.

The manager polls the local agent periodically to learn of storage network events. A poll is conducted by asking for three specific attributes associated with each storage network adapter topology events (events which affect physical device configuration), logical events (events which affect logical assignments of devices) and error events. This information is requested using the LL_GetAttr command, described below. These three attributes are maintained as counters by the adapters. A change in the count of any event indicates that an event of the corresponding type has occurred. The manager can then make appropriate further inquiries to determine the nature of the event.

The local agent stores information about "resources" and "primary relationships". A "resource" is an object of interest in the analysis of a storage network; it could be a physical device, such as a physical disk or adapter, or a logical construction such as a logical disk (which is really a collection of physical disks) or an SSA bus (a form of device bus, which is really a collection of individual bi-directional binary physical links). A "primary relationship" refers to a direct physical or logical connection from one type of resource to another. Primary relationship information is not reflexive; information in one direction may be different from information in the other. Examples of primary relationships are:

Host to Host Bus
Host Bus to Adapter
Adapter to Device Bus
Adapter to Logical Disk
Device Bus to Physical Disk
Device Bus to Unknown Device
Logical Disk to Physical Disk The local agent also stores "attribute" information for various resources, i.e., information which describes a resource. A complete listing of attribute type information is contained in Appendix A. An explanation of the command (remote procedure calls) from the manager to which the local agent responds follows.

LL_ListResources:

This command calls the local agent to list all resources known to its host which match the parameters of the call. The local agent returns a resource list 901 as shown in FIG. 9A, containing a plurality of resource ID entries 902. Each resource ID entry 902 identifies a single resource, and contains technology code 903, major type 904, minor type 905, and resource tag 906. For most resources, technology code 903 specifies a type of storage network protocol, such as SSA or SCSI. Some resources, such as host systems and host buses, are not specific to any particular storage network protocol (and may in fact be connected to storage networks of heterogeneous protocols). For these resources, technology code 903 is undefined. Major type 904 specifies the main category of the type of resource. Examples of major types are Hosts, Adapters, Physical Disks, Logical Disks, etc. Minor type 905 specifies a resource type with greater particularity, allowing the specification of different types of devices falling into the same "major" class. For example, there may be several different types of physical disks supported, each having its own storage capacity and other attributes. Resource tag 906 is a unique identifier assigned to each resource, to distinguish it from all other resources of the same major and minor type. Resource tag 906 is derived from the device UID and/or machine ID, and contains information used by the central manager to distinguish and uniquely identify devices found by different hosts. I.e., the manager used resource tag 906 to determine whether two "resources" found be two separate hosts are in fact the same device. When the manager issues a LL_List Resources call to the local agent, it specifies a resource type by technology code, major type and minor type. The manager may specify wild card parameters. The list 901 returned by the local agent contains all resources which match the specified parameters.

LL_TypeConnections

This command calls the local agent to list the types of primary relationships that are possible from a specified type of resource. The manager specifies a resource type by technology code, major and minor. The local agent returns a connection type list 911 as shown in FIG. 9B, listing the resource types which may form a primary relationship with the specified type of resource, and the maximum number of each type that may be so related. Each entry 912 in connection type list 911 specifies a type of primary relationship by technology code 913, major 914 and minor 915. Entry 912 further specifies a cardinality 916 which indicates the maximum number of resources of that type which may form a relationship with the given resource, the number 0 indicating no limit. Entry 912 further contains volatile flag 917, which indicates whether the primary relationship needs to be rediscovered on the occurrence of an event. While it would be possible to maintain all this information in tables in the manager, retrieving it from the local agent provides more flexible support for the addition of new device types in the future.

LL_ListPrimaryConnected:

This command calls the local agent to list all primary relationships of a specified type from a specified resource. The manager specifies a particular source resource by technology code, major, minor, and resource tag. The manager further specifies a type of target resource by technology code, major and minor (thereby specifying a type of primary relationsbip). The local agent returns a listing of all target resources which meet the target resource p ers and have a primary relationship with the specified source resource, along with certain relationship information. The structure of the returned information is shown in FIG. 9C. The primary connection list 921 contains one or more entries 922, each identifying a target resource and connection details. The target resource is identified by technology code 923, major 924, minor 925 and resource tag 926. For each such target resource entry 922 in list 921, there is a variable length array of connection records 927, each connection record containing information about the relationship between the source and target resource. The connection record is in the form of a connection data type identifier 928 and connection data 929. In most instances, array 927 contains only a single entry defining the primary relationship, but it is possible to contain multiple entries. Connection data 929 may be a single value, or may be a complex data structure. For example, primary connection list 921 for a device bus type source resource (not shown) would contain entries identifying the various storage devices and adapters on the bus, and connection data 929 would identify for each such target device the devices immediately connected to it, and port numbers through which they are connected, thus identifying the correct order of devices to the manager. This call is the normal means by which the manager discovers the topology of the network.

LL_ListConnected:

This command calls the local agent to list all resources of a specified type which are related to a specified resource within a specified depth level. I.e., if a primary relationship is a level of 1, then a resource C having a primary relationship with a resource B having a primary relationship with resource A is at a level of 2 with respect to A, and so on. The manager specifies a source resource by technology code, major, minor and resource tag. The manager also specifies a resource type for the target resource by technology code, major and minor, and a depth level for the relationship. The local agent returns a list of resources having the same structure as resource list 901, and containing an entry for each resource satisfying the specified conditions of the call. For performance reasons, this manager does not normally use this command, but it is defined as part of the call protocol for possible situations in which a global inquiry is justified.

Figure 9D:
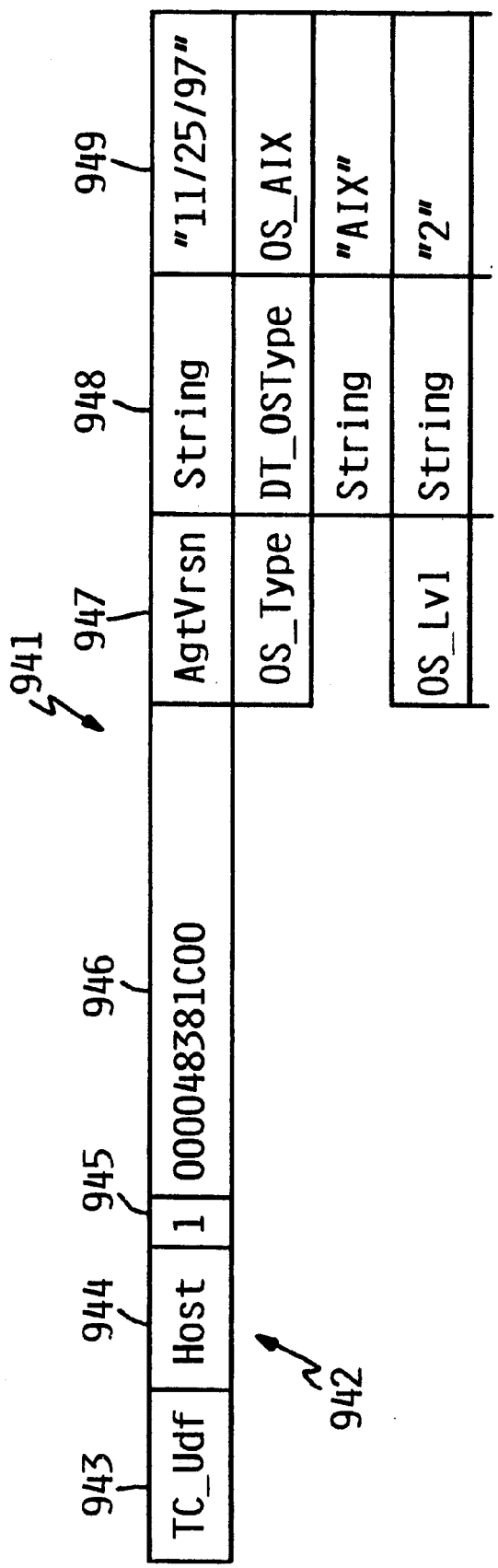

LL_GetAttr:

This command calls the local agent to list the current values of specified attributes for specified resources. In the call, the manager passes a list of resources and attributes, specifying one or more resources by technology code, major, minor and resource tag, and specifying one or more attributes by attribute name. The agent returns the information sought in a resource/attribute list 941 as shown in FIG. 9D. List 941 contains an entry 942 for each resource specified by the manager in the call. Each entry 942 contains a technology code 943, major 944, minor 945 and resource tag 946 identifying a particular resource, followed by a variable length array of attribute information applicable to the resource, shown as fields 947–949. The array contains attribute names 947, data types 948 and attribute values 949. Multiple attributes may be associated with a single resource. Additionally, multiple data types 948 and attribute values 949 may be associated with a single attribute. This latter feature permits an attribute value to be expressed using different data types. For example, as shown in FIG. 9D, the attribute named "OS_Type" (representing the type of operating system running on a host) can be expressed either as data tpe "DT_OSType" (which is an enumerated data type) or as a string. For certain attributes, attribute value 949 may be a complex data structure, such as an array or list.

Figure 9E:
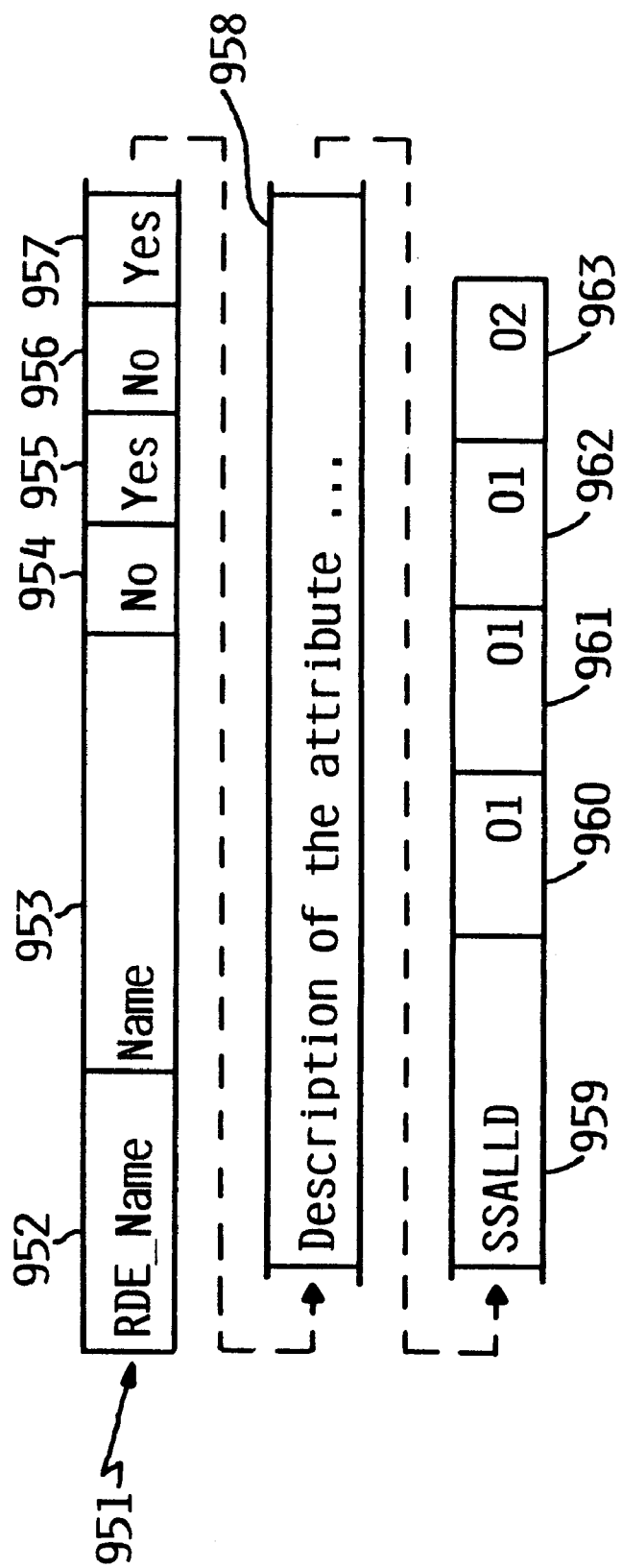

LL_AttrDesc:

This command calls the local agent to return the description of an attribute. This call anticipates the situation where attributes defined to the local agent are unknown to the manager, either because new devices having new attributes are defined, or the local agent is more current than the manager. The manager passes the name of the attribute with the call. The local agent returns attribute description data structure 951 defining significant characteristics of the specified attribute as shown in FIG. 9E. Attribute description 951 includes attribute name 952 (an enumerated data type), English name of the attribute 953 (a string type), volatile flag 954, readable flag 955, writeable flag 956, host specific flag 957, English description of the attribute 958, catalog base name 959, name set number 960, name message number 961, description set number 962 and description message number 963. Volatile flag 954 indicates whether the attribute changes. Readable flag 955 and writeable flag 956 indicate whether the attribute can be read by the local agent or written to the local agent (from the perspective of the manager), respectively. Host specific flag 957 indicates whether an attribute is specific to a particular host; e.g., a disk storage device may be known by different addresses to different hosts. Fields 959–963 are used to specify a location for messages, to enable support for different human languages. I.e., a message associated with an attribute is specified by catalog base name, set number and message number, which specify a location in a table of messages; the table contains text of messages in the language of the user.

LL_SupportedAttr:

This command calls the local agent to return a list of all attributes applicable to a specified resource type. By making this call, the manager can determine what are the attributes of any given resource type. It can then use other calls, such as LL_AttrDesc or LL_GetAttr, to determine the characteristics of attributes or their current values. The manager specifies a resource type by technology code, major and minor in the call. The local agent returns a list of the attributes applicable to the specified resource, the attributes being identified only by their enumerated data type.

LL_SetAttr:

This command calls the local agent to change (write) an attribute for a specified resource. Attribute information is by its nature a characteristic of the local system, and therefore must be modified by calling the local agent Most attributes are not writable (can not be written to by the manager using this call), but certain attributes (e.g., indicator light on) can be altered by the manager. Alteration of such an attribute causes something to happen. These are used primarily for diagnostic and repair actions. The manager passes a list specifiing one or more resources by technology code, major, minor and resource tag. The manager also specifies an attribute and a value for the attribute (the "value" of an attribute is possibly complex information such as an array or list). The local agent responds by setting the attribute to the appropriate value. By passing a list of multiple resources, it is possible to set the corresponding attributes of several different resources to the same value in a single call.

LL_ConnectionDetails:

This command calls the local agent to supply additional information about a relationship between two specified resources. This information is not necessary for a minimal understanding of the network topology, but may be useful to the user for some purposes. E.g., the fact that a particular adapter is in a certain physical slot location in a host bus is irrelevant for determining the network topology, but may be useful to a user who needs to replace the adapter. The Manager specifies a pair of resources by technology code, major, minor and resource tag. The local agent returns a variable length connection record array, each array entry specifying some information about the relationship between the two resources. The format of the connection record array is the same as array of connection records 927 returned by the local agent in response to the LL_ListPrimaryConnected call (note that one array 927 is associated with each pair of resources).

IV. The Local Agent

The local agent provides data to the manager and performs certain tasks at its request. Specifically, the agent acquires topology and attribute information concerning one or more storage networks to which its host is attached, and supplies this information to the manager.

Figure 10:
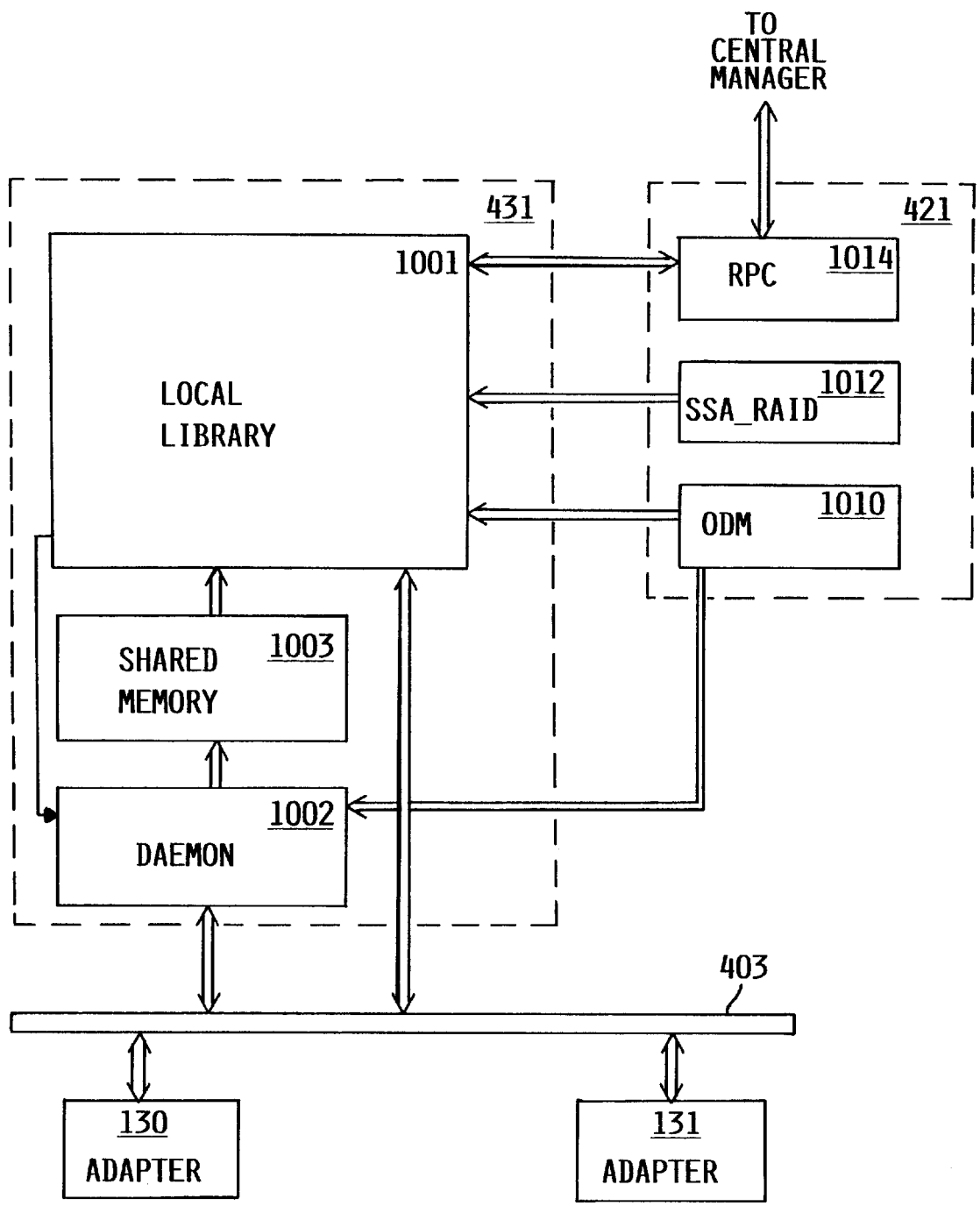
FIG. 10 is a high-level view of a local agent and various components within its host system with which it interacts, according to the preferred embodiment.

FIG. 10 is a high-level view of the agent and its interactions. Local agent 431 is programing code and associated data residing in a host system, executing on its CPU 401. Agent 431 includes local library 1001, network daemon 1002, and shared memory 1003.

Local library 1001 is an independently running thread which forms the central control portion of local agent 431. It communicates with the manager by making remote procedure calls, invokes operating system functions, obtains data from shared memory, and directly communicates with storage adapters when necessary. Network daemon 1002 is an independently runmling tread executing concurrently on CPU 401. Daemon 1002 continually monitors the state of the storage adapters in its host system, and writes this state information in shared memory 1003.

Shared memory 1003 is not a physically distinct memory, but simply a set of data structures in system memory 402 which are used by two independently running threads, local library 1001 and daemon 1002. Local hbary 1001 has read-only access to shared memory 1003, while daemon 1002 has read/write access. Semaphores are used for locking so that library 1001 will not read the contents of memory 1003 while daemon 1002 is updating it.

Local library 1001 communicates with the central manager through the operating system's remote procedure call facility 1014. In the preferred embodiment, facility 1014 handles all the interface details. The local library merely utilizes the appropriate operating system supplied programming interfaces to its remote procedure call facility. Library 1001 does not concern itself with the details of the interface protocol, this being an operating system function. It would, however, alternatively be possible to incorporate the remote communication function into the local agent.

Object Database Management facility 1010 (ODM) is a portion of operating system 421 which maintains a database concerning "objects", and provides an application programing interface (API) to the database, whereby an application may make queries of the database. The "objects" which are the subject of this database are various components of host system 111, and are not to be confused with progranuning "objects" in an object-oriented programming environment For example, ODM maintains information about buses, adapters, disk storage devices, and other components of system 111. Local library 1001 and daemon 1002 access this information through the odm_get_list, odm_change_obj, and getattr APIs to operating system 421.

In general, the information maintained by ODM 1010 is information of a static nature, which only changes when a "cfgmgr" AIX command is run following devices being added or removed, or the system is otherwise reconfigured. For example, ODM maintains information about which physical devices (buses, adapters, storage devices, etc.) are components of the system, the addresses of those devices, physical locations such as bus slots, etc. Most of the non-RAID related attribute information which can be requested by the manager through the LL__GetAttr command is stored in the ODM, the most notable exceptions being RAID-related attnbutes (which are maintained by ssaraid operating system facility 1012) and volatile information such as event counters, certain state indicators, diagnostic attributes, etc.

Ssaraid facility 1012 is also a portion of operating system 421. Ssaraid 1012 is an auxiliary tool designed to support RAID functions. It is used by local library 1001 to obtain certain RAID-related attributes of the storage devices. Nonmally, this tool is invoked by a user by entering a command on an operating system command line or via "smit". The local library achieves the same result by creating a string containing the command line text, and then executing the command by opening a pipe to the process (i.e. performing a popen() call). The output is then read from the process's stdout.

Both the ODM facility 1010 and ssaraid facility 1012 are particular facilities available in the operating system of the preferred embodiment, i.e., IBM's AIX operating system. Other operating systems may offer different facilities from which this information could be obtained. Alternatively, if necessary information is not available from an operating system utility, some part of the local agent could maintain the information. E.g., the daemon could maintain the information in shared storage.

Local library 1001 is activated upon receiving a call from the central manager. A timer is set upon the receipt of the call, and reset every time another call is received. If the timer times out without receiving a call during the timeout period, (currently two minutes), the local library thread of execution dies, and its local data disappears. In order to keep the library continuously running and avoid the need to restart it, the central manager normally sends an LL__GetAttr request at intervals of about 1 minute, requesting event counts. This request also lets the manager know if there has been any change in event counts which might indicate that other action should be taken.

While running, the local library is normally idling while waiting for a request from the central manager. When the request isreceived, the library must parse it to determine how the information will be obtained. There is an action corresponding to each type of request, which may also vary with the parameters of the request. Most information used to satisfy requests is obtained from shared memory 1003, but it may also be obtained from ssaraid facility 1012, ODM facility 1010, or directly from an adapter itself. The requested information might be read directly from data records (e.g., from shared memory), or it might involve an exchange of communications between the library and the adapter. For example, a LL__Gettr request, which requests attribute information, is handled by calling the ssaraid facility 1012 if the requested attribute is a RAID-related attribute, but the same request is handled by retrieving information in shared memory 1003 if the requested attribute is an event count. The local library must also determine in which data structure and location the information can be found. The requested attribute may, for example, be located in one place for a disk and another for an adapter.

Finally, some requests contain "wild cards" which may be used in place of specific parameters of the request.

Figure 11:
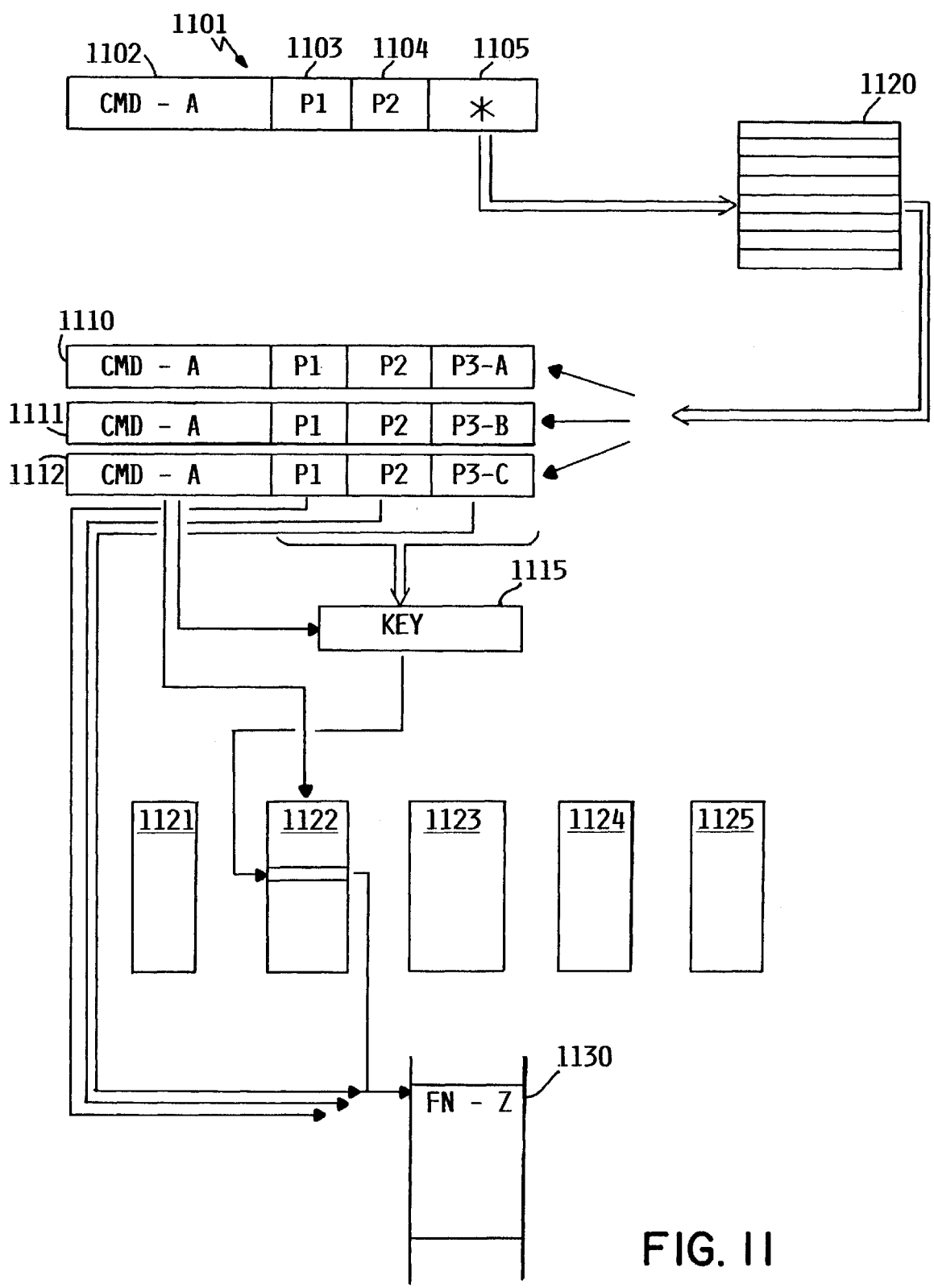
FIG. 11 illustrates how a request received by the local agent is decoded to access the proper functional code sequence for servicing the request, in accordance with the preferred embodiment.

The process whereby the local library determines how to service a request is shown diagrammatically in FIG. 11. A request received from the central manager is represented generically as 1101. This request contains a command field 1102 identifying the type of request, and multiple parameter fields 1103, 1104, 1105 containing the parameters of the request, it being understood that the number of parameters may vary. A parameter may contain a wild card. In the example of FIG. 11, parameter field 1105 contains a wild card parameter. The local library initially expands all wild card parameters by looking in wild card table 1120 for any entry corresponding to the field, command, or other parameters. In the preferred embodiment, the wild card table is fairly small, and therefore sophisticated indexing (such as hashing, binary tree search, etc) is not necessary. Each entry in wild card table 1120 contains a list of the parameters to which the wild card is expanded. The local library uses this list to convert the original request into a series of requests 1110, 1111, 1112, one corresponding to each parameter on the list, by replacing the original wild card with a respective list entry from wild card table 1120.

The local library then processes each of the series of requests 1110, 1111, 1112 (or the original request if there were no wild cards in it) by generating a hash key 1115 from certain request parameters, and using this key to access one of hash tables 1121, 1122, 1123, 1124, or 1125. The library contains five hash tables, each corresponding to one or more types of requests. Specifically, these tables are:

Attribute Table
Primary Connection Table
List Resources Table
List Connection Table
Connection Details Table The type of command (not its parameters) determines the table to be accessed, as depicted in FIG. 11.

Each entry in one of hash tables 1121–1125 contains a set of input parameters and a pair of function pointers. The first function pointer points to a function used to read the requested information; the second function pointer points to a function used to write the information. This design includes the flexibility to read or write any data, although in general, one of the function pointers is null, since most information is either read or written, but not both.

A hash key for accessing one of hash tables 1121–1125 is generated from the parameters of the request. The hash key function for each respective table is listed below:

Attribute Table:
  Key=(int(TechCode)+int(MajorType)+int(AttrName)*int (RDE __EndStop) mod TableSize
Primay Connection Table, List Connection Table, or Connection Details Table:
  Key=((int(FromTechCode)+int(FromMajorType))*int (TC__EndStop)*int(RT__EndStop)+int(ToTechCode)+ int(ToMajorType)) mod TableSize
List Resources Table:
  Key=(int(TechCode)*int(TC__EndStop)+int(MajorType) *3) mod TableSize
Where:
  int(TechCode), int(FromTechCode), int(ToTechCode) are the Technology Codes converted from enumerated values to integers for the specified parameter, the source device, or the target device, respectively;
  int(MajorType), int(FromMajorType), int(ToMajorType) are the Major Type converted from enumerated values to integers for the specified parameter, the source device, or the target device, respectively;

int(AttrName) is the Attribute Name converted from an enumerated value to an integer;

int(TC_EndStop), int(RT_EndStop), int(RDE_EndStop) represent the number of possible enumerated values of TechCode, MajorType and AttrName, respectively; and TableSize is the modulus of the hash key, currently set at 100.

The hash key indexes an entry in the appropriate hash table. Because a hash key is not necessarily unique, this entry will not always be the desired entry. The input parameters of the entry are compared to the input parameters of the request 1112. If they do not match, each subsequent entry in the hash table is compared until a match is found. Due to the granularity of the hash key, typically no more than a few compares are necessary to find the correct entry. The function pointer in this entry contains a pointer to the function which services the request 1130. It will be observed that it is possible for multiple hash table entries to point to the same function. This function is invoked, passing the parameters in request 1112.

In would alternatively be possible to hard code the access to different functions or procedures by means of a series of "Case" statements or other branching constructs supported in the progr ming language being used. However, the sheer number of possible functions supported by the local agent and the need to make provision for future alterations makes such a structure unwieldy. The use of hash tables to access function pointers, as described above, is easier to maintain and rapid to execute.

While shared memory is depicted as a single block 1003 in FIG. 10, its structure and operation are actually somewhat more complex. Daemon 1002 needs to be able to update a configuration record synchronously with local library 1001 reading configuration information. Therefore, there are actually three repositories of configuration information, one local to the local library, one local to the daemon, and one shared.

Network daemon 1002 is free to update its local copy of configuration information at any time. This enables it to run at fill speed, which is essential, since it handles live synchronous events (interrupts) from hardware. Only when it has a complete and consistent set of information does it attempt to update shared memory 1003 to the latest version, having first obtained a wite-lock semaphore. If the write-lock semaphore is unavailable, the network daemon continues to run unhindered, preparing the next version of the configuration information. Since the network daemon is not suspended when the write-lock is unavailable, it can keep records of events/interrupts, so that information is not lost when the daemon is unable to write the information to shared memory owing to a failure to obtain a write-lock semaphore. (Ibe usual reason for being unable to obtain a write-lock semaphore is that the network daemon has tried to obtain it at the very instant that the local library is already reading shared memory, having engaged a read-lock semaphore.) Since both daemons have their own local copies of the configuration information, the only time the use the semaphores is during the brief instants that it take to read or write shared memory. For the majority of the time, each works on its own copy of the information.

The local library is free to access its local copy of the data, completely unhindered by whatever updates may be available in shared memory. I.e., it can access the local copy many different times over a period of several seconds, knowing that the information at the last access is consistent with the information at the first. When the local library is at a suitable point in its function to request any current configuration information (usually at the start of a major function call such as LL_ListResources), it obtains a read-lock semaphore, and reads in the latest information from shared memory. Since it has the read-lock semaphore, it is guaranteed that the network daemon cannot update shared memory while the local library is tying to read it If the local library is unable to obtain the read-lock, it sleeps for a very short period, then tries again.

FIGS. 12A through 12C illustrate the major data structures held in shared memory 1003. FIG. 12A shows the overall structure of topology information in shared memory. This includes header block 1201, a collection of adapter records 1202, a collection of SSA node records 1203, hash table for device universal identifiers 1204, and table of string number universal identifiers 1205. Header block 1201 defines the memory allocation for shared memory 1003 and includes certain additional information such as the process ID of the network daemon. Hash table 1204 is used for rapid (semi-random) access to a particular SSA node record in collection 1203, as explained below. String table 1205 is used to store the universal identifier of strings of devices (as used here, "string" means an SSA bus, and includes a closed string, or loop, topology).

The bulk of topology information is contained in collections 1202 and 1203. Adapter collection 1202 contains one adapter record 1220 for each adapter located in the host system containing the local agent. SSA node collection 1203 contains one SSA node record 1250 for each SSA node on a SSA bus attached to an adapter in the same host system. The adapter itself is represented by two SSA node records, since an adapter has two pairs of ports (may be attached to two separate SSA buses).

FIG. 12B shows the structure of an adapter record 1220. Adapter record 1220 contains the following fields. Adapter name field 1221 identifies the adapter's name as known to ODM 1010. Adapter UID field 1222 contains the universal identifier of the adapter. Adapter serial number field 1223 contains the hardware serial number of the adapter. Smart adapter flag 1224 indicates whether the adapter is type "F" (smart adapter) or type "M". Adapter node number field 1225 contains an identifier used by the SSA device driver in accessing the adapter. Bus number field 1226 contains the host bus number on which the adapter is located. Slot number field 1227 contains the physical slot number within the host bus where the adapter is located. Daughter number field 1228 contains an identifier of a daughter board in which the adapter is located, if mounted on a daughter board. Partner number field 1229 is used to identity another adapter ("partner") on the same string. SIC A SSA Nodes pointer field 1230 contains a pointer to the SSA node record 1250 for the first pair of ports on this adapter known as SIC A). Port1 length field 1231 and port2 length field 1232 contain respectively the lengths of the string of devices attached to port 1 of SIC A and port 2 of SIC A; where this string is a closed string (loop), the value in port2 field 1232 is set to −1, and port1 field 1230 reflects the actual number of devices on this string. Additionally, loop flag field 1238 is set in this case. Topology version field 1234, logical version field 1235, and error version field 1236 are version counter fields for topology events, logical events, and error events, respectively. Change count field 1233 changes whenever any of fields 1234–1236 changes, indicating that an event has occurred. Need rescan field 1237 is used to indicate that the string should be re-analyzed as a result of some event Using List_SSANode field 1239 is a flag to indicate whether the List_SSANode function may be called for this SSA bus; this function is only available on type "F" adapters in which the configuration is legal. PosUncertain field 1240 is a flag to indicate that the position of the adapter within the string of devices is uncertain; this is true only in rare cases. A separate copy of fields 1230–1240 exists for the SIC B pair of ports.

FIG. 12C shows the structure of a SSA node record 1250. SSA node records are organized as a doubly linked list of records in hash index order. I.e., a hash index number for each SSA node record 1250 is computed from the lower order digits of the device universal identifier, and records are inserted into the list at the appropriate ordered location. Previous hash entry field 1251 and next hash entry field 1252 contain pointers to the previous and next SSA node record, respectively. If a specific device is to be accessed, its hash table index can be readily computed, and hash table 1204 used to obtain a pointer to a SSA node record having the same hash index. If this is not the desired record, the chain of next hash entry pointers 1252 is followed until the desired record is found. This is much faster than traversing the entire list of SSA node records (which may be very large) every time a record is to be accessed. Old unused SSA node records are placed on a separate free list, which is a singly linked list, for recycling should a new record be needed. Next free entry field 1257 contains a pointer to the next device on the free list if the record is on the free list. In use flag 1260 indicates whether a SSA node record is currently in use (i.e., on the doubly linked list of active records).

String number field 1256 contains an index to a value in string table 1205. The value in table 1205 is the universal identifier of the device in the same SSA bus (string) having the lowest universal identifier. This value is used to uniquely identify an SSA bus. Because this value is subject to change if devices should be added to or removed from the SSA bus, the SSA node record contains an index to table 1205, where the universal identifier for the string resides. Thus, if a device is added or removed causing the lowest number UID to change, it is only necessary to change the value in string table 1205, without changing each individual SSA node record.

Device UID field 1253 contains the universal identifier of the device at this SSA node. Device type field 1254 contains the type of device. UID is valid 1255 is a flag indicating whether the value in field 1253 is valid; in the case of unknown devices, the network daemon will create a fictitious identifier to distinguish the unknown device record from other records. This adapter-number field 1258 contains an index to an adapter record for an adapter connected to the same SSA bus. Where multiple adapters are connected to the same SSA bus, the daemon arbitrarily chooses one. Field 1258 is used to access the device through an adapter, so if there are multiple adapters, it doesn't matter which one is used. This network index field 1259 specifies which pair of ports (SSA bus) on the adapter is connected to the device. Reserved field 1262 is not used. Total ports nuimer field 1263 contains the number of ports on this device; this allows for future accommodation of storage devices having more than two ports. Error event time field 1264 indicates when this SSA node last reported an error event.

Map coordinate fields 1266–1269 are used only in diagnostic mode, for displaying a direct map of the network as seen by the network daemon, without intermediate alteration of data by the central manager. The Map position uncertain field 1265 is similarly used in diagnostic mode to indicate uncertainty in map position.

Port1 next device index field 1270 and port2 next device index field 1271 contain pointers to the SSA node record of devices attached to port1 and port 2 respectively of the current device. Port1 next device port field 1272 and port2 next device port field 1273 indicate which port number on the next device is attached to port 1 and port 2 respectively of the current device. In some cases (specifically, where type "M" adapters are used), the daemon is unable to determine which port numbers are used. In this case, port numbers are arbitrarily assumed for purposes of entering data in fields 1271–1274, and port uncertain flag 1261 is set to indicate that the daemon really doesn't know which ports are being used.

It will be observed that the data structures can be easily expanded to accommodate devices having different numbers of ports, by addition of another substructure containing fields 1230–1240 (in the case of an adapter serving more than two SSA buses) or 1270 and 1272 (in the case of a disk or other device at an SSA node).

Like the local library, network daemon 1002 operates on a timed life cycle. Specifically, shared memory 1003 is available to local library 1001 only when network daemon 1002 is active. If local library 1001 needs to access the data in shared memory 1003 and network daemon 1002 is inactive, local library 1001 starts the network daemon via a UNIX fork() & exec() operation. It then waits a predetermined time, and retries the access to shared memory. Upon sing the network daemon, a UNIX alarm() function time is started. The timeout period is preferably 15 minutes. However, local library 1001 also sends the network daemon a signal via the UNIX signal() function whenever local library accesses data in shared memory 1003. Upon receipt of this signal, the network daemon resets the alarm timer to the full original timeout period. The expiration of the timeout period causes a timer signal to shut down the network daemon. Upon receipt of this signal, the network daemon self-terminates, removing its data from shared memory 1003. Thus, the network daemon will remain active so long as the data in shared memory 1003 is accessed at intervals of less than 15 minutes.

While network daemon 1002 is active, it periodically checks the configuration of all networks attached to the host in which the daemon is located It initially obtains a listing of all adapters in the host (via an odm_get_list call to ODM 1010), and establishes the topology information repository in shared memory 1003. It then analyzes the topology of the network(s) attached to the listed adapters, and updates the topology information repository in shared memory 1003. The daemon then idles for a period, at the end of which it wakes up, checks for events and re-analyzes the network as necessary, and then updates the data in shared memory again. It continues to idle and re-check the network at periodic intervals. The period may be specified by a user, and is typically 10 seconds. It will be observed that the network daemon has no knowledge of how devices are grouped in management sets; it simply-obtains information for all devices attached to its host, and stores this in shared memory 1003.

The complexity of configuration analysis performed by daemon 1002 depends greatly on the type of adapter and network configuration. Certain controllers have more advanced capabilities. The network daemon of the preferred embodiment currently supports controllers of two basic types (designated type "M" adapters and type "F" adapters), it being understood that additional types having other capabilities could be supported. Type "F" adapters have more advanced function than type "M" adapters. Specifically, a type "F" adapter is able to determine the identity and position of all devices attached to it via a network (assuming the network is a "legal" configuration, i.e., configured according to certain pre-established rules). A type "M" adapter will not be able to determine the identity of other controllers in the same network, although it may know that there is a device of unknown type at the location.

The simplest case of configuration analysis performed by daemon 1002 is a legal network configuration attached to a type "F" adapter. In this case, the network daemon issues a List_SSANodes call to the adapter to list all devices visible to it. The adapter responds with a complete list of devices on the network, including device identifiers and position information. The network daemon then formats this information according to the format described above and stores it in shared memory 1003.

A user can easily create an "illegal" network configuration. E.g., the number of devices in a loop or string may exceed a pre-determined threshold, or cross-connecting of two separate networks on a single adapter. Such configurations, because they violate established configuration "rules", will cause the configuration record in the "F" adapter to be incomplete. The network daemon therefore "walks" the network, one node at a time, to determine the actual configuration. I.e., the network daemon issues transactions to the adapter to determine if there is a device connected to a particular port of the last known device, and if so, it attempts to analyze that new device. As it walks the network, it records which port of a device it "came in on", then uses the other port to continue its analysis if possible. For example, if an adapter connects to a disk via that disk's port 1, then the network daemon will examine the disk's port 2 for further devices. It repeats this process until it either runs out of devices (reaches the end of a string), or returns to the original adapter (loop). When "walking" the network, the daemon first examines the voltage at certain port pins to determine whether there is a device connected to the port, and only if the voltage indicates something connected, it sends a message to the connected device. It does this in order to avoid sending messages to non-existent devices, which could trigger extensive and time consuming diagnostics.

Where a network is attached to a type "M" adapter, the process is substantially different. Network daemon 1002 issues a call to the adapter to list all devices visible to it. This list will not necessarily be complete, since disks that are not ready or other adapters will not be visible. For each device found, the daemon issues another call to the adapter, to determine the device's hop count from each port of the adapter. A device with a hop count from each port of a pair is in a loop, whereas a device with only one hop count is in a string topology. After collecting all this information, it may be deduced that where there are missing hop counts, there are devices of unknown type. The network daemon then builds an internal map of reported devices. Devices represented as unknown type are included in the table where there are hop count gaps. Note that in some cases a hop count gap will not be apparent to the "M" adapter or its local agent. I.e., where an adapter in another host is at the end of a string, no gap will appear. Only the central manager is capable of resolving this topology, if it knows about all hosts..

If multiple "M" adapters in the host of the local agent are attached to a single network, each adapter will be unable to determine the identity of the other (although it may know there is something at the position in the SSA network of the other adapter). The daemon must resolve the identities of these adapters to obtain as comprehensive a view of the network as possible, even though the daemon will not be able to determine the identity of "M" adapters located in other hosts.

Figure 13:
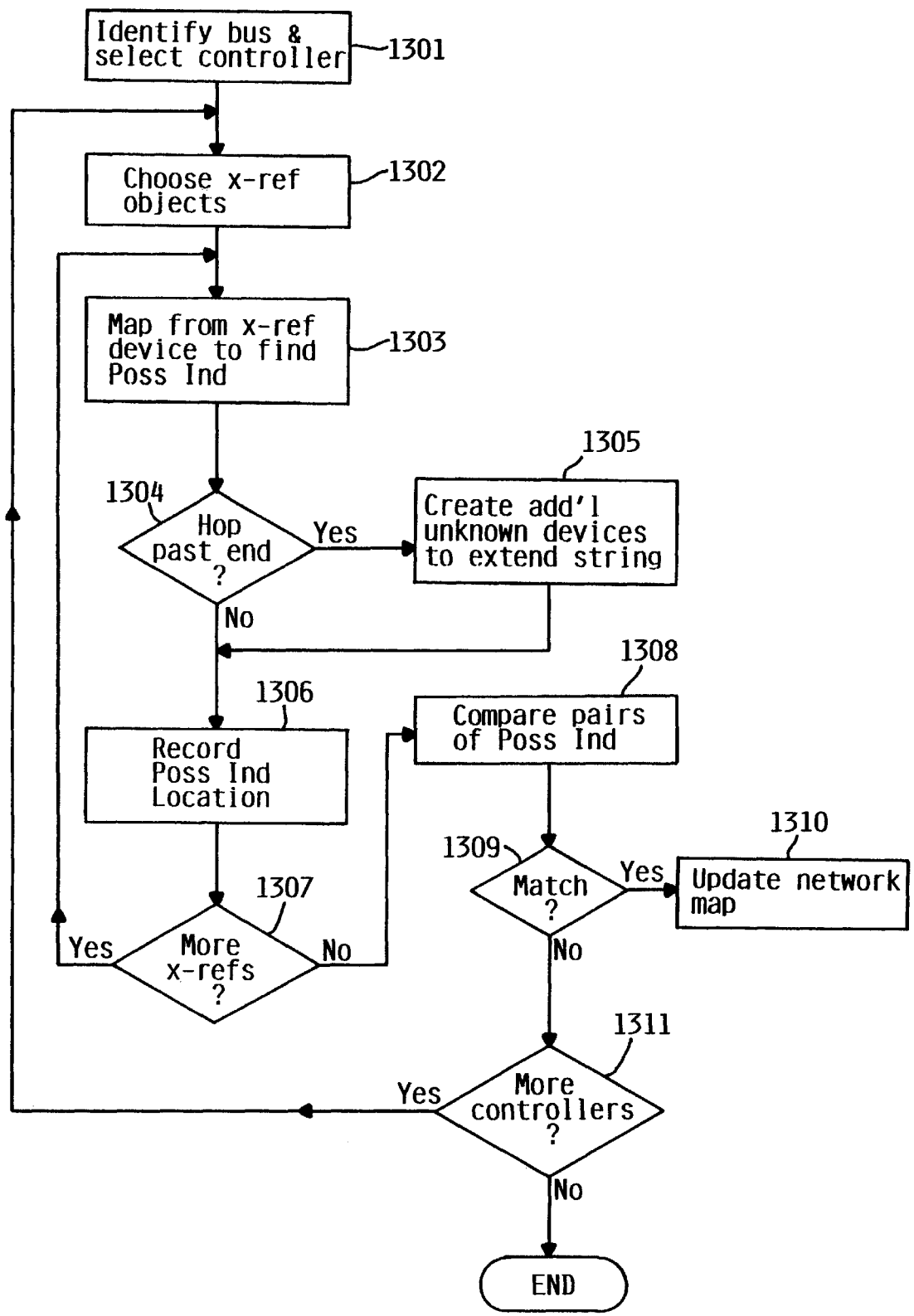
FIG. 13 is a flow diagram illustrating the process within the network daemon of resolving multiple unknown controllers.connected to the same host, according to the preferred embodiment.

This resolution process is depicted in FIG. 13. Initially, each controller ("M" adapter) is analyzed as described above to create a network map as seen by that controller. If there is a SSA bus to which multiple "M" adapters are attached, i.e., the bus identifier is the same, then a first (base) controller ("M" adapter) is arbitrarily chosen from among the multiple controllers on the bus (step 1301). The network map as seen by the first controller may have one or more gaps representing locations where other controllers may be located.

The daemon then selects another controller, and analyzes that controller's view of the bus. The daemon selects a pair of devices to serve as cross-reference objects (step 1302). These must be devices of a type which will respond to "M" adapters, i.e., disk drives. Preferably, the daemon selects one device on either side of the selected controller. I.e., starting from one port on the controller, it hops along the network until it finds such a device, and does the same for the other network port of the controller. If it is not possible to find a device on either side of the selected controller, two different devices on the same side (reachable from the same port) of the controller are selected. This may occur, for example, where the network is a string instead of a loop, and the controller is at the end of the string. A cross reference object data structure is created for each of the pair of devices, which contains the hop count from the selected controller, and two "PossibleInd" pointers indicating possible locations of the controller.

Referring to the network map derived from the base controller, the daemon finds the location of a selected cross-reference device, and hops from this location the "hop count" to some network location (step 1303). This location (which may be a gap, or may be a device) is one of the "PossibleInd" locations, and is entered in the appropriate data structure (step 1306). In hopping along the network, it is possible to hop past the end of the network (i.e., a network in a string configuration). If this occurs (step 1304), additional gaps are added to the end of the network map, to represent devices of unknown type (step 1305). The daemon repeats this process for each direction (two) of each cross-reference object (two), a total of four repetitions (step 1307).

When all four "PossibleInd" locations have been determined, the daemon compares the two in one cross-reference object with the two in another (step 1308). If there is a match (step 1309), then this "gap" is the correct location of the selected controller, and the network map of the first controller is resolved to reflect this fact (step 1310). If there are additional controllers in this network and in the local agent's host, the process repeats until all such controllers have been analyzed (step 1311).

In the initial information gathering phase, the network daemon created separate sets of information for each adapter. Once the unknowns are resolved as described above (i.e., two adapters on the same network), one set of information will be deleted as duplicative, and the originally unknown device in the other network will be edited to include all the adapter information from the deleted set.

Referring to the example storage network of FIG. 1, this process will be described as performed by the network daemon within host 111. At step 1301, the daemon initially selects controller 130 (C130) as its base, and builds the following network map as seen by C130:

C130-D120-D121-D122-D123-D124-gap1-gap2-D129-D128-D127-D126-D125-gap3—

This network is actually a loop, gap3 connecting back to C130. At step 1302, the daemon selects C131 and identifies two cross reference devices, one on either side of C131. The nearest devices are D125 and D120, which are selected. The following cross reference object data structures are created:

| X-ref I | X-ref II |
|---|---|
| DiskHop: 0 | DiskHop: 1 |
| DiskID: D125 | DiskID: D120 |
| PossInd1: | PossInd1: |
| PossInd2: | PossInd2: |

A "hop count" of 0 means the immediately adjacent device, while a hop count of 1 indicates one device is skipped. At steps 1303–1307, the daemon hops from each of the cross-reference devices on the network map to obtain the PossInd values. E.g., starting from D125, it hops 0 times (adjacent device) in one direction to find D126. This is one of the PossInd values. It then hops 0 times in the opposite direction to find gap3. This process is repeated for the other cross-reference device. Because this example is a loop configuration, the "Yes" branch from step 1304 is never taken. When the "No" branch from step 1307 is taken, the cross-reference objects contain the following data:

| X-ref I | X-ref II |
|---|---|
| DiskHop: 0 | DiskHop: 1 |
| DiskID: D125 | DiskID: D120 |
| PossInd1: D126 | PossInd1: gap3 |
| PossInd2: gap3 | PossInd2: D122 |

The daemon then compares the PossInd fields and finds a match, namely, gap3 (step 1308, 1309). The daemon therefore concludes that gap3 is the proper location for C131, and the map is updated as follows (step 1310):

C130-D120-D121-D122-D123-D124-gap1-gap2-D129-D128-D127-D126-D125-C131—

There are no more controllers in host 111 (step 1311), so the process ends. Because controllers C132 and C133 are in different hosts, and in our example these are type "M" adapters which do not provide identifying information across the storage network, it is not possible for the daemon in host 111 to identify these. The resolution of the complete network must be performed by the central manager, as described more fully below.

V. The User Interface

The storage management program of the preferred embodiment is intended to make network management easier for the user. The user interacts directly with the central manager, and not the local agents. Local agents are primarily source of data for the manager, and do not display information directly to the user on display screens or other output devices residing in the various host systems of which they are a part.

The manager presents the user with a virtual canvas. The canvas provides a graphical representation of one or more storage networks in a "management set". The user can then perform various actions by selecting or manipulating objects on the canvas, using any conventional input device such as a mouse or keyboard.

The two major modes of operation of the manager are a planning mode and a monitoring mode (also known as a "live" mode). The main difference between these two modes is that the planning mode deals with hypothetical devices, while the monitoring mode represents actual devices which are determined by the management program automatically through a discover operation, i.e. by gathering information from various local agents and using it to form a coherent view of the storage network(s) in the management set (as described more fully below).

In the planning mode, a user can plan the configuration of one or more storage networks using the interactive virtual canvas. The user selects icons to create devices to be configured in the network, then selects connections to specify the topology of connections. At each step of the hypothetical configuration, the manager automatically determines possible connections for the next step and highlights these for the benefit of the user. The user may edit the configuration by adding, deleting or moving devices and connections, and may save the configuration. The user may begin a planning mode of operation with a blank canvas, with an existing saved configuration, or with an actual network configuration determined by a discover operation. The planning mode of operation is described in greater detail in related commonly assigned co-pending application Ser. No. 08/962,201, filed Oct. 31, 1997, by Gary T. Axberg et al., entitled "Storage Network Management Mechanism".

In the monitoring mode, the manager displays an actual configuration of one or more storage networks on the interactive canvas The actual configuration is initially obtained using an automated discover operation, although the graphical representation of the configuration may subsequently be modified in certain respects by the user.

Figure 14:
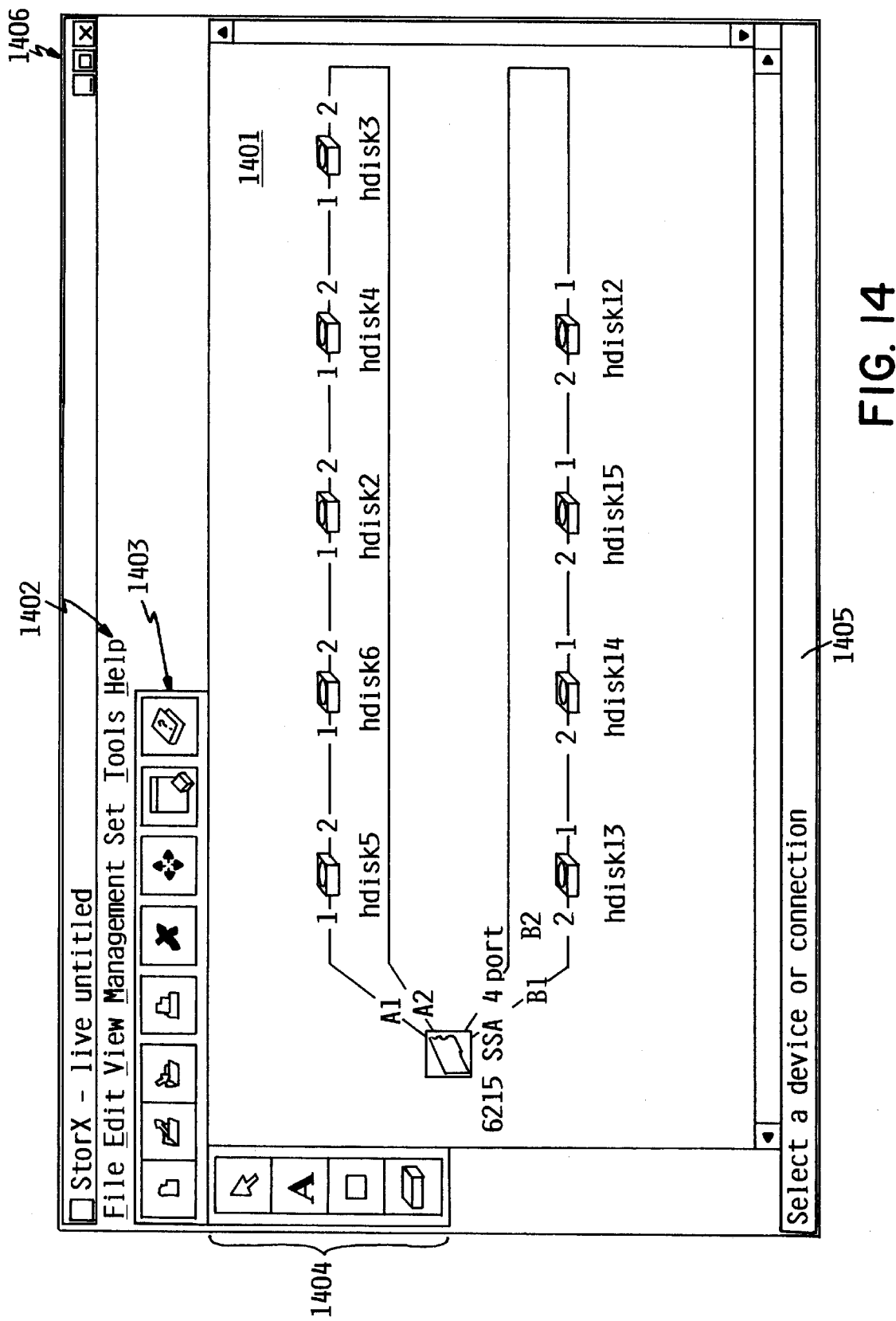
FIG. 14 illustrates the appearance of the display screen during the monitoring mode of operation of the storage network manager for an example storage network configuration, according to the preferred embodiment.

FIG. 14 illustrates the appearance of the display screen during the monitoring mode of operation for an example storage network configuration. In reality, the management program appears in a window which may occupy less than the full area of a display screen, but it is shown in FIG. 14 as the full screen for clarity. The management program main window includes a canvas area 1401 for displaying one or more storage networks, a menu bar 1402 for activating various pull-down menus, toolbar 1403 for certain frequently used functions, and a parts palette 1404 for components that can be used to embellish the view of a storage network on the canvas. The window further includes information area 1405 for displaying status information or help text for specific functions, and event status indicator 1406 which indicates whether events have occurred which may have changed the status or configuration of devices.

Menu bar 1402 contains the following choices: File, Edit, View, Management Set, Tools, and Help.

Selecting "File" causes the File pull-down menu to appear, containing the following choices: New, Open, Close, Save, Save As . . . , Merge, Auto Discover on Open, Management Set Properties, Export, Print, Report and Exit. The "New" option is used to create a new management set. The user will be prompted with a secondary window for selecting host systems for the new management set. Hosts may be selected from a list of previously known hosts, or new hosts can be specified. A discover operation takes place after the user selects the hosts. The "Open" option is used to select a previously created and saved management set for display and monitoring. The "Close" option is used to close the management set, clearing the event log and the canvas. The "Save" and "Save As . . . " options are used to save a management set (under either its current name or a different name). The "Merge" option is used to select a management set from among those saved to be merged with the current management set. The "Auto Discover on Open" option will automatically perform a refresh discovery on an "Open" to insure that the actual devices match the information in the opened file. The "Management Set" option allows the user to view and change the properties of either the default management set (for creating new management sets) or the current management set. Management set properties include the name of the set, default types of devices, interval for polling the agents, and other information. Properties also include whether various viewing options are enabled for displaying devices on the canvas; e.g., the user can specify whether port labels be displayed, whether storage device capacity, type, and other information be displayed, etc (Even with these options off, it is possible to view the information by selecting a device and view its properties). The "Export" and "Print" options are used to output the visual image on the canvas to a file or a printer, respectively. The "Report" option will generate a file that contains tables of the device information. This file can be loaded into a database or spreadsheet. The "Exit" option is used to exit the storage management program Selecting "Edit" causes the Edit pull-down menu to appear, containing the following choices: Delete, Delete Missing, Layout, and Clear Changes. The "Delete" option is used to remove selected items from the management set. The "Delete Missing" option is used to remove items marked "missing" from a management set. The "Layout" option is used to reposition devices, connections and annotations. The "Clear Changes" option resets the mark indicator for event arrival, so that subsequent events can be flagged.

Selecting "View" causes the View pull-down menu to appear, containing the following choices: Pan to . . . , Show Page Boundaries, Snap, Grid, Show Parts Palette, and Show Toolbar. The "Pan to . . . " option first displays the entire contents of the canvas (management set), shrinking devices proportionately as required to fit; this may mean that annotations can no longer be read A mouse click on any location then pans to that location on the canvas. The "Show Page Boundaries" is a toggle key function for showing how the canvas will be broken into multiple pages for printing. The "Snap" option is also a toggle key for aligning subsequently added or selected objects with a canvas grid. The "Grid" option is a toggle key for displaying the canvas grid. The "Show Parts Palette" option is a toggle key for displaying the parts palette. The "Show Toolbar" option is a toggle key for displaying the toolbar.

Selecting "Management Set" causes the Management Set pull-down menu to appear, containing the following options: Refresh Storage Networks, Discover Storage Networks, Hosts, and Storage Networks Navigator. The "Hosts" option allows the user to view, add or delete hosts from the current management set. The "Storage Networks Navigator" option allows the user to view the list of storage networks in the current management set, and optionally view storage network properties, such as lists of hosts or logical disks in the network. It also allows the user to set whether a network is visible or hidden on the canvas.

The "Refresh" and "Discover" options are used to invoke an automated determination of storage network configuration, wherein the manager requests necessary information from the various local agents. "Refresh" is used to verify and update the storage networks in the current management set which were previously discovered, while "Discover" is used to add new storage networks to the current management set. The ability to automatically determine the configuration of one or more storage networks in the management set is a key feature of the storage management program. While it is simple to invoke this function from the user's standpoint, the operations performed by the manager and agents in order to determine network configuration are complex, and are explained in greater detail below.

Selecting the "Tools" option causes the Tools pull-down menu to appear, containing the single option "Event Monitor". The Event Monitor displays a secondary window containing a listing of events which have occurred in the storage networks of the current management set, showing time and type of event.

Selecting the "Help" option causes the Help pull-down menu to appear, containing the options Help Index, General Help, Using Help, Getting Started, and About StorX. These options give the user information about the storage management program and help in using the program.

Toolbar 1403 contains a series of icons which are selectable with a pointing device such as a mouse. Selecting such an icon is an alternate path to one of the options listed above, available from menu bar 1402. The toolbar icons represent the following options: New (from the File menu), Open (from the File menu), Save (From the File menu), Print (from the File menu), Delete (from the Edit menu), Pan to . . . (from the View menu), Event Monitor (from the Tools menu), and Help.

Parts palette 1404 also contains icons selectable with a pointing device. In live mode, these icons represent Select, Text Annotation and Box Annotation. Selecting either the "Text Annotation" or "Box Annotation" icon puts the user in the corresponding mode of operation, allowing the user to add the appropriate annotation to the canvas at a user selectable location. Selecting the "Select" icon puts the user in "Select" mode, wherein any device on the canvas may be selected. Selecting a device then causes a corresponding pop-up menu to appear, allowing the user to perform certain operations with respect to the device. These operations vary depending on the object selected, but generally the user may view or alter device properties (attributes), or delete a device. Selecting the Enclosure Icon will put the use in a mode allowing enclosures to be manually added to the canvas. The user can then manually add previously discovered devices to the enclosure by dragging the device to the enclosure. Additional parts palette icons are presented in plan mode, permitting the user to add devices.

VI. Determining Network Configuration

The management program has the capability to automatically determine the configuration of storage networks in the management set. This is sometimes referred to as a "discover" operation, although determining network configuration includes both the user selectable options "Refresh" and "Discover". Both of these options invoke an automated discovery procedure, whereby the central manager requests certain information of the agents located in various hosts in order to determine the configuration of storage networks in the current management set. The difference between "Refresh" and "Discover" is that the former is used for previously discovered networks, and therefore presents its results to the user in slightly different format (i.e., changes to the configuration are highlighted).

The process of determining network configuration may involve several phases. The first phase, common to all discover operations, involves parsing network components to build a list of devices and connections in the network. This is followed by various optional operations, such as a resolution of unknown objects, if any; comparing of results with previous network configuration; creation of new data structures and associations, etc.

Figure 15A:
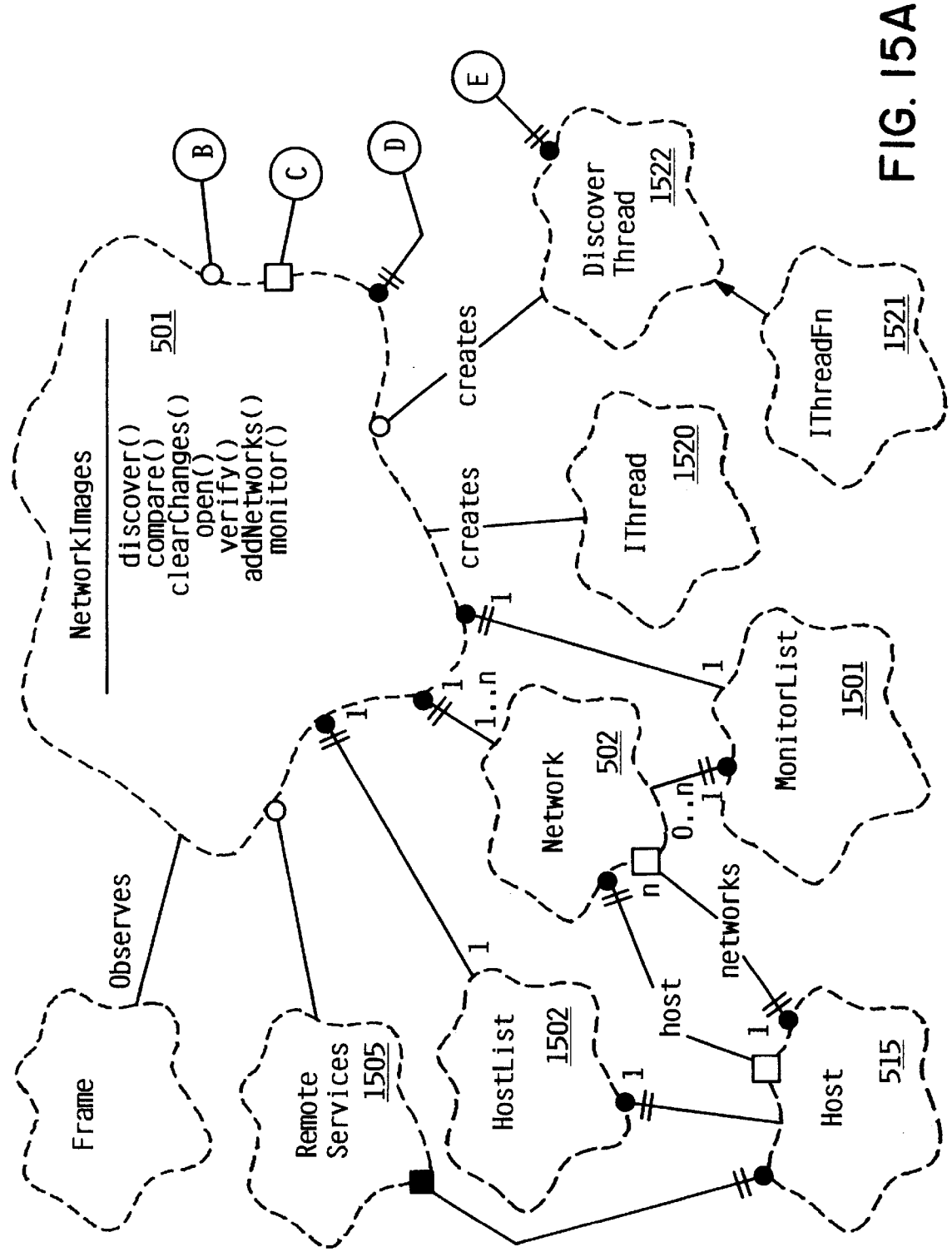
FIG. 15 depicts the relationships among key object classes used in the discover operation.
Figure 15B:
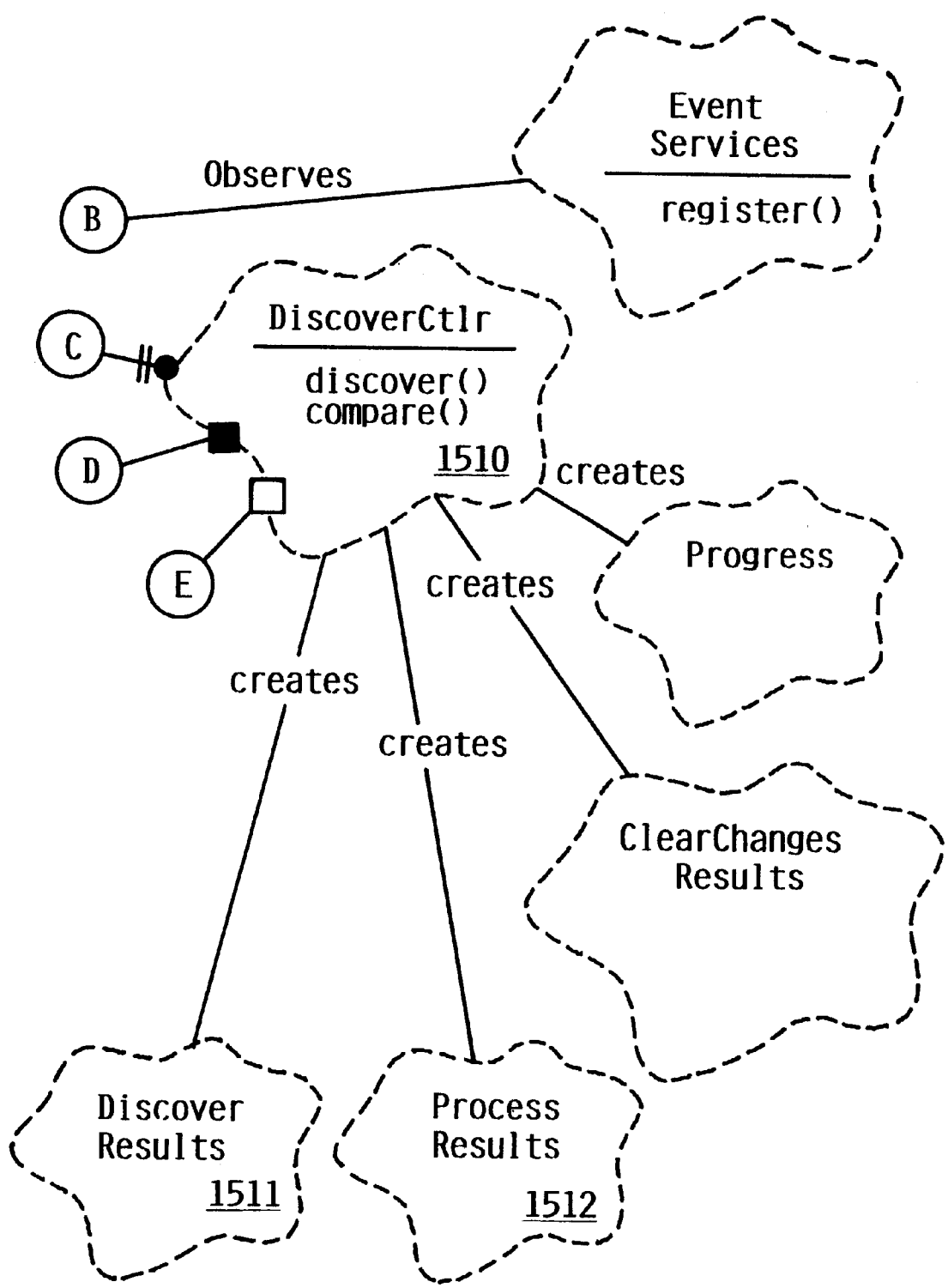

FIG. 15 depicts the relationships among key object classes used in the discover operation. Some of these classes are also shown in FIG. 5, which is a higher diagram of classes used to represent networks.

Newnages 501, as explained previously, is the base object which contains information about the contents of the management set. It contains MonitorList 1501, which is a list of Network objects 502, and HostList 1502, which is a list of Host objects 515, in the management set.

RemoteServices 1505 is an object for performing all remote procedure calls to the local agents. RemoteService "objectizes" data received from the local agents over information processing network 115, i.e. it creates objects contained the returned data for manipulation by the object-based client library.

DiscoverCtlr 1510 controls the discover process. The discover is initiated by invoking the discover( ) method in DiscoverCtlr 1510, passing a list of host systems. DiscoverCtlr creates a DiscoverResults object 1511 and a ProcessResults object 1512. DiscoverResults 1511 contains a collection of objects representing all components that were found as a result of parsing the network; these are not identified with particular networks and device relationships immediately after parsing. ProcessResults 1512 is used during the compare process (after parsing), and contains those objects found during parsing that are not in the current management set. I.e., it contains a subset of the collection in DiscoverResults 1511 consisting of new objects.

IThread 1520 is the Open Class Library implementation of a thread. NetworkImages creates an IThread object for performing the discover operation, and the object is destroyed at the conclusion of the discover. IThreadFn 1521 is an abstract thread functions class, representing secondary threads of execution, created as part of the discover operation. DiscoverThread 1522 is the concrete implementation of IThreadFn which performs the discover. NetworkImages' discover() method creates a DiscoverThread object, which is destroyed after the discover operation concludes.

Parsing the Network Objects

The scope of a discover operation is the management set Normally, a management set is defined by a list of hosts. I.e., a discover is essentially an operation to find all objects connected to any host on a specified list of hosts. It is possible to modify this by excluding certain objects from the scope of a discover operation by putting them on the block list (explained below), even though they are attached to one of the specified hosts. This could be done either because the objects are not intended to be included in the management set, or because, though included in the management set, it is desired to perform the discover on only a portion of the management set (for example, to refresh a part of a management set suspected to have changed).

Figure 16:
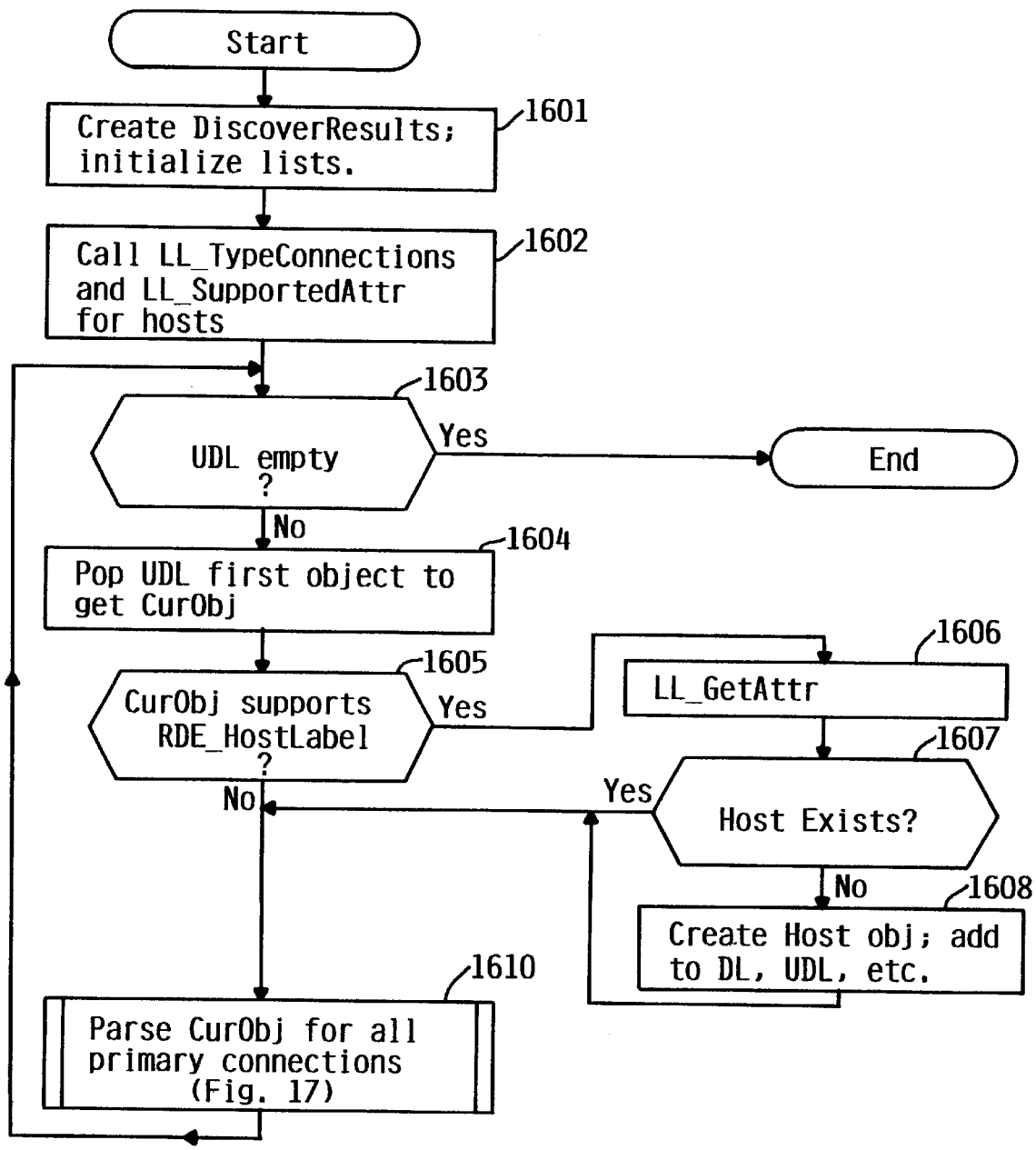
FIGS. 16 and 17 are flow diagrams illustrating the various steps performed by the central manager in parsing a management set to discover the identities and configuration of devices within the set, according to the preferred embodiment.
Figure 17:
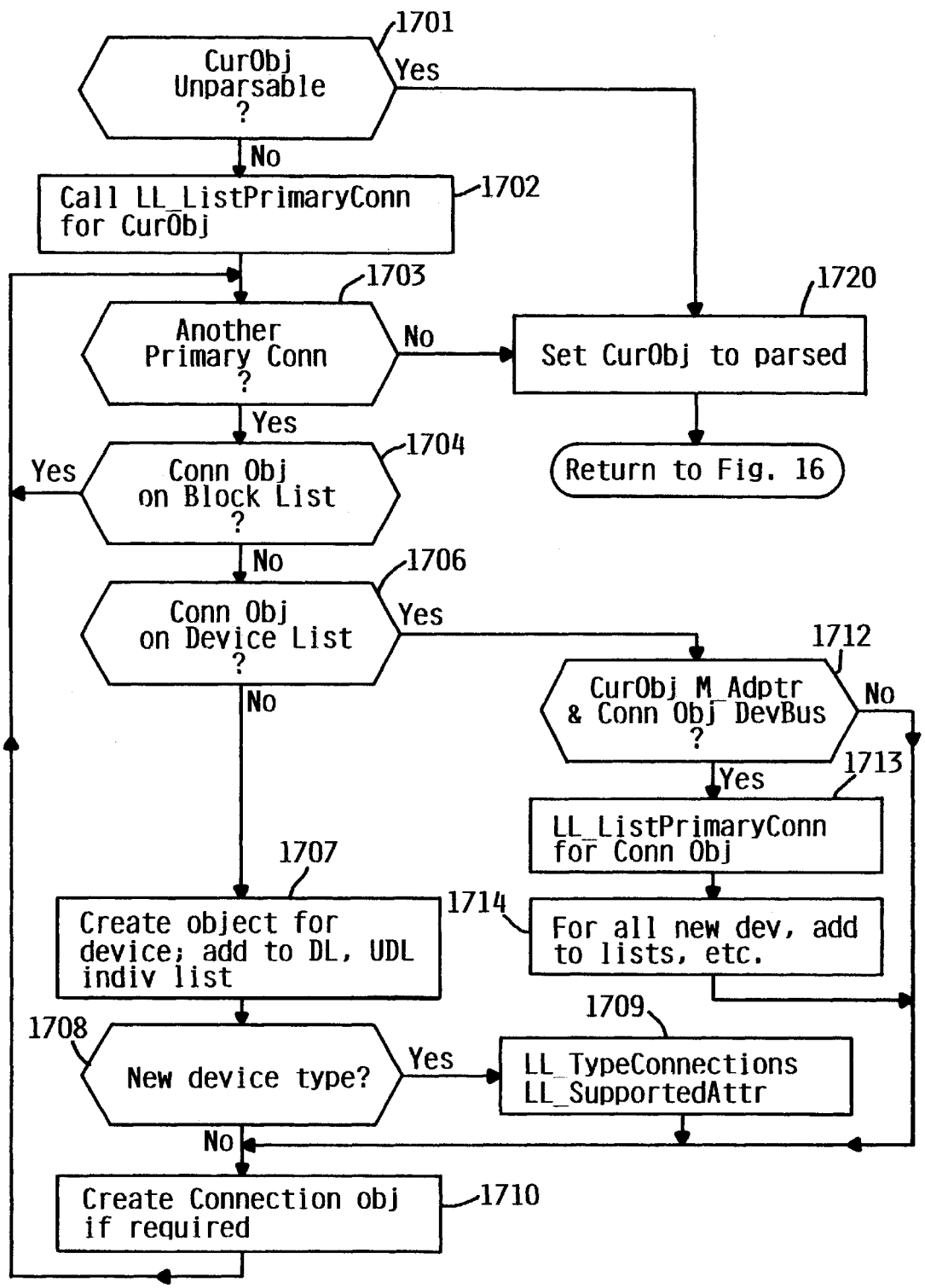

FIGS. 16 and 17 are flowcharts of the various steps performed in parsing a management set As a preliminary matter, it should be explained that DiscoverResults 1511 contains a collection of found objects, and several lists referencing the collection. The contents of these lists at various stages of an example discover operation are shown in FIGS. 20A through 20K. One set of lists is used for processing, and includes: device list (DL) 2001, a list of all devices found; unsearched device list (UDL) 2002, a list of devices found but not yet parsed; and block list (BL) 2004, a list of devices which are not to be parsed. Another set of lists categorizes objects found by type: host 2010, adapter 2011, disk 2012, device bus 2013, host bus 2014, unknown device 2015, and connection 2016. E.g., host list 2010 contains objects of type host 515, disk list 2012 contains objects of type PhysicalDisk 507, etc. Host bus list 2014 contains host bus objects, which are temporary objects for use only by the DiscoverCtlr 1510, and are not later made part of the collection of objects representing the network, as shown in FIG. 5. The list 2010 of host device objects in DiscoverResults 1511 is not to be confused with HostList object 1502, which lists host objects forming a management set. Also shown in FIGS. 20A through 20K is LPC 2003, which is not strictly speaking a list of objects, but represents the list of devices that is returned by the local agent when the host makes a LL_ListPrimaryConnected call to the agent.

The parsing operation is initialized by creating a DiscoverResults object, and initializing certain lists therein with the host objects in the management set at step 1601. I.e., DL 2001 and UDL 2002 are initially set to include these host objects. At the same time, host list 2010 of the set of individual device lists is also initialized with these hosts. The manager then issues a LL_TypeConnections call to the local agent in each host at step 1602, to determine the types of devices which may form primary connections with the host.

The parsing algorithm operates on UDL 2002, parsing each device in turn until no devices are left on the UDL. At step 1603, the manager checks for another device on the UDL, the process terminating if the UDL is empty. If the UDL is not empty, the first object on the UDL is "popped" (removed) from the UDL, this removed device becoming the current object, at step 1604.

If the current object supports the RDE_HostLabel attribute (step 1605), then the attribute must be checked Typically, this attribute is found in certain adapter devices. The reason for this check is to discover hosts which were not on the original host list (not part of the originally specified management set), but which are nevertheless interconnected with the storage network. Some (but not all) types of adapters will respond with identifying information when polled by a different adapter in another host These adapters will contain the RDE_HostLabel attribute, identifying the host within which the adapter resides. By checking this attribute, it is possible to determine whether the host is on host list 2010. This check is performed by issuing a LL_GetAttr command to obtain the RDE_HostLabel attribute at step 1606; comparing the attribute (host name) with the entries on host list 2010 to determine if the host exists at step 1607; and, if not, creating a host object, and adding a reference to this object to DL 2001, UDL 2002, and host list 2010 in the DiscoverResults object, at step 1608.

The steps required to parse the current object are represented generically as block 1610 in FIG. 16, and are broken down into greater detail in FIG. 17. At step 1701, the manager first determines whether the current object requires parsing. I.e., disk storage devices are at the end of the parsing hierarchy, and need not be parsed. If the device is of this type, further processing is by-passed by going directly to step 1720, where the current object is set to "parsed".

The current object is parsed by first issuing a LL_ListPrimaryConn call to the local agent of the appropriate host at step 1702. As explained earlier, the local agent returns a list of devices which form a primary connection with the current object. The manager then parses this list of primary connections. While another primary connection exists (step 1703), the manager processes each connected-to object in turn (steps 1704–1714). The manager checks whether the connected-to object is on the block list 2004 at step 1704. If the object is on the block list, it is not to be included in the current management set, nor is it to be further parsed for objects to include in the management set. Typically, the block list is a list of adapters. Thus, the user may specify a host to be part of the management set, but may selectively exclude certain adapters within that host from the management set. By excluding the adapter, any disks or other devices which attach to the adapter are inherently excluded (unless, of course, they also attach to another adapter which is part of the management set).

If the connected-to object is not on the device list (step 1706), then the manager creates an object of the appropriate type in DiscoverResults to represent the connected-to device and adds it to DL 2001, UDL 2002, and the appropriate individual device type list, at step 1707. In that event, if the connected-to object is of a new device type (step 1708), the manager issues LL_TypeConnections and LL_SupportedAttr calls to the local agent in order to determine the type of priry connections which are possible and the attributes which are supported in the connected-to object, at step 1709. This information will be needed when the connected-to object is itself parsed.

If at step 1706, the connected-to object is on the device list, it is not necessary to execute steps 1707–1709. However, there is a special case, where the current object is a special type of device bus controller (designated "M" adapter) and the connected-to object is a device bus, as shown by the branch at step 1712. A controller of this type can not determine the identity of other controllers on the device bus; at best, it can only determine that there is a device of unknown type at a particular location on the bus. In order to determine the identity of all controllers, it is necessary to request each host to report the devices it can see on the device bus from its controller(s), and to subsequently resolve the results in the manager. The local agent will resolve the identity of multiple controllers on the same SSA bus within the same host, as described more fully above. The device bus will only be added once to the UDL. In order to force the manager to get information from all hosts connected to the device bus, the manager will immediately issue a LL_ListPrimaryConn command for the connected-to object (i.e., the device bus) at step 1713, if the conditions above are met. The manager then creates an object in DiscoverResults for any new devices, adds them to the DL, UDL and appropriate individual list, and creates a Connection object in DiscoverResults to represent the connection to such devices (step 1714). While represented in FIG. 17 as a single step, step 1714 is essentially the same as steps 1703–1710, performed for each device returned by the LL_ListPrimaryConn command in step 1713.

When creating a device object, the manager simultaneously creates an appropriate number of port objects for the device. In the case of unknown objects, two port objects are created An unmknown object may have more ports, but in that case it should appear on multiple buses as multiple unknown objects, to be resolved during the process of resolving unknown devices, described later.

After performing steps 1707–1709 as required, or the branch represented as steps 1712–1714 as required, the manager creates any required Connection object(s) at step 1710. I.e., if the connected-to device is something on an SSA bus such as a storage device, there must be one or two Connection objects representing the binary links to the ports of the connected-to device. If a Connection object has not yet been created, and objects now exist to represent both devices at each end of a binary link, the Connection object is created in step 1710, with links being established to the two objects Such a Connection object is created only if the devices at both ends of the binary link are known. The manager then returns to step 1703 to get the next connected-to object.

When all connected-to objects returned by the LL_ListPrimaryConn call have been processed as described, the current object is set to "parsed" at step 1720, meaning that an appropriate flag in the object is set The manager would then return to step 1603 to consider whether the UDL is now empty. When the UDL is empty, the entire management set has been parsed.

FIGS. 20A through 20J show the contents of DeviceResults lists at various points in a simple example parsing operation. In this example, the network being parsed is that shown in FIG. 1, with the provision that links 141, 142, 146 and 147 have been omitted for clarity, and it is assumed that links 140, 143, 144 and 145 form a single SSA loop.

As shown in FIG. 20A, after initialization (steps 1601 and 1602), DiscoverResults lists DL 2001, UDL 2002 and host devices 2010, contain references to the three host objects which make up the management set.

The manager then sees that the UDL is not empty, and pops the first element on the UDL to become the current object. This element is Host 111 (H111). Host 111 does not support RDE_HostLabel, so the "No" branch is taken from step 1605. Since Host 111 is parsable, the "No" branch is taken from step 1701, and the parse routine of FIG. 17 is performed. The manager calls LL_ListPrimaryConn, specifying Host 111 as the source and all devices of the type returned by the LL_TypeConnections call (made in step 1602) as the desired target. The only primary connection for Host 111 will be its internal bus not shown in FIG. 1, designated B111. The local agent residing in Host 111 returns a list of primary connections containing this single element. The manager then verifies that its internal bus (B111) is not on block list 2004 (step 1704). Since B111 is not on DL 2001 (step 1706), the manager creates an object of type HostBus to represent B111, adding it to DL, UDL and the host bus list 2014 (step 1707). B111 is a new device type because it is the first host bus encountered in parsing the network. Therefore, the manager issued LL_TypeConnections and LL_SupportedAttr calls to the local agent in Host 111 (step 1709), in order to determine the types of devices which may connect to B111. At this point, no further elements remain on the list of elements returned by the local agent in response to the LL_ListPrimaryConn call, so the manager takes the "No" branch from step 1703, and sets H111 to "parsed". The condition of the DiscoverResults lists at this point is shown in FIG. 20B. On the DL, H111 is shown in bold to indicate that it has already been parsed.

The manager then repeats this process for Host 112 and Host 113, causing the respective HostBus objects (designated B112 and B113) to be added to the appropriate lists. The one difference is that on these occasions, step 1709 is by-passed, since the manager already has type information about host buses. In this simplified example, it is assumed that all hosts, busses, controllers, etc., are of the same type; however, this is not necessarily always the case, and it may be required in some circumstances to issue the calls in step 1709 again if the device types are not identical. FIG. 20C shows the condition of the DiscoverResults lists after parsing Host 113.

The manager then pops the first element of UDL 2002 for parsing, i.e., B111 (step 1604). Again, the "No" branches are taken from steps 1605 and 1701, and the LL_ListPrimaryConn call is made to the local agent in Host 111 (step 1702). This call specifies connections of the type returned earlier when the LL_TypeConnections call was made (step 1709) after H111 was found. The local agent will return a list containing three elements: Host 111, Controller 130 (C130), and Controller 131 (C131). These are processed in turn by the manager. Host 111 has already been placed on the lists, so steps 1706, 1712 and 1710 are executed with no action taken Upon analyzing Controller 130, steps 1706–1710 are executed, creating a Controller object in DiscoverResults for Controller 130, adding it to the lists, and calling the local agent to obtain type connections and attribute information. The manager does the same for Controller 131. B111 is then set to parsed. FIG. 20D shows the condition of the DiscoverResults lists after B111 has been parsed.

The manager then repeats this process in turn for the next two elements on UDL, B112 and B113. As in the earlier case of discovering buses, it is not necessary to execute step 1709 since the controller information (device type) has already been obtained. FIG. 20E shows the condition of the DiscoverResults lists after B113 has been parsed.

The manager then pops Controller 130 from the UDL, and parses C130. The LL_ListPrimaryConn call to the local agent returns the local host bus (B111) and the SSA bus formed by links 140, 143, 144 and 145. This SSA "bus", as previously explained, is a series of binary links. Each device on a bus contains a serial in-line controller chip having two ports to form the binary links. Storage devices contain a single such chip, while controllers typically contain two chips (4 ports) Controller 130 regards the SSA bus formed by links 140, 143, 144 and 145 as a single redundant bus because they form a loop from port 3, returning to port 4 (i.e., the two ports on the same serial in-line controller chip). By convention, an SSA bus is given an identifier derived from the storage device on the bus having the lowest-numbered identifier, this convention uniquely identifies any SSA bus, from any controller attached to the bus. For this reason, the SSA bus is designated "L120". FIG. 20F shows the condition of DiscoverResults after parsing Controller 130 (C130).

The manager repeats this process for Controller 131. In this case, the LL_ListPrimaryConn call to the local agent (step 1702) reports the same device bus L120. As a result, the "Yes" branch is taken from step 1706. In our example, we assume the controllers are "M" type adapters. Therefore, when the connected-to object being examined is L120, the "Yes" branch is taken from step 1712. The manager issues another LL_ListPrimaryConn call to the local agent in host 11, requesting all primary connections to device bus L120 (step 1713). Controller 131 is unable to determine the identity of other controllers on device bus L120. There is internal code in the local agent (described more fully above) to enable it to resolve the identities of controllers in its host 111, i.e., controllers 130 and 131. Therefore, the LL_ListPrimaryConn call to host 111 returns controllers 130 and 131, the ten disk storage devices, and two unknown devices (designated U1*a* and U1*b*). The unknown devices are in fact controllers 132 and 133, but the local agent in host 111 has no way of knowing their identities, and so reports them as unknowns. Upon receipt of this information, the manager creates the appropriate objects in DiscoverResults for all new devices and connections found, and adds them to the appropriate lists (step 1714). FIG. 20G shows the condition of DiscoverResults after parsing Controller 131. It will be noted that connection list 2016 contains no connections to controllers. 132 and 133, which at this point are unknown devices.

The manager repeats this process for the remaining two controllers. Again, the "Yes" branch is taken from step 1712, resulting in LL_ListPrimaryConn calls to hosts 112 and 113, requesting all connections to device bus L120. The disks are known, but these calls will find additional unknown devices, which are actually the controllers in the other hosts. Additionally, when calling host 112, it will be possible to identify the link between controller 132 and disk 124 as a known connection (and similarly for the link between controller 133 and disk 129 when calling host 113). These connection objects therefore are created and added to list 2016. FIG. 20H shows the condition of DiscoverResults after parsing the last controller, C133. Note that Connection objects for all device bus connections now appear on list 2016, except the link between controllers C132 and C133.

The manager then pops device bus L120 from the UDL and issues the LL_ListPrimaryConn command to the host where device bus L120 was first found, i.e., host 111. The local agent in host 111 returns a list containing the disks, controllers, and unknown devices representing controllers in other hosts. All of these devices are by now on the device list, so no further action is required. FIG. 20I shows the condition of DiscoverResults after parsing device bus L120.

The manager then pops D120 from the UDL. A disk storage device can be thought of as something at the end of the parsing chain; having parsed to this level, there can be nothing else below it. Accordingly, disks are regarded as unparsable objects. At step 1701, the "Yes" branch is taken, and D120 is set to "parsed" at step 1720.

The remaining devices are then popped from the UDL in turn. These devices are either disks or unknown devices, and are unparsable in either case. Therefore, "Yes" branch from step 1701 is taken in each case, and the device is marked as parsed. When the last device (U3*c*) is popped from the UDL and marked "parsed", the "Yes" branch is taken from step 1603, and the parsing operation terminates. The condition of DiscoverResults lists at the end of the parsing operation is shown in FIG. 20J.

Resolving Unknown Devices in the Manager.

If the parsing operation described above returned any devices of unknown type, then the manager attempts to resolve the unknown devices by comparing information received from different local agents in different hosts, as described below. In the example given above, several unknown devices were encountered, and the manager will therefore execute the resolution sequence.

Figure 18:
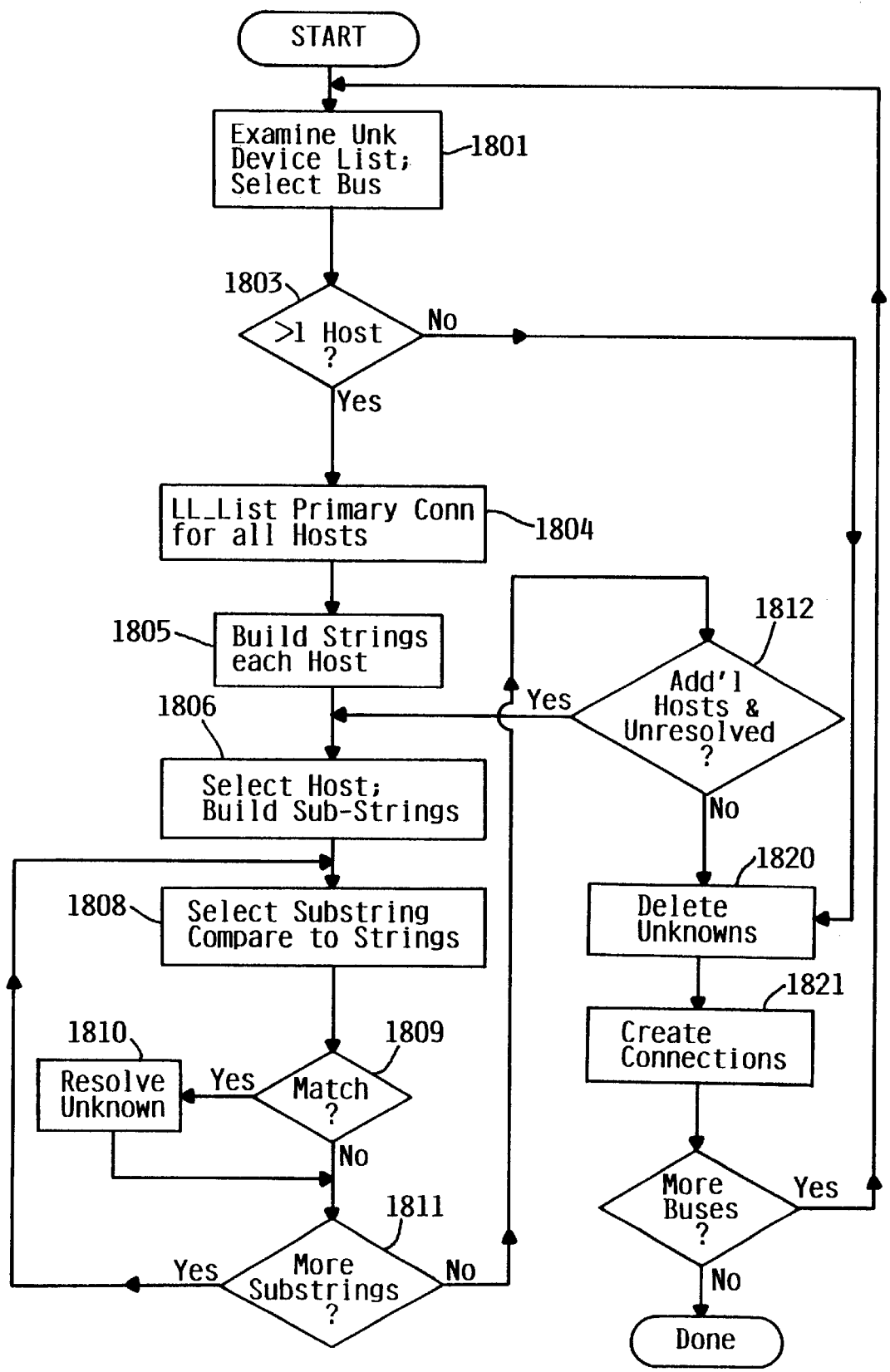
FIG. 18 is a flow diagram illustrating the process of resolving unknown network devices within the central manager, according to the preferred embodiment.

FIG. 18 is a flow diagram of the resolution process. The manager first examines the list of unknown device objects 2015 to determine which hosts reported unknown devices (and for which buses) during the parsing phase (step 1801). It then selects a bus for analysis. If there is only one host in the host list connected to the selected bus (step 1803), it will be impossible to further resolve the unknowns, and the resolution process goes to step 1820.

If multiple hosts are known, the manager issues the LL_ListPrimaryConn command to each host, requesting a listing of all devices on the selected bus (step 1804). Although the manager makes such a call previously during the parsing phase, it does not save all the information it receives from the local agent. Specifically, in response to a LL_ListPrimaryConn command, the local agent returns not only a listing of all devices on the bus, but returns connection detail information containing port numbers of each individual binary link, from which it is possible to ascertain the sequence of devices on the bus. This sequence information is necessary to resolving unknown devices. Therefore, in the resolution process, the manager must again retrieve the information.

From the connection detail information, the rnanager builds ordered lists (strings) of the devices on the selected bus as seen by each host (step 1805). These strings represent the actual physical sequence of devices connected by binary links as seen by a particular host, and therefore each string is associated with a host. The strings are built in the following manner. Starting from each port of a controller which is associated with the selected bus, the string sequence continues until it wraps around to the paired port of the same controller, or it reaches a terminal end with no further devices responding to a poll. Thus, each string begins with a controller. If the bus is a loop, there will be two strings created for each controller, one associated with each controller port (i.e., the strings traverse the bus in opposite directions). If the bus is a non-looped sequence (sometimes also called a string configuration, not to be conflised with ordered list strings), the two strings (ordered lists) from the two ports of the same controller will contain different devices.

The manager then selects one of the hosts on the selected bus, and builds sub-strings of all the strings associated with that host (step 1806). Sub-strings are formed in the same manner as strings, except that the starting point of all sub-strings is an unknown device. Where the bus is configured as a loop, a single "sub-string" is constructed from each string; this is not a true sub-string, since it contains all the elements of the original string, they being merely shifted. Where the bus is configured as a non-looped sequence (string configuration), two separate sub-strings are constructed from each unknown device on the string, each sub-string extending in opposite directions from the unknown device.

The manager then selects a sub-string constructed from the selected host, and compares it with all the strings (not sub-strings) of each host other than the selected host (step 1808). For purposes of making this comparison, all controller devices in the strings are treated as "unknowns", and any "unknown" matches any other "unknown" at the same string position. If any substring matches a string from another host, then the unknown device can be resolved. "Matching" means simply that there is a one-to-one correspondence between the sequential position and identifiers of the elements of the sub-string and string.

If a match was found (step 1809), an "unknown" device from the sub-string is resolved (step 1810). The string from the other host always begins with a known controller, i.e., it was physically in the other host, and therefore known to that host. The "unknown" device at the beginning of the sub-string must be this known device in the other host. This "unknown" is traced back to the original string in the selected host, which is updated with the identity of the now known controller. The process repeats until all sub-strings have been examined (step 1811).

If, after examining all the sub-strings in the selected host, there remain unresolved devices on the selected bus (step 1812), the process repeats for the other hosts until all hosts have been examined, or all devices on the selected bus resolved. In the case of a loop configuration, it should be possible to resolve all devices from the first selected host. In the case of some non-looped configurations, it is necessary to repeat the process for other hosts to obtain maximum device resolution. There are some configurations for which a complete resolution using this process is impossible. In these rare cases. unknown devices may remain at the end of this resolution process.

After all devices have been resolved (or all hosts examined in an attempt to resolve them), the manager deletes the resolved unknown device objects, removing them from device list 2001 (step 1820). The-manager then creates any additional required Connection objects (step 1821). Additional Connection objects may be required where unknown objects have been resolved, as e.g., two controllers of "M" type in different hosts which are directly connected by a single link. In this instance, no Connection object could have been created during the parsing operation because neither host had a complete picture of the link. Alternatively, additional Connection objects may be required where it is impossible to resolve unknown devices. In this case, the Connection object was not created earlier because it was not known whether it would be possible to resolve the device. If the resolution procedure has been completed and the devices remain of unknown type, a Connection object should be created linking the unknown device with another device on the bus, in order to generate as complete a representation of the configuration topology as possible. If there are additional buses to analyze (step 1822), the manager returns to step 1801. When all buses have been analyzed, the resolution process is complete.

The operation of this procedure on the example network of FIG. 1 will now be described. FIGS. 21A through 21C illustrates the strings and substrings created during resolution of the example network of FIG. 1. As shown in FIG. 20J, several unknown devices remain after parsing this example. The manager determines at step 1801 that a single bus contains multiple unknown devices, and at step 1803 that more than one host exist on this bus. At step 1804, the manager issues the LL_ListPrimaryConn command to all hosts, i.e., hosts 111, 112 and 113. At step 1805, the manager builds strings for each controller found in each host. These strings are shown in FIG. 21A. Strings 2101–2104 are constructed for host 111, strings 2105–2106 are for host 112, and strings 2107–2108 are for host 113.

The manager then selects a host and builds the "substrings" from the host's strings (step 1806), as shown in FIG. 21B. In this example, host 111 is selected. Substrings are built by selecting each string in turn and generating a new string by starting at each unknown device. In string 2101, there are two unknown devices. Substring 2111 is generated by starting with device U1$a$, and substring 2112 is generated by starting with device U1$b$. Because this strings represent loops, the substring wraps around the starting element of the original string. The manager continues by building substrings 2113 and 2114 from string 2102. The substrings constructed from the two remaining strings from host 111 are duplicates of 2111–2114.

The manager then selects substring 2111 and compares it with all strings from hosts other than host 111, i.e., strings 2105–2108. Upon making the comparison, the manager will find that substing 2111 matches string 2106. As a result, it is possible to resolve unknown devices U1$a$, U2$a$ and U2$b$. Substring 111 generated from host 111 placed unknown U1$a$ in the position matching controller C132 in string 2106, and therefore unknown device U1$a$ is resolved to controller C132. Unknowns U2$a$ and U2$b$ are similarly resolved to controllers C130 and C131, respectively.

The manager continues to compare the remaining substrings. Substring 2112 matches string 2108. As a result, unknown U1$b$ can be resolved to controller C133, and unknowns U3$b$ and U3$c$ can be resolved to controllers C130 and C131, respectively. The remaining substrings produced from host 111 can be matched to other strings, but they do not produce any additional resolved devices.

At this point, there remain additional unresolved devices (U2$c$ and U3$a$), and additional hosts (H112 and H113) for which substrings have not been built. The manager accordingly takes the "yes" branch from step 1812 and selects host H112. The substrings built from this host are shown in FIG. 21C.

The manager then compares the various substrings with strings. It will be observed that substing 2123 matches string 2107, and that it will therefore be possible to resolve unknowns U3a and U2c. Depending on the order of substring comparison, the manager may actually match other strings first.

Because all unknowns have now been resolved, the manager takes the "no" branch from step 1812. All unknown devices having been resolved, the corresponding unknown device objects are deleted (step 1820). The manager then creates any necessary connection objects (step 1821). In this case, only one additional connection object is required: the connection between two previously unknown devices in different hosts, i.e., between controllers C132 and C133. Because no single host previously had a complete view of this connection (every host's view had at least one unknown object), it had been impossible to define the connection, and no connection object was previously created. Note, however, that in the case of connections involving devices that were unknown to one host but known to another, it was previously possible to create a connection object from the information supplied by one of the hosts; in this case, it is merely necessary to delete the unknown device as duplicative. There being only one bus in this example (step 1822), the resolution process is complete.

For simplicity, the resolution of a single bus was described above. The process is essentially the same for multiple buses. In the case of multiple buses, there may be duplicated unknown objects representing, e.g., a 4-port controller having two ports on one bus and the remaining ports on a second bus. As in the case of a single bus, these unknowns are deleted once they are resolved to a known controller device.

In the example discover operation described above, all controllers were type "M" adapters, which have limited capability to determine the identity of other type "M" adapters on the same SSA bus. However, some controllers (type "F" adapters) have greater capability, and can in fact determine the identities of other adapters, including the host systems in which they reside. In this-case, it is possible that the discover operation will discover the identity of a host which is not in the original management set. If this happens, the discovered host is treated like any other discovered device, i.e., it is placed on device list 2001, UDL 2002, and ultimately parsed to discover all buses, controllers, etc., attached to it. Like any newly discovered device, the discovered host, and devices attached to it, will be added to the management set at the conclusion of the discover operation, as described below.

Finalizing the Discover Process

There are basically two avenues the final discover phase may take. One is for a discovery of a new management set, and the other is for a refresh discover operation on an existing management set.

In the case of a new management set, it is only necessary to create the appropriate network objects and link all components of a network to their respective network objects. A network object is defined by controllers. I.e., starting with a controller, the network includes all device buses to which the controller is attached, and all devices on those buses. If those devices include other controllers, it is necessary to iteratively repeat the process and include in the network all buses to which the other controllers are attached, and devices attached to those buses, until a closed set of devices and buses is determined. This set then constitutes a network. It is possible for multiple networks to exist within a single management set, so once one network has been determined, the above process repeats for all controllers not yet associated with a network, until all controllers in the management set have been associated with some network. At that point, the manager may clean up any unneeded data structures, such as the DiscoverResults object 1511.

Figure 19A:
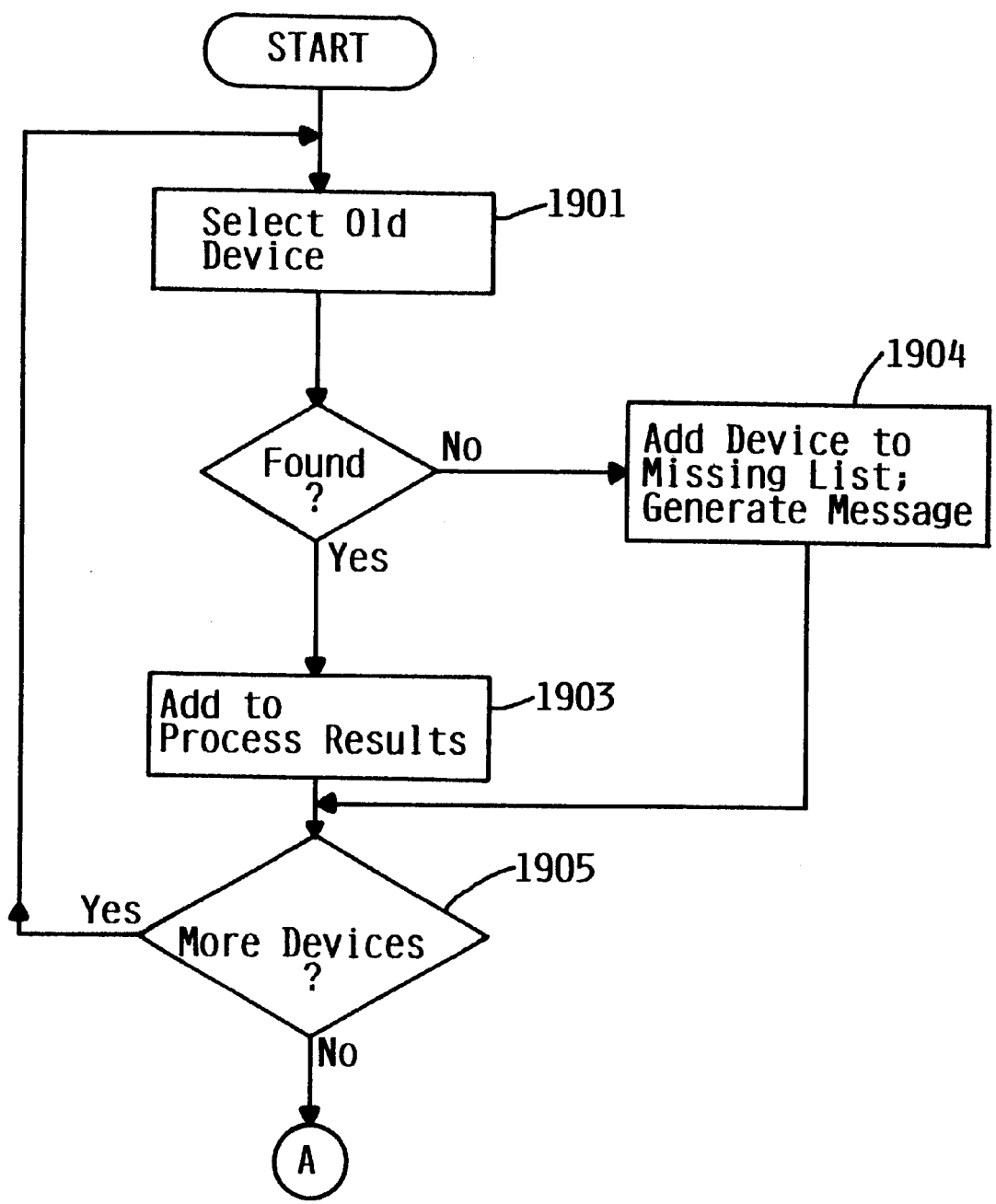
FIG. 19 is a flow diagram illustrating the process of resolving an existing management set with the results of a discover operation, according to the preferred embodiment.
Figure 19B:
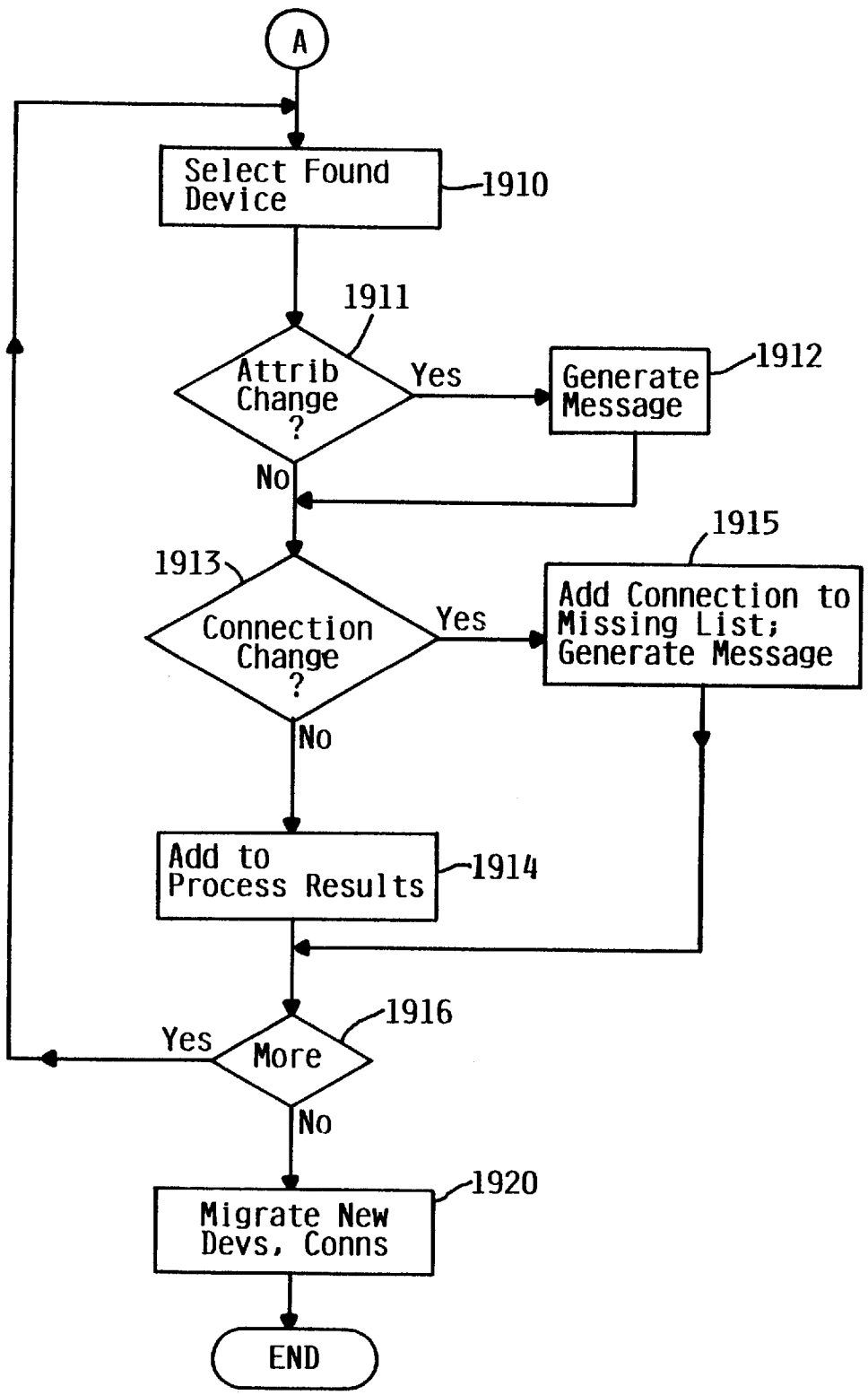

In the case of an existing management set, it is first necessary to compare the existing management set with the results of the discover operation. This process is depicted in FIG. 19.

The compare process involves a "shallow" compare, shown as blocks 1901–1905, and a "deep" compare, shown as blocks 1910–1916. The shallow compare selects in turn each old device in the management set for comparison (step 1901). If the selected device matches one of the found devices (step 1902), i.e., a device on device list 2001 in the DiscoverResults object 1511, then the newly found device object in device list 2001 is added to the collection of device objects in the ProcessResults object 1512 (step 1903). If no device in device list 2001 matches the selected device, the selected device is added to a list of "missing" devices (step 1904), each network object having an associated list of missing devices. Additionally, the connections and ports associated with the missing device are added to respective lists of missing connections and missing ports. A message is also generated to indicate that the device was not found. If there are more devices to compare (step 1905), the process repeats until all old devices have been examined.

The "deep" compare involves looking at device attributes and connections, but only for the old devices that were found in the shallow compare operation. This process selects a found device (step 1910), and compares the attributes previously recorded for the device with the attributes obtained during the discover operation (step 1911). If any attributes are different, a message is generated (step 1912). The manager then compares the connections associated with the selected device with connection objects associated with the corresponding device found in the discover operation (step 1913). If the connections are the same, the connection objects created in the discover operation (in DiscoverResults 1511) are also added to ProcessResults object 1512 (step 1914). If the connections are different, the old connections are added to the list of missing connections for the network, and an appropriate message is generated (step 1915). If there are more devices to compare (step 1916), the process repeats until all old found devices have been examined.

At this point, newly found devices and connections are migrated to the management set (step 1920). I.e., any device or connection in DiscoverResults which was not added to the ProcessResults collection as described above is a new device or connection, and the object representing the device or connection is migrated to the management set. The remaining objects in DiscoverResults are deleted, since these are duplicates of existing objects.

The manager then resolves the refreshed management set into networks. This is accomplished by disassociating all found devices from the old network object, and resolving the networks in exactly the same manner as a newly discovered management set. The old network objects are deleted and replaced by new network objects. In the case of "missing" devices (which can not be associated with networks as described above), these are associated with the new network object containing the bus to which the missing device was previously connected.

During the compare process, all old devices in a management set are compared. This includes devices in the missing device collections. Thus, it is possible for a device to become missing, and then reappear in a later discover operation. In this case, a device state variable is set to indicate the device is suspect, but it is otherwise treated as any other device.

VII. Miscellaneous Considerations

While storage management program 331 and agent 431 are shown in FIGS. 3 and 4 residing in a random access memory of a respective computer system, it will be understood that either or both such programs may be embodied as a sequence of processor-executable instructions stored on a computer readable medium, for sale or other distribution as a computer program product The medium may include, by way of example, a magnetic floppy disk, magnetic tape, CD-ROM disk, or other medium. Furthermore, storage management program 331 and/or agent 431 may be transmitted by electronic means, such as the Internet, for downloading into a memory or storage device of a respective computer system.

In the preferred embodiment, the agent is not a mere passive entity awaiting information requests, but contains an active network daemon portion which obtains information from attached networks, resolves incomplete information within its capabilities, and constructs a complex series of data structures representing the topology of the attached networks. These data structures are the primary source of information responsive to information requests, although the agent may obtain the information from other sources. However, the agent would not necessarily have to store information in anticipation of a request, and could generate all information only as requests for it are received.

In accordance with the preferred embodiment, the agent is part of a distributed storage management program for managing networks of storage devices. However, in alternative embodiments, the agent mechanism for responding to requests as described herein could be used in other environments. For example, a distributed monitoring program could be used for monitoring other entities, such as computer systems, manufacturing facilities, transportation facilities, etc. Alternatively, such an agent mechanism could be used to obtain information from a heterogeneous database or collection of databases. While requests are used in the preferred embodiment primarily to obtain information, requests can also be used to perform tasks.

Although a specific embodiment of the invention has been disclosed along with certain alternatives, it will be recognized by those skilled in the art that additional variations in form and detail may be made within the scope of the claims following the Appendix.

VII. Appendix

Appendix A: Attribute Derivations

The following tables are intended to show the derivation of every attribute StorX will display for Adapter, PhysicalDisk, LogicalDisk, Host, and Connection. Note the special markings in the bullets below that are also found in the table.

H—Attribute is Specific to a host Set by discover—may be a secondary algorithm to fill in all tle host specific attributes. The Local Library provides a special call—RDE_HostSpecific that returns all the fast host specific attributes.

M—Migrated from live to the planner if this attribute has a value, otherwise defaulted.

MC—Migrate if value does not conflict with a value already present in the Management Set, otherwise generated by StorX.

RO—Read Only.

Source—where the attribute comes from.

Destination—where the attribute is viewed.

A.1 Table of Adapter Attributes

| Adapter Attribute | Source Plan | Source Live | Destination Plan | Destination Live |
|---|---|---|---|---|
| Resource ID | MC | Local Library | Internal | Internal |
| Adapter Name | M | RDE_Name | Prop'ty window, Icon Text[2] | Prop'ty window, Icon Text[2] |
| Operating State | Set by StorX to a special value like "" | RDE_RealState | Adapter Icon | Property window, Adapter Icon[1] |
| DataBase State | Set by StorX to a special value | RDE_DbState | | Property Window |
| RAID Types Supported | Rules (RO) | RDE_Supported RAID | Property Window | Property Window |
| Adapter Type | Rules - user selectable (M) | RDE_Version | Prop'ty window, Icon Text[2] | Prop'ty window, Icon Text[2] |
| Adapter Types | Rules - user selectable | NA | Prop'ty window, Icon Text[2] | NA |
| Cache Size | Rules - user selectable - M | RDE_CacheSize | Property Window | Property Window |
| Cache Sizes | Rules - user selectable | NA | Property Window | Property Window |
| Max Port Speed | Rules (RO) | Rules (RO) | Property Window | Property Window |
| Host Name | User Input - select from list (M) | RDE_HostLabel | Property Window, Icon Text[2] | Property Window Icon Text[2] |
| Slot | M | hostbus->adaptr connection info | Property Window | Property Window |
| Long Descript'n for type | Rules (RO) | Rules (RO) | Property Window | Property Window |
| VPD | Blank | RDE_VPD | NA | Prop'ty window |

-continued

A.1 Table of Adapter Attributes

| Adapter Attribute | Source Plan | Source Live | Destination Plan | Destination Live |
|---|---|---|---|---|
| Standard Diag[3] | Disabled | Prop'ty window button (identify) | NA | RDE_StdDiagnostic |
| Error Log Analysis[3] | Disabled | Prop'ty window button (identify) | NA | RDE_Ela |
| Statistics - dropped from Release 1 | | | | |
| Error Log - dropped by StorX for Release 1 | | | | |
| All other attributes not previously listed | Disabled | Local Library | | Advanced page of property window |

[1]Adapter icon will change appearance to depict state.
[2]Can alternatively show up as the icon text. Example, when an adapter is highlighted all the physical disks that are part of that adapter change their icon text to their disk name relative to the host containing the highlighted adapter.
[3]Standard Diagnostics source and destination do not ideally fit the description given for each at the beginning of this section. Basically, for this item and others like it the source is a StorX button that causes the destination (attribute) to be set.

A.2 Table of PhysicalDisk Attributes

| Physical Disk Attribute | Source Plan | Source Live | Destination Plan | Destination Live |
|---|---|---|---|---|
| Resource ID | MC | Local Library | Internal | Internal |
| Disk Name | M | RDE_Name - H | Prop'ty window, Icon Text | Prop'ty window Icon Text |
| Label Id-unique | M | RDE_ExternalLabel | Prop'ty window, Icon Text | Prop'ty window, Icon Text |
| Location | user input - M | user input/ RDE_LocationString[1] - H | Property Window | Property Window |
| Operating State | Set by StorX to a special value | RDE_RealState | Disk Icon | Prop'ty window, Disk Icon[2] |
| DataBase State | Set by StorX to a special value | RDE_DbState - H | | Property window |
| Disk Type | Rules - user selectabte (M) | RDE_Version - set to 1 for all current disks. RDE_SizeInMbs | Property Window, Icon text | Property Window, Icon text |
| Disk Types | Rules - user selectable | NA | Property window | NA |
| Long Descript'n for Type | Rules (RO) | Rules (RO) | Property window | Property window |
| Disk Use | Rules (RO) - M | RDE_DiskUse | Prop'ty Window | Prop'ty Window |
| Disk Uses | Rules (RO) | NA | Prop'ty Window | NA |
| Disk Capacity | Rules (RO) - M | RDE_SizeInMbs | Prop'ty window, Icon text | Prop'ty window, Icon text |
| Max Port Speed | Rules (RO) - M | Rules (RO) | Prop'ty window | Prop'ty window |
| HostList - hosts that can access this disk | Client Library | Client Library | Property Window | Property Window |
| Serial Number | StorX generated - MC | RDE_SerialNumber | Prop'ty window, Icon text | Prop'ty window, Icon text |
| VPD | Blank | RDE_VPD | NA | Prop'ty Window |
| Flash Indicator | Disabled | Prop'ty window button (identify) | NA | RDE_Identify |
| Standard Diag | Disabled | Prop'ty window button (diagnos) | NA | DE_StdDiagnostic |
| Primary Adapter | M or Disabled | RDE_Primary Adapter | NA | Property Window |
| Statistics -- dropped from Release 1 | | | | |
| Error Log -- Dropped from Release 1 | | | | |
| All other attributes not previously listed | Disabled | Local Library | NA | Advanced page of property window |

[1]Local Library will massage the data written to this attribute to be OS specific. Storx will issue a getattr call after setting this attribute to display to the user the OS specific stored value.
[2]Will change appearance to depict state.

A.3 Table of Logical Disk Attributes

Logical Disk information cannot be imported into the planner from a live management set nor does the planner have the facilities to plan a logical disk.

| Logical Disk Attribute | Source Plan | Source Live | Destination Plan | Destination Live |
|---|---|---|---|---|
| Resource ID | MC | Local Library | Internal | Internal |
| Disk Name | | RDE_Name - H | | Property window |
| Location | | user input/RDE_LocationString | | Property window |
| Operating State | | RDE_RealState | | Property window |
| DataBase State | | RDE_DbState - H | | Property window |
| Disk Type (RAID Level) | | RDE_RaidLevel | | Property window |
| Disk Capacity | | RDE_SizeInMB | | Property window |
| HostList - hosts that can access this disk | | Client Library | | Property window |
| Serial Number | | RDE_SerialNumber | | Property window |
| Physical Volume ID[1] | | RDE_PVID | | Property window |
| Queue Depth | | RDE_QueueDepth - H | | Property Window |
| Reserve Lock | | RDE_ReserveLock - H | | Property Window |
| UnsyncedParity Strips | | RDE_UnsyncedParityStrips | | Property Window |
| Unbuilt Data Strips | | RDE_UnbuiltDataStrips | | Property Window |
| Hot Spare | | RDE_HotSpareEnabled | | Property Window |
| Percentage Rebuilt | | RDE_PercentageRebuilt | | Property Window |
| Page Split Enabled | | RDE_PageSplitEnabled | | Property Window |
| Volume group ID | | RDE_VGID | | Property Window |
| Volume group name | | RDE_VGName - H | | Property Window |
| Primary Adapter | | RDE_PrimaryAdapter | | Property Window |
| Accessable by adapters | | Client Library | | Property Window |
| PhysicalDisks contained | | Client Library | | Canvas, Property Window ListBox |
| Flash Indicators | | Property window button (identify) | | RDE_Identify on each Physical Disk |
| Error Log -- Dropped from Release 1 | | | | |

A.4 Table of Host Attributes

| Host Attribute | Source Plan | Source Live | Destination Plan | Destination Live |
|---|---|---|---|---|
| Resource ID | MC | Local Library | Internal | Internal |
| Host Name | User input - M | User input or RDE_HostLabel from adapter | Property Window | Property window |
| Operating State | Disabled | StorX enum | Disabled | Prop'ty window |
| OS Type (AIX,NT) | User input - M | RDE_Version or RDE_OsType | Property window | Property window |
| Operating Sys Level/Version | user input - M | RDE_OsLevel | Property window | Property window |
| Local Library Version | | RDE_AgentVersion | | Property window |
| Logical Disks | | Client Library | | Prop'ty window |
| Adapters | | Client Library | Prop'ty window | Prop'ty window |
| Error Log Analysis | | RDE_Ela | | Should be a button on Advanced page |
| Error Log -- Dropped from Release 1 | | | | |

A.5 Table of Connection Attributes

| Connection Attribute | Source | | Destination | |
| --- | --- | --- | --- | --- |
| | Plan | Live | Plan | Live |
| Legal Buses | M or equivalent of blank | RDE_Legal | Prop'ty window, Connection Icon | Prop'ty window, Connection Icon |
| Cable Type | Rules - user selectable (M) | Rules - user selectable | Property window | Property window |
| Cable Window | Rules - user selectable (M) | Rules - user selectable | Property window | Property window |
| Connection Name | User Input | User Input | Prop'ty window, Icon Text | Prop'ty window, Icon Text |
| Notes | User Input | User Input | Prop'ty window, StorX saved file | Prop'ty window, StorX Saved file |
| State | | RDE_Legal | | Prop'ty window, Icon |
| Device 1 Connection | Client Library | Client Library | Prop'ty window, Canvas | Prop'ty window, Canvas |

Appendix B: Management Set Save/Load File

B.1 Introduction

The objective of the Save operation is to store the appropriate information about a Management Set so that all of the objects needed for StorX to establish viewing and monitoring the storage networks in that Management Set can be reconstructed with the Load operation. The essential characteristics of the Management Set (storage network configurations, device states, etc.) are reproduced with the Load operation.

StorX internally represents Management Sets using c++ objects. Every object that needs to be saved is represented in a stanza in the output file. A stanza contains attributes for the object it represents. Included in the stanza is cross-referencing information so that object relationships can be recreated as well.

Although the Management Set is likely to contain information about multiple networks, all of the information collected in the Save operation is placed in one file. Management Sets saved in Plan mode must be of the form *.sps (Save Plan Set). Management Sets saved while running in Live mode must be of the form *.sls (Save Live Set).

Note: StorX can load Plan or Live Management Sets while in Plan mode, but can only load Live Management Sets while in Live mode.

When the Save operation is performed, the member data for each of the objects used to represent the Management Set is written out to the save file. Prior to outputting this member data, StorX assigns a unique identifier to each of the objects. This identifier is stored as the referenceId in the object's member data. If the member data for a particular object is a primitive data type such as an int or string, the value for that member data will be written to the file. If, however, the object being written contains other objects, then the referenceIds of those objects is listed.

Note: The Management Set file is locked during a Save or Load operation. This is to prevent a second application from attempting to use this file when it is in a transition state.

B.1.1 Save File Format:

Every StorX object that is to be saved to file will be written into a 'stanza'. Each stanza follows the general form:

{
object_type: xxx
Ref_Id: 5
primitiveVar1: 5
primitiveVar1: 6
ComplexVar1: 12, 24, 114, EndOfList,
}

The opening and closing braces signify the beginning and ending, respectively, of a stanza After the opening brace, every stanza has the keyword 'object_type' followed by a colon and the class of the object. The Load code will use this to determine which type of constructor to run to reconstruct this object The next line contains the keyword 'Ref_Id' followed by a colon. These are the only two keywords that are common to all stanzas. The next 3 lines in the example shown above are meant to show the general form of a stanza, the actual keywords used depends on the object type. If the meniber data being saved is a primitive type, such as an int or string, then the keyword will be followed by the actual value of the variable. If, however, the member data is another object, a reference to another object, a collection of other objects, or a collection of references to other objects, then the keyword will be followed by the referencelds of these objects.

Note: An exception has been made in some cases where the contained object is not referenced by any other object. For these cases the object is treated as complex member data.

After the Load operation has run the constructors on each of the stanzas, the list of referencelds will be used to resolve all object cross-referencing.

B.1.2 Validity Checking:

B.1.2.1 Checksum

The first entry in the save file is the checksum. It is written in the form:

{
checksum: nnnnnnnn
} where nnnnnnnn is the checksum for the file. When asked to load a particular Management Set file, StorX will first open the file and recalculate the checksum. If this does not match the value written at the top of the file a message box pops up to indicate that the file has been corrupted. The file will not be loaded.

Note: Although the file is written in ascii and is 'readable' from a text editor, any editing attempted on the file will render the file invalid unless care has been taken to update the checks Editing a Management Set file 'by hand' is NOT recommended.

B.1.2.2 Version Checking

If the checksum is valid, the next step the load operation takes is to check the version information of the Save file to determine if it is compatible with the currently running StorX. The version information is contained in an object of type VersionInfo. This is the first stanza following the cheeksum infonnation in the file:

{
object type: VersionInfo
iOSType: WIN95
iOSVersion: 1.0
iRuleVersion: 1.00
iLoadVersion: 1.0
iStorXVersion: Version 1.0.1
iNetMode: Real
}

StorX will not allow the Management Set to be loaded if the current operating system type and version do not match the values given for iOSType and iOSVersion. It also will not load the Management Set if the current iLoadVersion or iRuleVersion are less than the versions used for the Management Set being loaded.

The value for iNetMode will either be 'Real' or 'Plan'. 'Plan' indicates that this Management Set was generated in Plan mode. If this is a Live mode session of StorX, then a Plan mode Management Set cannot be loaded. If the iNetMode for the Management Set being loaded in is 'Real', the Management Set can be loaded in regardless of whether the current StorX session is Plan or Live.

B.1.2.3 Object Save Order

This section descnbes the order in which the stanzas are written. The basic order is:

version information
Client Library Objects
Viewer (GUI) Objects

In the preferred embodiment, the sequence listed below must be adhered to in order for the Load operation to work correctly. It is possible, however, for stanzas to be omitted if there are no objects of that type. Also note that the file begins with checksum information. This checksum must match the checksum for the file otherwise the load operation will not be performed.

Object Save Order:
  VersionInfo
  Canvas
  NetworkImages
    Enclosures
    Slots
    Aliases
    Resiliencies
    Hosts
    Network (This sequence—Network, Buses. Connections, etc. is repeated for every network.)
      Buses
      Connections
      IntControllers
      Aliases —Ports
      Unknowns
      Blanks
      Empties
      LogicalDisks
      LogicalConns
      PhysicalDisks
      Aliases
      Ports
  VNetwork
  VConnections
  VDevices (VAdapters & VDisks)
  Text
  Box
  VEnclosures

B.1.2.4 Member Data Saved For Each Object Type

| Keyword | MemberData | Actual Value or ReferenceId |
|---|---|---|
| *Alias Table* | | |
| iHost | iHost | Ref. Id |
| iCompared | iCompared | value |
| LLAttrs | iLLAttributes.saveYourself() | value (See AttributeRefColl table.) |
| *AttributeRefColl Table* | | |
| LLAttrscanvas->size().width() | numberOfElements() | value |
| name : class : value | name() : whatClassAmI() : AttrBool::attvalue | value |
| *Box Table* | | |
| iMaster | iMaster | Ref. Id |
| iGraphic.minX() | iBox.enclosingRect().minX() | value |
| iGraphic.minY() | iBox.enclosingRect().minY() | value |
| iGraphic.maxX() | iBox.enclosingRect().maxX() | value |
| iGraphic.maxY() | iBox.enclosingRect().maxY() | value |
| iGraphic.BlueMix() | iBox.GraphicBundle().fillColor().blueMix() | value |
| iGraphic.RedMix() | iBox.GraphicBundle().fillColor().redMix() | value |
| iGraphic.GreenMix() | iBox.GraphicBundle().fillColor().greenMix() | value |
| *Bus Table* | | |
| LLAttrs | iLLAttributes.saveYourself() | value (See AttributeRefColl table.) |

-continued

B.1.2.4 Member Data Saved For Each Object Type

| Keyword | MemberData | Actual Value or ReferenceId |
|---|---|---|
| DeviceState | DeviceState object | String "Dummy Data". |
| iRealState | iRealState(DevState member data) | value |
| iRealStateInitialized | iRealStateInitialized (DevState member data) | value |
| iNew | iNew (DevState member data) | value |
| iModifiedAttribute | iModifiedAttribute (DevState member data) | value |
| iSuspect | iSuspect (DevState member data) | value |
| iMissing | iMissing (DevState member data) | value |
| iConnections | iConnections | Ref. Id |
| iType | iType | value |
| iRidLength | iResourceId.Length() | value |
| iResourceId | iResourceId.resourceAsString() | value |
| iCompared | iCompared | value |
| iUniqueId | iUniqueId | value |
| iRule | runeName() | value |

Connect Table

| Keyword | MemberData | Actual Value or ReferenceId |
|---|---|---|
| ConnState | ConnState object | String "Dummy Data". |
| iNew | iNew (DevState member data) | value |
| iSuspeet | iSuspect (DevState member data) | value |
| iMissing | iMissing (DevState member data) | value |
| iPorts | iPorts | Ref. Id |
| iBus | iBus | Ref. Id |
| iNet | iNet | Ref. Id |
| iType | iType | value |
| iCompared | iCompared | value |
| iBackplane | iBackplane | value (Boolean) |
| iResliency | iResliency | value (Boolean) |
| iUniqueId | iUniqueId | value |

Host Table

| Keyword | MemberData | Actual Value or ReferenceId |
|---|---|---|
| LLAttrs | iLLAttributes.saveYourself() | value (See AttributeRefColl table.) |
| HostState | HostState | String "Dummy Data" |
| iNew | iNew (HostState member data) | value |
| iSuspect | iSuspect (HostState member data) | value |
| iMissing | iMissing (HostState member data) | value |
| iModified Attribute | iModifiedAttribute (HostState member data) | value |
| iControllers | iControllers | Ref. Id list |
| iHostName | not used | NA |
| iNet | iNet | Ref. Id |
| iType | iType | value |
| iCompared | iCompared | value |
| iDomainName | iDomainName | value |
| iShortName | iShortName | value |
| iIPAddress | iIPAddress | value |

IntController Table

| Keyword | MemberData | Actual Value or ReferenceId |
|---|---|---|
| LLAttrs | iLLAttributes.saveYourself() | value (See AttributeRefColl table.) |
| DeviceState | DeviceState | String "Dummy Data" |
| iRealState | | |
| iRealStateInitialized | | |
| iNew | iNew (HostState member data) | value |
| iSuspect | iSuspect (HostState member data) | value |
| iMissing | iMissing (HostState member data) | value |
| iModified Attribute | iModifiedAttribute (HostState member data) | value |
| iNet | iNet | Ref. Id |
| iDiscoverHost | iDiscoverHost | Ref. Id |
| iMissingPorts | iMissingPorts.NumberOfElements() | value |
| iPorts | iPorts | Ref. Ids |
| iLogicalDisks | iLogicalDisks | Ref. Ids |
| iHosts | iHosts | Ref. Ids |
| iAlias | iAlias | Ref. Id |
| iRidLength | iResourceId.length() | value |
| iResourceId | iResourceId.resourceAsString() | value |
| iSerialNumber | not used | NA |
| iSlot | iSlot | value |
| iType | not used | NA |
| iDbState | not used | NA |
| iRealState | not used | NA |

-continued

B.1.2.4 Member Data Saved For Each Object Type

| Keyword | MemberData | Actual Value or ReferenceId |
|---|---|---|
| iCache | not used | NA |
| iCompared | iCompared | value |
| iUniqueId | iUniqueId | value |
| iRule | ruleName() | value |

LogicalConn Table

| | | |
|---|---|---|
| LLAttrs | iLLAttributes.saveYourself() | value (See AttributeRefColl table.) |
| iHost | iHost | Ref. Ids |
| iController | iController | Ref. Id |
| iCost | iCost | value |
| iCompared | iCompared | value |

LogicalDisk Table

| | | |
|---|---|---|
| iNet | iNet | Ref. Id |
| iDiscoverHost | iDiscoverHost | Ref. Id |
| LLAttrs | iLLAttributes.saveYourself() | value (See AttributeRefColl table.) |
| DeviceState | DeviceState | String "Dummy Data" |
| iRealState | iRealState(DeviceState member data) | value |
| iRealStateInitialized | iRealStateInitialized(DeviceState member data) | value |
| iNew | iNew (DeviceState member data) | value |
| iSuspect | iSuspect (DeviceState member data) | value |
| iMissing | iMissing (DeviceState member data) | value |
| iModified Attribute | iModifiedAttribute (DeviceState member data) | value |
| iPrimaryController | iPrimaryController | Ref. Id |
| iLogicalConns | iLogicalConns | Ref. Ids |
| iPhysicalDisks | iPhysicalDisks | Ref. Ids |
| iRidLength | iResourceId.length() | value |
| iResourceId | iResourceId.resourceAsString() | value |
| iType | iTyped | value |
| iBlockSize | iBlockSize | value |
| iNumberOfBlocks | iNumberOfBlocks | value |
| iFastWrite | iFastWrite | value |
| iIdentify | iIdentify | value |
| iCompared | iCompared | value |
| iUniqueId | iUniqueId | value |
| iRule | ruleName() | value |

NetImages Table

| | | |
|---|---|---|
| iDrawers | iDrawers | Ref. Ids |
| iHosts | iHosts | Ref. Ids |
| iDefaultNetwork | iDefaultNetwork | Ref. Id |
| iNetworks | iNetworks | Ref. Ids |
| iMonitorList | iMonitorList | Ref. Ids |
| iMode | iMode | value |
| iName | iName | value |
| iDescription | iDescription | value (Note: "\r\n" changed to "^^".) |
| iPollingTime | iPollingTime | value |
| iAutoDiscoverOnLoad | iAutoDiscoverOnLoad | value |
| iAutoMonitor | iAutoMonitor | value |
| iDefaultDomain | iDefaultDomain | Ref. Id |
| iAdapterCount | iIdGenerator.adapterCount() | value |
| iDiskCount | iIdGenerator.diskCount() | value |
| iHostBusCount | iIdGenerator.HostBusCount() | value |
| iHostCount | iIdGenerator.HostCount() | value |
| iUnknownCount | iIdGenerator.UnknownCount() | value |
| iLogicalDiskCount | iIdGenerator.LogicalDiskCount() | value |
| iDeviceBusCount | iIdGenerator.DeviceBusCount() | value |
| iSwitchCount | iIdGenerator.switchCount() | value |
| iControllerCount | iIdGenerator.ControllerCount() | value |
| iHostCount | iIdGenerator.HostCount() | value |
| iNetworkCount | iIdGenerator.NetworkCount() | value |
| iDrawerCount | iIdGenerator.DrawerCount() | value |
| iAdapterUidCount | iIdGenerator.adapterUidCount() | value |
| iDiskUidCount | iIdGenerator.diskUidCount() | value |
| iHostBusUidCount | iIdGenerator.HostBusUidCount() | value |
| iHostUidCount | iIdGenerator.HostUidCount() | value |
| iUnknownUidCount | iIdGenerator.UnknownUidCount() | value |
| iLogicalDiskUidCount | iIdGenerator.LogicalDiskUidCount() | value |
| iDeviceBusUidCount | iIdGenerator.DeviceBusUidCount() | value |

-continued

B.1.2.4 Member Data Saved For Each Object Type

| Keyword | MemberData | Actual Value or ReferenceId |
|---|---|---|
| iSwitchUidCount | iIdGenerator.switchUidCount() | value |
| iControllerUidCount | iIdGenerator.ControllerUidCount() | value |
| iHostUidCount | iIdGenerator.HostUidCount() | value |
| iNetworkUidCount | iIdGenerator.NetworkUidCount() | value |
| iDrawerUidCount | iIdGenerator.DrawerUidCount() | value |
| iLastSaveTime | iDate::today() + ITime::now() | value |
| Network Table | | |
| iName | iName | value |
| iDescription | iDescription | value (Note: "\r\n" changed to "^^".) |
| iBuses | iBuses | Ref. Ids |
| iConnections | iConnections | Ref. Ids |
| iControllers | iControllers | Ref. Ids |
| iLogicalDisks | iLogicalDisks | Ref. Ids |
| iPhysicalDisks | iPhysicalDisks | Ref. Ids |
| iUnknowns | iUnknowns | Ref. Ids |
| iRule | ruleName() | value |
| iBlanks | iBlanks | value |
| iEmpties | iEmpties | value |
| iNetstate | iNetstate | value |
| PhysicalDisk Table | | |
| LLAttrs | iLLAttributes.saveYourself() | value (See AttributeRefColl table.) |
| DeviceState | DeviceState | String "Dummy Data" |
| iRealState | | |
| iRealStateInitialized | | |
| iNew | iNew (HostState member data) | value |
| iSuspect | iSuspect (HostState member data) | value |
| iMissing | iMissing (HostState member data) | value |
| iModified Attribute | iModifiedAttribute (HostState member data) | value |
| iNet | iNet | Ref. Id |
| iDiscoverHost | iDiscoverHost | Ref. Id |
| iMissingPorts | iMissingPorts.NumberOfElements() | value |
| iPorts | iPorts | Ref. Ids |
| iLogicalDisks | iLogicalDisks | Ref. Ids |
| iAlias | iAlias | Ref. Id |
| iRidLength | iResourceId.length() | value |
| iResourceId | iResourceId.resourceAsString() | value |
| iSerialNumber | not used | NA |
| iType | not used | NA |
| iUid | not used | NA |
| iRule | ruleName() | value |
| iSlot | iSlot | Ref. Id |
| Port Table | | |
| iType | iType | value |
| iPhysicalDevice | iPhysicalDevice | Ref Id |
| iConnection | iConnection | Ref. Id |
| iIdentifier | iIdentifier | value |
| iCompared | iCompared | value |
| iValidPortNumber | iValidPortNumber | value |
| Text Table | | |
| iMaster | iMaster | Ref. Id |
| iText | iText.text() | value |
| iText.position().coord1() | iText.position().coord1() | value |
| iText.position().coord2() | iText.position().coord2() | value |
| VAdapter Table | | |
| iAdapter | iAdapter | Ref. Id |
| iConnections | iConnections | Ref. Ids |
| iBitmap->position().coord1() | iBitmap->position().coord1() | value |
| iBitmap->position().coord2() | iBitmap->position().coord2() | value |
| iBitmap->size() | iBitmap->size().asString() | value |
| NetworkRefId | iAdapter->network() | Ref. Id |
| iDrawer | iDrawer | Ref. Id |
| iRolledUP | iRolledUP | value |
| UnknownDevice Table | | |
| LLAttrs | iLLAttributes.saveYourself() | value (See AttributeRefColl table.) |
| iNet | iNet | Ref. Id |

-continued

B.1.2.4 Member Data Saved For Each Object Type

| Keyword | MemberData | Actual Value or ReferenceId |
|---|---|---|
| iMissingPorts | iMissingPorts.numberOfElements() | value |
| iPorts | iPorts | Ref. Id |
| iRidLength | iResourceId.length() | value |
| iResourceId | iResourceId.resourceAsString() | value |
| iSerialNumber | not used | NA |
| iType | not used | NA |
| iName | not used | NA |
| iParsed | iParsed | value |
| iDbState | not used | NA |
| iUniqueId | iUniqueId | value |
| iSlot | iSlot | Ref. Id |
| VConnection Table | | |
| iConnection | iConnection | Ref. Id |
| iStart | iStart | Ref. Id |
| iEnd | iEnd | Ref. Id |
| iName | iName | value |
| iNotes | iNotes | value (Note: "\r\" changed to "^^".) |
| points | iLine.numberOfPoints() | value |
| iLine.point | iLine.point().x(),iLine.point().y() | value |
| NetworkRefId | iConnection->network() | Ref.Id |
| iRolledUP | iRolledUP | value |
| VDisk Table | | |
| iDisk | iDisk | Ref. Id |
| iConnections | iConnections | Ref. Ids |
| iBitmap->position().coord1() | iBitmap->position().coord1() | value |
| iBitmap->position().coord2() | iBitmap->position().coord2() | value |
| iBitmap->size() | iBitmap->size().asString() | value |
| NetworkRefId | iDisk->network() | Ref. Id |
| iDrawer | iDrawer | Ref Id |
| iRolledUP | iRolledUP | value |
| Version Table | | |
| iOsType | iOSType | value |
| iOSVersion | iOSVersion | value |
| iRuleVersion | iRuleVersion | value |
| iLoadVersion | iLoadVersion | value |
| iStorXVersion | iStorXVersion | value |
| iNetMode | iNetMode | value |
| VUnknown Table | | |
| iUnknown | iUnknown | Ref. Id |
| iConnections | iConnections | Ref. Ids |
| iBitmap->position().coord1() | iBitmap->position().coord1() | value |
| iBitmap->position().coord2() | iBitmap->position().coord2() | value |
| iBitmap->size() | iBitinap->size().asString() | value |
| NetworkRefId | iUnknown->network() | Ref. Id |
| iDrawer | iDrawer | Ref Id |
| iRolledUP | iRolledUP | value |
| VNetwork Table | | |
| canvas->size().width() | canvas->size().width() | value |
| canvas->size().height() | canvas->size().height() | value |
| iConnections | iConnections | Ref. Id |
| iBitmaps | iBitmaps | Ref. Id (with iBitmap->WhatAmI() prefix.) |
| iAnnotations | iAnnotations | Ref.Id ( with iAnnotation()->WhatAmI() prefix) |
| iEnclosures | iEnclosures | Ref. Id (with iEnclosures()->WhatAmI()prefix) |
| Drawer Table | | |
| LLAttrs | iLLAttributes.saveYourself() | value (See AttributeRefColl table.) |
| DeviceState | DeviceState | String "Dummy Data" |
| iRealState | | |
| iRealStateInitialized | | |
| iNew | iNew (DeviceState member data) | value |
| iSuspect | iSuspect (DeviceState member data) | value |
| iMissing | iMissing (DeviceState member data) | value |
| iModified Attribute | iModifiedAttribute (DeviceState member data) | value |
| iDiscoverHost | iDiscoverHost | Ref. Id |

-continued

B.1.2.4 Member Data Saved For Each Object Type

| Keyword | MemberData | Actual Value or ReferenceId |
|---|---|---|
| iSlots | iSlots | Ref. Ids |
| iAliases | iAliases | Ref. Ids |
| iResiliency | iResiliency | Ref. Ids |
| iRidLength | IResourceId.length() | value |
| iResourceId | iResourceId.resourceAsString() | value |
| iUniqueId | iUniqueId | value |
| iRule | ruleName() | value |
| iLocationString | iLocationString | value |
| | Slot Table | |
| iNumber | iNumber | value |
| iDrawer | iDrawer | Ref. Id |
| iPhysicalDevice | iPhysicalDevice | Ref. Id |
| | Blank Table | |
| LLAttrs | iLLAttributes.saveYourself() | value (See AttributeRefColl table.) |
| DeviceState | DeviceState | String "Dummy Data" |
| iRealState | | |
| iRealStateInitialized | | |
| iNew | iNew (DeviceState member data) | value |
| iSuspect | iSuspect (DeviceState member data) | value |
| iMissing | iMissing (DeviceState member data) | value |
| iModified Attribute | iModifiedAttribute (DeviceState member data) | value |
| iNet | iNet | Ref. Id |
| iDiscoverHost | iDiscoverHost | Ref. Id |
| iMissingPorts | iMissingPorts.NumberOfElements() | value |
| iports | iPorts | Ref. Ids |
| iRidLength | iResourceId.length() | value |
| iResourceId | iResoureeId.resourceAsString() | value |
| iSlot | iSlot | Ref. Id |
| | EmptyDevice Table | |
| LLAttrs | iLLAttributes.saveYourself() | value (See AttributeRefColl table.) |
| DeviceState | DeviceState | String "Dummy Data" |
| iRealState | | |
| iRealStateInitialized | | |
| iNew | iNew (DeviceState member data) | value |
| iSuspect | iSuspect (DeviceState member data) | value |
| iMissing | iMissing (DeviceState member data) | value |
| iModified Attribute | iModifiedAttribute (DeviceState member data) | value |
| iNet | iNet | Ref. Id |
| iDiscoverHost | iDiscoverHost | Ref. Id |
| iMissingPorts | iMissingPorts.NumberOfElements() | value |
| iPorts | iPorts | Ref. Ids |
| iRidLength | iResourceId.length() | value |
| iResourceId | iResourceId.resourceAsString() | value |
| iSlot | iSlot | Ref. Id |
| | Resiliency Table | |
| LLAttrs | iLLAttributes.saveYourself() | value (See AttributeRefColl tabte.) |
| DeviceState | DeviceState | String "Dummy Data" |
| iRealState | | |
| iRealStateInitialized | | |
| iNew | iNew (DeviceState member data) | value |
| iSuspect | iSuspect (DeviceState member data) | value |
| iMissing | iMissing (DeviceState member data) | value |
| iModified Attribute | iModifiedAttribute (DeviceState member data) | value |
| iSlots | iSlots | Ref. Ids |
| iPorts | iPorts | Ref. Ids |
| iDiscoverHost | iDiscoverHost | Ref. Id |
| iUniqueId | iUniqueId | value |
| iRidLength | iResourceId.length() | value |
| iResourceId | iResourceId.resourceAsString() | value |
| iConnection | iConnection | Ref. Id |
| iDrawer | iDrawer | Ref. Id |
| iStringRule | ruleName() | value |

-continued

B.1.2.4 Member Data Saved For Each Object Type

| Keyword | MemberData | Actual Value or ReferenceId |
|---|---|---|
| VDrawer Table | | |
| iDrawer | iDrawer | Ref. Id |
| iDevices | iDevices | Ref. Ids |
| iAssociatedAnnotations | iAssociatedAnnotations | Ref. Ids |
| iQuads | iQuads | Ref. Ids |
| iSplitIntoQuads | iSplitIntoQuads | value |
| iShowDrawer | iShowDrawer | value |
| iBitmap->position().coord1() | iBitmap->position().coord1() | value |
| iBitmap->position().coord2() | iBitmap->position().coord2() | value |
| iBitmap->size() | iBitmap->size().asString() | value |
| VQuad Table | | |
| iDrawer | iDrawer | Ref. Id |
| iAssociatedAnnotations | iAssociatedAnnotations | Ref. Ids |
| iSlots | iSlots | value |
| iBitmap->position().coord1() | iBitmap->position().coord1() | value |
| iBitmap->position().coord2() | iBitmap->position().coord2() | value |
| iBitmap->size() | iBitmap->size().asString() | value |
| iID | iID | value |
| VBlank Table | | |
| iBlank | iBlank | Ref. Id |
| iConnections | iConnections | Ref. Ids |
| iDrawer | iDrawer | Ref. Id |
| iBitmap->position().coord1() | iBitmap->position().coord1() | value |
| iBitmap->position().coord2() | iBitmap->position().coord2() | value |
| iBitmap->size() | iBitmap->size().asString() | value |
| NetworkRefId | iDisk->network() | Ref. Id |
| iRolledUP | iRolledUP | value |
| VEmpty Table | | |
| iEmpty | iEmpty | Ref. Id |
| iConnections | iConnections | Ref. Ids |
| iDrawer | iDrawer | Ref. Id |
| iBitmap->position().coord1() | iBitmap->position().coord1() | value |
| iBitmap->position().coord2() | iBitmap->position().coord2() | value |
| iBitmap->size() | iBitmap->size().asString() | value |
| NetworkRefId | iDisk->network() | Ref. Id |
| iRolledUP | iRolledUP | value |

Appendix C: Rules Format, Rules File

The rule file is processed by the StorX application program during the start-up. This file is used to create the rule objects. These objects provide the StorX application with the supported device types, attributes, and connection information. This appendix describes the rule file format.

C.1 Validity Rules

What is or is not a valid configuration will change as new devices and upgrades are announced. Therefore, instead of hardcoding a set of rules (which would require StorX to be recompiled for any changes) the validity rules will be in a rules file which is easily updated and maintained. The goals of the rules file are:

Identify the resource

Validate the resource

Provide additional information describing the resource

C.2 Methodology

The components of a network can be divided into the following categories:

Connections (Cables)—SSA cables connecting adapters to disks

Drawers—SSA enclosures for physical disk drives

PhysicalDisks—physical disk drives

Controllers—internal controllers (adapters) and external controllers

Hosts—computer systems that can execute the local agent

Buses—controller to physical disk connections

LogicalDisks—host logical volumes

Networks—all of the above components form a storage network

Enclosures—rack-mounted or free-standing enclosures that hold devices

The process of validating a network or component of the network is two-fold. The first step is to identify the component. This is achieved by comparing parameters of the component to rules listed in a rules file. The primary parameter that will be compared will be the connection information of the component to other components. In this context, connection refers to the relationship between the two components—such as a network is identified by the adapters in the network. The second step is validation which is achieved by comparing parameters of the component to the rules entry identified. Validating a component really amounts to validating the components part of the network. For example:

a portion of validating an adapter may consist of validating what type of buses are connected to the adapter and how they are connected.

C.3 Identification Order—Rule File Definition Guideline

The parameters that identify a component may contain information related to other components. For example: a bus is identified by the PhysicalDisks that it connects. This leads to the exposure of having loops in the definitions that can not be resolved. For maximum flexibility it is entirely left to the person writing the rules file to avoid loops in the definitions. To avoid this, the following process is suggested when writing the rules file:

Identifying which components may be used in the definition of other components before stating the rules definition, Generate a list or table describing the order Verify that all rules in the rules file adhere to the order specified For example:

Suppose that analysis of the requirements for the various components in a network resulted in the following definition orders:

A PhysicalDisk and Controller is defined by internal parameters of the device and does not depend on any other component in the network, A host system is identified by the adapters that are in the system, A Logical1isk is identified by the adapter that the LogicalDisk is configured on, A bus is identified by the PhysicalDisks that it connects together, A network is identified by the adapters it contains and the hosts the adapters are in.

The order dependency can be summarized in the following table, where the X's indicate that the row—component may use the column component as part of its identification.

|  | PDisk | Cntrl | Host | LDisk | Bus | Network |
|---|---|---|---|---|---|---|
| Drawers (Enclosures)a |  |  |  |  |  |  |
| Connections (Cables) |  |  |  |  |  |  |
| PhysicalDisk |  |  |  |  |  |  |
| Controller | X |  |  |  |  |  |
| Host | X | X |  |  |  |  |
| LogicalDisk | X | X | X |  |  |  |
| Bus | X | X | X | X |  |  |
| Network | X | X | X | X | X |  |

C.4 Definition of Information in the Rules File

C.4.1 Parameter Information

Identifying or validating a component may depend on parameters of the component. This is specified in the rules file in the IDparm or VALIDparm statement. Each statement will contain parameter information that is used to identify or validate the component. The format of the parameter information (parameterRule) is:

name[value]

name is the parameter name as returned by the Local Library.

value is the valid value or values that the parameter may have.

The value of the parameter specified in the parameter rule is compared to the component value returned by the Local Library in the format returned by the library. For example: if the local library returned a parameter as an INT, the value specified in the rule file would be converted to an INT and the values would be compared.

The value of the parameter may specify:

a specific value (1.95)

set of values (enabled, disabled)

a range of values (1.00–2.00)

may contain special characters (¦*TM¦?DCHC¦*)

or combination of the above (1,3,5–7,9)

Note: Special charaers are currently only supported for attributes returned from the local library as a DT_String or DT_VPD.

The rule may also specify more than one parameter requirement by using logical operators and parenthesis. The following logical operators, listed in order of precedence, are allowed:

and (&)

exclusive or (^)

inclusive or (|)

The associativity for grouping operands is left-to-right for all logical operators.

Parenthesis may be included in the rule definition to deviate from this behavior.

parameterRule1 & (parameterRule2|parameterRule3)

To satisfy the above rule definition one of the following must be true:

parameterRule1 and parameterRule2 are tue and parameterRule3 is false parameterRule1 and parameterRule3 are true and parameterRule2 is false parameterRule1, parameterRule2 and parameterRule3 are true A rule may contain one or more IDparm or VALIDparm statements. Each statement is evaluated separately and if satisfied will satisfy the parameter information for identification or validation.

C.4.1.1 Special Characters

The following table shows the special characters for the StorX rules:

| Character | Description |
|---|---|
| \? | Any character will match this position of the string |
| \* | Any character or group of characters will match this position of the string |
| \\ | A special designation for the back-slash character |

C.4.2 Connection Information

Identifying or validating a component may depend on other components in the network. This dependency is specified in the rules file in the IDconnection or VALIDconnection statement. Each statement will contain connection information that is used to identify or validate the component The format of the connection information (connectionRule) is:

name.object_count:class_count[specific_info]

name is the rule entry name specifying the component this object is connected to.

object_count is the valid number of connections to an individual object that matches the specified name.

class_count is the valid number of objects that match the specified name that the individual object may connect to.

specific_info is additional connection information that is specific to connections between the two components.

object_count and class_count are in the same format and may specify:

number (1)

set of numbers (1,3,5)

range (1–3)

or combination of the above (1,3,5–7,9)

Notes:
1. object_count identifies the number of connections to an individual object. If port 1&2 of an adapter are connected to a bus, the adapter connects to the bus twice and thus the object_count is 2.
2. class_count identifies the number of objects connected. If an adapter may connect to 2 separate buses, the class_count is 2. Zero (0) is a valid value and indicates that no connections to the object class exist.

The connection information specifies all of the connection information that is required to satisfy the parameter. Specifying a connection to a component in a category requires that all connections to components of that category must be specified. If no connections to a category are specified then connections to that category are ignored during identification and validation. The rule may also specify more than one connection requirement by using logical operators and parenthesis. The following logical operators, listed in order of precedence, are allowed:

and (&)

exclusive or (^)

inclusive or (|)

The associativity for grouping operands is left-to-right for all logical operators. Parenthesis may be included in the rule definition to deviate from this behavior.

connectionRule1 & (connectionRule2|connectionRule3)

To satisfy the above rule definition one of the following must be true:

connectionRule1 and connectionRule2 are true and connectionRule3 is false connectionRule1 and connectionRule3 are true and connectionRule2 is false connectionRule1, connectionRule2 and connectionRule3 are true Currently only two connections (connection from PhysicalDisk to Buses and Controller to Buses) contains additional specific information that describes the ports that are connected to the bus. The definition must specify the connection to all ports and any port not specified must not be connected to the object. Parenthesis and logical operators may be used in specifying which ports must be connected.

(port1 & port2)|(port2 & port3)51 (port1^port3)

To satisfy the above specific connection information the following must be true:

port1 and port2 are connected or port2 and port3 are connected or port1 is connected and port 3 is not connected or port1 is not connected and port3 is connected.

Multiple port definitions may also be defined in a single statement by separating them with commas. Each port definitions is evaluated separately and if satisfied will satisfy the requirement of the connection specific information.

port1 & port2, port3

Assuming the device has 3 ports, to satisfy the above specific connection information the following must be true:

port1 and port2 are connected and port3 is not connected or port3 is connected and port1 and port2 are not connected.

The connection information may be used for identifying the component or for validation of the component The keyword IDconnection is used to identify the connection information that is used to identify the component and VALIDconnection is used to identify the connection information that is to validate the component.

A rule may contain one or more IDconnection or VALIDconnection statements. Each statement is evaluated separately and if satisfied will satisfy the connection information for identification or validation.

See the connection definition section for a description of the meaning of each connection.

C.4.3 Class Information

The class information identifies wbicb objects in the Client Library will use this rule entry. This value is case sensitive.

class=value class is the keyword to identify the class information.

value is the class name

The following 7 class names are supported:

Connection (Cables)

PhysicalDisk

Controller

Host

Bus

LogicalDisk

Network

C.4.4 Name Information

The unique name of this rule file entry. This name is used by subsequent rule entries when identifying connection requirements. This value is case sensitive.

name=value name is the keyword to identi the name information.

value is the name. Multiple values are not supported.

For example:

A bus object is identified by the type of devices that it connects together. A bus rule would use the rule entry names of the devices it contains as part of its definition.

C.4.5 Alias Information

The alias information identifies a list of alternate names that components matching this rule may be also known as (a.k.a). Multiple names should be separated by commas. The alias names are case sensitive.

alias=value=1, value=2, . . . value=n alias is the keyword to identify the alias information.

value is the alias name.

For example:

A Host8 rule specifies that it may contain 1 to 8 ColonialAdapters.

The Mayflower8adapter and a Mayflower2adapter rules specify an alias of ColonialAdapter.

The Host8 connection would be satisfied by a Mayflower2adapter or a Mayflower8adapter.

C.4.6 Substitution Information

The substitution information identifies a list of alternate rule names that components matching this rule may substitute for.

substitute=value substitute is the keyword to identify the substitute information.

value is the name of the rule that a device of this type could substitute for.

For example:

A Mayflower2loop rule speies that it may contain 1 or 2 Mayflower2adapters.

The Mayflower8adapter rule specifies that it is substitutable for a Mayflower2adapter.

The Mayflower2loop would be satisfied by a Mayflower2adapter or a Mayflower8adapter.

The substitute name is only used when identifying which rule to apply if a direct match for the rule name is not found. For example:

A Fremont adapter rule specifies that it is substitutable for a Saratoga adapter.

A Host rule specifies that it is a SaratogaHost if it contains a Saratoga adapter.

With the above rules a host containing a Fremont adapter would be identified as a SaratogaHost. If the following rule is added:

A host rule that specifies it is a FremontHost if it contains a Fremont adapter

Then a host containing a FremontAdapter would be identified as a FremontHost.

Notes:
1. The easiest way to implement is to rely on rule order:
   Rules that use the rule name of other objects to identify which rule to apply need to list the more specific rule first in the rules file (FremontHost in this case) before the more generic rule (SaratogaHost in this case).
   This may be difficult to maintain since the ordered rule does not have a direct mentioning of the alias information
2. How far.should substitution go?
   If deviceA can substitute for deviceB and deviceB can substitute for deviceC, can deviceA substitute for device?
3. Does substitution need to include subparts?
   Fremont adapter may substitute for Saratoga adapter
   FremontDiskLoop contains fremont adapters
   SaratogaDiskLoop contains saratoga adapters
   SaratogaNet contains 2 Saratoga adapters and 1 or 2 SaratogaDiskLoops
   FremontNet contains 2 Fremont adapters and 1 FremontDiskLoops
   To match to a SaratogaNet with two disk loops need to:
   Attempt at FremontNet and fail since too many diskloops
   Substitute the Fremont for a Saratoga—becomes SaratogaDiskLoops and SaratogaNet.

C.4.7 Description Information

A short text description of the component that this rule is applied to. A rule of thumb is to limit this description to no more than 16 characters.

desc=value desc is the keyword to identify the description information.

value is the description text which should be limited to 16 characters.

C.4.8 Long Description Information

A lengthy text description of the component that this rule is applied to. The format for the long description is:

longDesc=value longDesc is the keyword to identify the long description information.

value is the long description text

C.4.9 Attribute Information

The attribute information is used to specify possible attributes and values for this device. The format of the attnbute information is:

attrib=type[value__1, value__2, . . . , value__n]

attrib is the keyword to identify the attribute information.

type is the attribute type defined by the Local Library.

value is the valid value or values that the parameter may have.

Multiple attribute information may be included Only one attnbute type line.

C.4.10 Ports Information

The ports information is used to specify the number of ports this device has. The format of the port information is:

ports=value ports is the keyword to identify the port information.

value is the integer number of ports.

C.4.11 Same Bus Information

The same bus information is used to specify the SIC chip port pairs. The format of this information is:

sBus=1 & 2, 3 & 4, intX & intY sBus is the keyword to identify the same bus information.

1 & 2 represents that ports 1 and 2 are on the same SIC chip.

3 & 4 represents that ports 3 and 4 are on the same SIC chip.

int__X & int__Y represents that ports int__X and int__Y are on the same SIC chip.

The current implementation only supports integer values for port numbers. The actual port names like A1 and A2 and B1 and B2 are not supported.

C.4.12 Max Port Speed

The max port speed information is used to specify the device port speed. The format of this information is:

maxPortSpeed=value maxPortSpeed is the keyword to identify the max port speed information.

value is a string value for the maim port speed. It should include units.

C.4.13 Valid Devices (drawers only)

Client library class name of the devices which may be placed into this drawer. The format of this information is:

validDevices=value validdevices is the keyword to identify the valid devices information.

value is a string value for the client library class name.

C.4.14 External Ports (drawers only)

This field is for identifying the port labels for each port. The format of this information is:

externalPorts=value__1 value__2 . . . value__n externalPorts is the keyword to identify the external ports.

value is a string value for the external port labels. There should be one value for each port.

C.4.15 Slot Positions (drawers only)

The slot positions provide the offset information for each slot when showing drawers.

The format of this information is:

slotPositions=value__1 value__2 . . . value__n slotPositions is the keyword to identify the slot position information.

value is a point value for the slot position. The format for a point value is (x,y)

C.4.16 Slots Per Quad (drawers only)

Slots within a quadrant The format of this information is:

slotsPerQuad=value__1–value__n value__2,value__3, value__4,value__5 slotsPerQuad is the keyword to identify the slots per quad information.

value is an int value which indicates the slot number, this can be specified as a range ordiscrete values separated by commas.

The first set of numbers or range is specified for the first quadrant, the second set for the second quad, etc.

C.4.17 Quad Positions (drawers only)

This field specifies the positions for the quads when quads are displayed on the canvas. The format of this information is:

quadPositions=value_1 value_2 . . . value_n quadpositions is the keyword to identify the quad position information.

value is a point value for the quad position. The format for a point value is (x,y).

C.4.18 Slots in Quad Position (drawers only)

This field specifies the offset of each slot when showing quads on the canvas. The format of this information is:

slotsInQuadPos=value_1 value_2 . . . value_n slotsInQuadPos is the keyword to identify the slots in quad position information.

value is a point value for the slot position within the quad. The format for a point value is (x,y).

C.4.19 Connections (drawers only)

This field is used to specify the internal drawer connections for port to slot and slot to slot connections. The format of this information is:

connections=value_1 value_2 . . . value_n connections is the keyword to identify the internal connection information.

value is a Connection Record value which represents the port to slot or slot to slot internal drawer connections. See C.4.22 "CRecord—Connection Record Format (drawers only)" below.

C.4.20 Resiliency (drawers only)

This field is used to specify the resiliency circuit infonnation. The format of this information is:

resiliency=value_1 value_2 . . . value_n resiliency is the keyword to identify the drawer resiliency information.

value is a Connection Record value which represents the resiliency circuit connection information. See C.4.22 "CRecord—Connection Record Format (drawers only)" below.

C.4.21 SES (drawers only)

This field indicates that the drawer is SES enabled. The format of this information is:

SES=value

SES is the keyword to identify the SES enabled information.

value is a int value for the SES enabled. SES=1 if enabled, 0 if not enabled.

C.4.22 CRecord—Connection Record Format (drawers only)

This is a complex data type for specifying drawer internal connection information. The format of this information is:

PortStart—PortEnd [,PortAdditional]

PortStart specifies the starting location of the internal drawer connection. See below for the format.

PortEnd specifies the ending location of the internal drawer connection. See below for the format.

PortAdditional specifies additional ports/slots connected for connections that connect more than 2 ports/slots. More than 1 PortAdditional can be specified.

For example a SCSI bus could connect multiple devices. See below for the format.

Format for a PortStart, PortEnd and PortAdditional:

value_1 value_2:value_3 value_1 specifies if this end of the connection is a external port or slot connection. Specify a P for an external enclosure port or S for an internal enclosure slot.

value_2 is a int value for the port id or slot id number.

value_3 is a int value for the port number within the slot (Specified for slots only. The colon is not necessary for drawer external port (P) connections.)

C.4.23 Adding Comments

There are 2 ways to designate comments in the rule file. The first is to start the line with a pound ('#') character. The entire line will be commented out. The second is to use the slash-slash ('//') characters. In this case all characters after the '//' to the end of the line will be considered comments.

this is not a comment // this is a comment this is a comment

C.5 Rules File Definitions

C.5.1 File Header Definition

| Label | Format | Description |
|---|---|---|
| version | String | Version of this rules file |

C.5.2 Abstract Definition

If a definition entry does not include any parameters other than the base parameters, the definition is an abstract definition.

| Label | Format | Description |
|---|---|---|
| class | String | Name of the Client Library class that will use this rule. |
| name | String | Name of this rule entry. |
| substitute | String | List of rule entry names that this rule is substitutable for. |
| desc | String | Short description |
| longDesc | String | Long description |

Abstract definitions are used in conjunction with the substitute parameter to allow easy expansion of the definitions.

Note: Specifying an abstract definition is completely optional. The substitute parameter does not need to specify an existing definition. The abstract definition is only required to allow adding descriptions of the substitutions.

For example:

An abstract definition of SSA_adapter is defined

The definition of Mayflower8adapter specifies that it is substitutable for SSA_adapter In subsequent rule entries, a Mayflower8adapter would satisfy entries that specified SSA_adapter.

C.5.3 Physical Disk Definition

The rules file is matched to a given physical device by comparing:

Client Library class name

Resource Type

Device Product ID uCode revision level

Connection information (optional)

The rule file will be used to verify the following parameters:

Connection information (optional)

The rules file must also contain:

Text Name

Text Descriptor

Text Long Descriptor number of ports same bus mapping attribute for size (RDE_SizeInMB)

The parameters of the rule file are:

| Use | Label | Format | Description |
|---|---|---|---|
| ID | class | PhysicalDisk | Client Library class name |
| ID | IDparm | Parameter info format | Specifies the parameters that are compared to identify this device |
| ID | IDconnection | Connection info format[1,2,3] | Specifies the connections that are compared to identify this device |
| Valid | VALIDparm | Parameter info format | Specifies the parameters that are compared to validate this device |
| Valid | VALIDconnection | Connection info format[1] | Specifies the connections that are compared to validate this device |
| Info | name | String | Name of the device |
| Info | alias | String [, String]* | Alternate names of the device |
| Info | substitute | String [, String]* | Alternate names of other devices that is device could substitute for |
| Info | desc | String | Short description of the device |
| Info | longDesc | String | Long description of the device |
| Info | attrib | RDE_SizeInMB[value] | Size attribute |
| Info | ports | int | Number of ports |
| Info | sBus | port [ & port ]* [,port [ & port ]*]* | Specifies which port connections are in the same bus. |
| Info | maxPortSpeed | String | The maximum port speed that this device supports |

[1]The connection specific information for connections from physicalDisks to buses must specify the port information.
[2]The connection information used for identification must not create a definition loop.
[3]The connection information may not specify a bus connection since this will create a definition loop with the sBus parameter.

EXAMPLE 1

```
{
    class = PhysicalDisk
    name = Scorpion1100
    alias = SsaDisk
    desc = SSA 1.1 GB
    longDesc = IBM Ultrastar 2 XP DCHC - 31100
    IDparm = type[RC_SSA-RT_PhysicalDisk] & prodID[3155] & uCode[1.45–1.47 | 1.50]
    attrib = RDE_SizeInMB[1100 MB]
    ports = 2
    sBus = 1&2
}
```

In the above example,

The rule is applied to objects instantiated from the Client Library PhysicalDisk class, The name of the rule is Scorpion1100, It is also know as a SsaDisk.

The description of the rule "SSA 1.1 GB",

The long description is "IBM Ultrastar 2 XP DCHC—31100"

It is identified by the type, productID and uCode levels.

No connection information has been specified.

The device has two ports,

Connections on port 1 and 2 are in the same bus.

C.5.4 Definition of Drawer Rule Entry

| Use | Label | Format | Description |
|---|---|---|---|
| ID | class | Drawer | Client Library class name |
| ID | IDparm | Parameter info format | Specifies the parameters that are compared to identify this device |
| ID | IDconnection | Connection info format[1] | Specifies the connections that are compared to identify this device |
| Valid | VALIDparm | Parameter info format | Specifies the parameters that are compared to validate this device |
| Valid | VALIDconnection | Connection info format | Specifies the connections that are compared to validate this device |
| Info | name | String | Name of the drawer |
| Info | alias | String [, String]* | Alternate names of the drawer |
| Info | substitute | String [, String]* | Alternate names of other devices that this drawer could substitute for |
| Info | desc | String | Short description of the deviee |
| Info | longDesc | String | Long description of the device |
| Info | attrib | attributeName[value] | Specifies an attribute value or set of values |
| Info | validDevices | className [className]* | Client Library class name of the devices which may be placed into this drawer |
| Info | externalPorts | String String* | Label for each drawer port |

-continued

| Use | Label | Format | Description |
| --- | --- | --- | --- |
| Info | slotPositions | Point | Offset for displaying state icon when showing drawers |
| | | Point Point* | Offset of each slot when showing drawers |
| Info | slotsPerQuad | Range or discrete values separated by commas | Slots within this quadrant |
| Info | QuadPositions | Point Point* | Offset for each quadrant when switch from Drawer to Quad |
| Info | SlotsInQuadPos | Point | Offset for displaying state icon when showing drawers |
| | | Point Point* | Offset of each slot when showing quadrants |
| Info | Connections | CRecord_1 CRecord_2 ... CRecord_n | Specification of the connections between ports and slots within the drawer. |
| Info | Resiliency | CRecord_1 CRecord_2 ... CRecord_n | Specification of each resiliency circuit |
| Info | SES | int | Indicates that the drawer is SES enabled. If true then this drawer can only be added via discovery. |

[1]The connection information used for identification must not create a definition loop.

C.5.4.1 Examples

C.5.4.1.1 Coral Drawer Specification

The following example is for the Coral Drawer:

```
{
class =         Drawer
name =          Coral_Drawer
desc =          Coral Drawer
longDesc =      This is a coral drawer
IDparm =        RDE_VPD[\*Coral\*]
validDevices =  PhysicalDisk Blank
externalPorts = J1 J4 J5 J8 J9 J12 J13 J16
slotPositions = (stateX,stateY) (s1X,s1Y) ... (s16X,s16Y)
slotsPerQuad =  1–4 5–8 9–12 13,14,15,16
quadPositions = (q1x,q1y) ... (q4x,q4y)
slotInQuadPos = (stateX,stateY) (s1X,s1Y) ... (s16X,s16Y)
Connections =   P1-S1:1 S1:2-S2:1 S2:2-S3:1 S3:2-S4:1 S4:2-P2
    P3-S5:1 S5:2-S6:1 S6:2-S7:1 S7:2-S8:1 S8:2-P4
    P5-S9:2 S9:1-S10:2 S10:1-S11:2 S11:1-S12:2 S12:1-P6
    P7-S13:2 S13:1-S14:2 S14:1-S15:2 S15:1-S16:2 S16:1-P8
Resiliency =    S1:1-S16:1 S4:2-S5:1 S8-2-S9:1 S12:1-S13:2
SESenabled =    1
}
```

C.5.5 Connection (Cables) Definition

The rules file is matched to a given Connection (Cable) by:

User selection

The rule file will be used to verify the following parameters:

Connection information (optional)

The rules file must also contain:

Text Name

Text Descriptor

Text Long Descriptor maxPortSpeed

The parameters of the rule file are:

| Use | Label | Format | Description |
| --- | --- | --- | --- |
| ID | class | Connection | Client Library class name |
| ID | IDparm | Parameter info format | Specifies the parameters that are compared to identify this device |
| ID | IDconnection | Connection info format[1] | Specifies the connections that are compared to identify this device |
| Valid | VALIDparm | Parameter info format | Specifies the parameters that are compared to validate this device |
| Valid | VALIDconnection | Connection info format | Specifies the connections that are compared to validate this device |
| Info | name | String | Name of the device |
| Info | alias | String [, String]* | Alternate names of the device |
| Info | substitute | String [, String]* | Alternate names of other devices that is device could substitute for |
| Info | desc | String | Short description of the device |
| Info | longDesc | String | Long description of the device |
| Info | attrib | RDE_SizeInMB[value] | Size attribute |
| Info | ports | int | Number of ports |

-continued

| Use | Label | Format | Description |
|---|---|---|---|
| Info | sBus | port [ & port ]* [,port [ & port ]*]* | Specifies which port connections are in the same bus. |
| Info | maxPortSpeed | String | The maximum port speed that this device supports |

[1]The connection information used for identification must not create a definition loop.

EXAMPLE 1

```
{
   class=Connection
   name=SSA5002
   desc=SSA 5002
   longDesc=0.18 meter SSA copper cable
   maxPortSpeed=20 MB/Sec
}
```

In the above example,
The rule is applied to objects instatitiated from the Client Library Connection class,
The name of the rule is SSA5002,
The description of the rule "SSA 5002",
The long description is "0.18 meter SSA copper cable" the maximnum port speed is 20 MB/Sec.

C.5.6 Controller Definition

The rules file is matched to a given Controller by comparing:
   Client Library class name
   Resource Type
   Device Product ID
   uCode revision level
   Connection information (optional)

The rule file will be used to verify the following parameters:

Connection information (optional)
The rules file will also contain:
Text Name
Text Short Descriptor
Text Long Descriptor
port to bus mapping
number of ports
attribute for RDE_CacheSize
attribute for RDE_SupportedRaid
The parameters of the rule file are:

| Use | Label | Format | Description |
|---|---|---|---|
| ID | class | Controller | Client Library class name |
| ID | IDparm | Parameter info format | Specifies the parameters that are compared to identify this device |
| ID | IDconnection | Connection info format[1,2,3] | Specifies the connections that are compared to identify this device |
| Valid | VALIDparm | Parameter info format | Specifies the parameters that are compared to validate this device |
| Valid | VALIDconnection | Connection info format[1] | Specifies the connections that are compared to validate this device |
| Info | name | String | Name of the device |
| Info | alias | String[,String]* | Alternate name for the device |
| Info | substitute | String [, String]* | Alternate names of other devices that this device could substitute for |
| Info | desc | String | Short description of the device |
| Info | longDesc | String | Long description of the device |
| Info | attrib | RDE_CacheSize[value_1, ... value_n] | Attribute for write cache size |
| Info | attrib | RDE_SupportedRaid [value_1, ...value_n] | Attribute for supported raid levels |
| Info | ports | int | Number of ports |
| Info | sBus | port [ & port ]* [, port [ & port ]* ]* | Specifies which port connections are in the same bus |
| Info | maxPortSpeed | String | The maximum port speed that this device supports |

[1]The connection specific information for connections from Controllers to buses must specify the port information.
[2]The connection information used for identification must not create a definition loop.
[3]The connection information may not specify a bus connection since this will create a definition loop with the sBus parameter.

EXAMPLE 1

```
{
   class=Controller
   name=May8Adap
   alias=ColonialAdap
   desc=6216 SSA 4 port
   longdesc=IBM 6216 Enhanced SSA adapter
   IDparm=type[RC_SSA-RT_Adapter] & prodID
      [3155] & uCode[1.45–1.47|1.50]
   VALIDconnection=HostLoop.2:1–2[1&2, 3&4]
   VALIDconnection=HostLoop.2:1[1&2, 3&4] &
      DiskLoop.2:1[1&2, 3&4]
``` attrib=RDE_CacheSize [none]
attrib=RDE_SupportedRaid[none]
ports=4
sBus=1&2, 3&4
}
In the above example, The rule is applied to objects instantiated from the Client Library Controller class, The name of the rule is May8Adap, A May8Adap adapter is also know as a ColonialAdap.

The description of the rule "6216 SSA 4 port",

The long description is "IBM 6216 Enhanced SSA adapter".

The rule is applied to Controller objects with a product ID of 3155 and a uCode level of 1.45–1.47 or 1.50. No connection information is used to identify the device, A 6216 adapter may be connected to one of the following:
  hostLoops (1 or 2)
  a hostLoop and a diskLoop, There is no fast write cache.

There are no supported raid levels.

The device has four ports,

Connections on port 1 and 2 are in the same bus and connections on port 3 and 4 are in the same bus.

EXAMPLE 2

Same rule as example 1 with the following exception:

VALIDconnection=HostLoop.2:1–2[1&2, 3&4]

VALIDconnection=HostLoop.2:1[1&2, 3&4] & DiskLioop.2:1[1&2, 3&4]

VALIDconnection=HostLoop.2:1[1&2, 3&4] & DiskString.1–2:1[1, 2, 1&2, 3, 4, 3&4]

In the above example,

A 6216 adapter must be connected to one of the following:
  hostLoops (2),
  a hostLoop and a diskLoop
a hostLoop and a diskString C.5.7 Host Definition The rules file is matched to a given host by comparing:

Client Library class name

Operating System

Operating System level

Connection information (optional)

The rules file will be used to verify the following parameters:

Connection information (optional)

The rules file will also contain:

Text Name

Text Descriptor

Text Long Descriptor

The parameters of the rule file are:

| Use | Label | Format | Description |
|---|---|---|---|
| ID | class | host | Client Library class name |
| ID | IDparm | Parameter info format | Specifies the parameters that are compared to identify this host |
| ID | IDconnection | Connection info format[1] | Specifies the connections that are compared to identify this host |
| Valid | VALIDparm | Parameter info format | Specifies the parameters that are compared to validate this host |
| Valid | VALIDconnection | Connection info format | Specifies the connections that are compared to validate this host |
| Info | name | String | Name of the host |
| Info | alias | String [,String]* | Alternate names for this host |
| Info | substitute | String [, String]* | Names of other hosts that this host could substitute for |
| Info | desc | String | Short description of the host |
| Info | longDesc | String | Long description of the host |

[1]The connection information used for identification must not form a definition dependency loop.

Each parameter must appear once and only once per entry in the rules file.

Example

{
  class=Host
  name=FremontHost
  substitute=
  desc=Host systemn containg a Fremont Adapter
  IDparm=os[AIX 4.1]
  IDconnection=Fremont.1:2[]
}

C.5.8 LogicalDisk Definition

The rules file is matched to a given LogicalDisk by comparing:

Client Library class name

Connections (optional)

The rules file will be used to verify the following parameters:

Connections (optional)

The rules file will also contain:

Text Name

Text Short Descriptor

Text Long Descriptor

The parameters of the rule file are:

| Use | Label | Format | Description |
|---|---|---|---|
| ID | class | logicalDisk | Client Library class name |
| ID | IDparm | Parameter information format | Specifies the parameters that are compared to identify this LogicalDisk |
| ID | IDconnection | Connection information format[1] | Specifies the connections that are compared to identify this LogicalDisk |
| Valid | VALIDparm | Parameter information format | Specifies the parameters that are compared to validate this LogicalDisk |
| Valid | VALIDconnection | Connection information format | Specifies the connections that are compared to validate this LogicalDisk |
| Info | name | String | Name of the LogicalDisk |
| Info | alias | String [,String]* | Alternate name for this logical disk |
| Info | substitute | String [, String]* | Names of logical disks that this logical disk could substitute for |
| Info | desc | MLE String | Short description of the LogicalDisk |
| Info | longDesc | String | Long description of the LogicalDisk |

[1]The connection information used for identification must not form a definition dependency loop.

EXAMPLE 1

{
  class=LogicalDisk
  name=FremontLogicalDisk
  desc=HDISK configured on a Fremont adapter
  IDconnection=Fremont.1:1[]
  VALIDconnection=FremontDiskBus.1.1[]
}

In the above example,

The rule is applied to objects instantiated from the Client Library logicalDisk class, The name of the rule is FremontLogicalDisk, There are no other rule entries that this LogicalDisk may substitute for.

The description of the rule "HDISK configured on a Fremont adapter",

The rule is applied to logicalDisk objects that are configured on a Fremont adapter, The pdisks that make up the LogicalDisk must all be connected to the same bus (The pdisks may NOT span buses).

EXAMPLE 2

{
  class=LogicalDisk
  name=SaratogaLogicalDisk
  desc=HDISK configured on a aratoga adapter
  IDconnection=Saratoga.1:1[]
  VALIDconnection=SaratogaDiskLoop.1.1–2[]
}

In the above example,

The rule is applied to objects instantiated from the Client Library logicalDisk class, The name of the rule is Saratoga LogicalDisk, There are no other rule entries that this LogicalDisk may substitute for.

The description of the rule "HDISK configured on a Saratoga adapter",

The rule is applied to logicalDisk objects that are configured on a Saratoga adapter, The pdisks that make up the LogicalDisk may be 1 or two buses (The pdisks may span buses).

C.5.9 Bus Definition

The rules file is matched to a given bus by comparing:

Client Library class name

Connections (optional)

The rules file will be used to verify the following parameters:

Connections (optional)

The rules file will also contain:

Text Name

Short Text Descriptor

Long Text Descriptor

The parameters of the rule file are:

| Use | Label | Format | Description |
|---|---|---|---|
| ID | class | bus | Client Library class name |
| ID | IDparm | Parameter info format | Specifies the parameters that are compared to identify this bus |
| ID | IDconnection | Connection info format[1] | Specifies the connections that are compared to identify this device |
| Valid | VALIDparm | Parameter info format | Specifies the parameters that are compared to validate this bus |
| Valid | VALIDconnection | Connection info format | Specifies the connections that are compared to validate this bus |

-continued

| Use | Label | Format | Description |
|---|---|---|---|
| Info | name | String | Name of the bus |
| Info | alias | String [,String]* | Alternate name for this bus |
| Info | substitute | String [, String]* | Names of buses that this bus could substitute for |
| Info | desc | MLE String | Short description of the bus |
| Info | longDesc | String | Long description of the bus |

[1]The connection information used for identification must not form a definition dependency loop.

Example

```
{
   class=Bus
   name=FremontDiskLoop
   desc=Loop containing Fremont Adapters and Disks
   IDconnection=Fremont.2:2[] & Disk.2:2[]
}
```

C.5.10 Network Definition

The rules file is matched to a given network by comparing:

Client Library class name

Contained adapter types (all adapterEntry entries satisfied)

Number of each adapter type (all adapterEntry entries satisfied)

The rules file will be used to verify the following parameters:

Number and type of adapters (by matching to rule)

Number and type of buses

Validating subcomponents

The rules file will also contain:

Text Name

Short Text Descriptor

Long Text Descriptor

The parameters of the rule file are:

```
   desc=Fremont 8-way network
   IDconnection=Fremont.1:1–8[]
   VALIDconnectionHostLoop.1:1–2   &
      DiskLoop.1:1–4[]
}
```

C.6 Connection Definitions

The following section describes the meaning of each component to component connection. Note that the connection meaning is different depending on the direction of the connection.

Note: An undefined connection cannot be specified in the rule file. Before a specific connection can be declared in the rule file, the connection meaning must be defined in this section.

C.6.1 PhysicalDisk Connections

C.6.1.1 PhysicalDisk to PhysicalDisk

A PhysicalDisk to PhysicalDisk connection specifies the connections from a physical disk to other physical disks. This is currently undefined.

C.6.1.2 PhysicalDisk to Controller

A PhysicalDisk to Controller connection specifies the connections from a physical disk to controllers. This is currently undefined.

C.6.1.3 PhysicalDisk to Host

A PhysicalDisk to Host connection specifies the connections from a physical disk to host objects. This is currently undefined.

| Use | Label | Format | Description |
|---|---|---|---|
| ID | class | network | Client Library class name |
| ID | IDparm | Parameter info format | Specifies the parameters that are compared to identify this network |
| ID | IDconnection | Connection info format[1] | Specifies the connections that are compared to identify this network |
| Valid | VALIDparm | Parameter info format | Specifies the parameters that are compared to validate this network |
| Valid | VALIDconnection | Connection info format | Specifies the connections that are compared to validate this network |
| Info | name | String | Name of the network |
| Info | alias | String [,String]* | Alternate name for this network |
| Info | substitute | String [, String]* | Names that this network could substitute for |
| Info | desc | String | Short description of the network |
| Info | longDesc | String | Long description of the network |

[1]The connection information used for identification must not form a definition dependency loop.

Example

```
{
   class=Network
   name=Fremont8wayNetwork
   substitute=
```

C.6.1.4 PhysicalDisk to Bus

A PhysicalDisk to Bus connection specifies the connection from a physical disk to the bus that contains the PhysicalDisks. This is currently undefined.

C.6.1.5 PhysicalDisk to LogicalDisk

A PhysicalDisk to LogicalDisk connection specifies the connection to the logical disk or logical disks referenced by the physical disk. This is currently undefined.

C.6.1.6 PhysicalDisk to Network

A PhysicalDisk., to Network connection specifies the connection to the network that contains the physical disk. This is currently undefined.

C.6.2 Controller Connections

C.6.2.1 Controller to PhysicalDisk

A Controller to PhysicalDisk connections specifies the connection to the physical disks that are in the same buses as the controller. This is currently undefined.

C.6.2.2 Controller to Controller

A Controller to Controller connections specifies the connection to the controllers that are in the same buses as the controller. This is currently undefined.

C.6.2.3 Controller to Host

A Controller to Host connections specifies the connection from the controller to the host that contains the controller. This is currently undefined.

C.6.2.4 Controller to Bus

A Controller to Bus connection specifies the connection from the controller to the buses that contains the controller. A Controller to Bus connection contains connection specific information which identifies the ports that must be connected to the bus.

- object_count: Number of references to a specific bus (bus referenced by connection that is referenced by the device).
- class_count: Number of buses of the type that are referenced by connection objects referenced by the device.
- specific info: specifies the device ports that must be connected to the bus (required)

C.6.2.5 Controller to LogicalDisk

A Controller to LogicalDisk connection specifies the connection to the LogicalDisk or LogicalDisks referenced by the controller. This is currently undefined.

C.6.2.6 Controller to Network

A Controller to Network connection specifies the connection to the network that contains the device. This is currently undefined.

C.6.3 Host Connections

C.6.3.1 Host to PhysicalDisk

A Host to PhysicalDisk connection specifies the connection from a Host to the devices that are in the same bus as the controllers that are contained in the host. This is currently undefined.

C.6.3.2 Host to Controller

A Host to Controller connection specifies the connection from a Host to the controllers that are in the host. This is typically used to make sure there are not too many adapters in a given host.

- objec1_count: Number of references to a specific controller (must be one).
- class_count: Number of different controllers of the type that are in the host.
- specific info: undefined.

C.6.3.3 Host to Host

A Host to Host connection specifies the connection from a host to the other hosts that are in the same network. This is currently undefined.

C.6.3.4 Host to Bus

A Host to Bus connection specifies the connection from a host to the bus or buses that contain the adapter or adapters that are in the host. This is currently undefined.

C.6.3.5 Host to LogicalDisk

A Host to LogicalDisk connecfion specifies the connection from a host to the logical disks that are configured on the adapters that are in the host. This is currently undefined.

C.6.3.6 Host to Network

A Host to Network connection specifies the connection from a host to the network or networks that the adapters in the host are in.

- object_count: Number of adapters in the host that are in a specific network.
- class_count: Number of different networks of the type that the host participates in.
- specific info: undefined.

C.6.4 Bus Connections

C.6.4.1 Bus to PhysicalDisk

A Bus to PhysicalDisk connection specifies the connections to the disks that are contained in the bus.

- object_count: Number of connections the bus has to a specific physical disk.
- class_count: Number of different disks of the type that the bus contains.
- specific info: undefined.

C.6.4.2 Bus to Controller

A Bus to Controller connection specifies the connections to the controllers that are contained in the bus.

- objec_count: Number of connections the bus has to a specific adapter.
- class_count: Number of different adapters of the type that the bus contains.
- specific info: undefined.

C.6.4.3 Bus to Host

A Bus to Host connection specifies the connection to the host or hosts that are referenced by the controllers that are in the bus. This is currently undefined.

C.6.4.4 Bus to Bus

A Bus to Bus connection specifies the connection to the other bus or buses in the same network. This is currently undefined C.6.4.5 Bus to LogicalDisk A Bus to LogicalDisk connection specifies the connection for the bus to the logical disks that are referenced by the controllers that are in the bus. This is currently undefined.

C.6.4.6 Bus to Network

A Bus to Network connection specifies the connection from the bus to the network that contains the bus. This is currently undefined.

C.6.5 LogicalDisk Connections

C.6.5.1 LogicalDisk to PhysicalDisk

A LogicalDisk to PhysicalDisk connection specifies the connection from the logical disk to the physical disks that make up the logical disk.

- object_count: Number of references the logical disk has to a specific physical disk.
- class_count: Number of different physical disks of the type that the logical disk references.
- specific info: undefined C.6.5.2 LogicalDisk to Controller A LogicalDisk to Controller connection specifies the connection from the logical disk to the controllers that are referenced by the logical disk

- object_count: Number of connections the logical disk has to a specific controller.
- class_count: Number of different controllers of the type that the logical disk contains.
- specific info: undefined.

C.6.5.3 LogicalDisk to Host

A LogicalDisk to Host connection specifies the connection from the logical disk to the host or hosts that are referenced by the controllers that are referenced by the logical disk. This is currently undefined.

C.6.5.4 LogicalDisk to Bus

A LogicalDisk to Bus connection specifies the connection from the logical disk to the bus or buses that contain the physical disks referenced by the logical disk. The connections to the bus are determined through the physical disks that the logical disk references.

> object_count: Number of connections the logical disk has to a specific bus.
>
> class_count: Number of different buses of the type that the logical disk contains.
>
> specific info: undefined.

C.6.5.5 LogicalDisk to LogicaDisk

A LogicalDisk to LogicalDisk connection specifies the connection from the logical disk to the other logical disks in the network This is currently undefined.

C.6.5.6 LogicalDisk to Network

A LogicalDisk to Network connection specifies the connection from the logical disk to the network that contains the logical disk This is currently undefined.

C.6.6 Network Connections

C.6.6.1 Network to PhysicalDisk

A Network to PhysicalDisk connection specifies the connection from a network to the physical disks contained in the network. This is currently undefined.

C.6.6.2 Network to Controller

A Network to Controller connection specifies the connection from a network to the controllers contained in the network.

> object_count: Number of connections the network has to a specific controller.
>
> class_count: Number of different controllers of the type that the network contains.
>
> specific info: undefined.

C.6.6.3 Network to Host

A Network to Host connection specifies the connection from a network to the hosts contained in the network.

> object_count: Number of connections the network has to a specific host.
>
> class_count: Number of different hosts of the type that the network contains.
>
> specific info: undefined.

C.6.6.4 Network to Bus

A Network to Bus connection specifies the connection from a network to the buses contained in the network.

> object_count: Number of connections the network has to a specific bus.
>
> class_count: Number of different buses of the type that the network contains.
>
> specific info: undefined.

C.6.6.5 Network to LogicalDisk

A Network to LogicalDisk connection specifies the connection from a network to the logical disks contained in the network. This is currently undefined.

C.6.6.6 Network to Network

A Network to Network connection specifies the other networks that contain the host or host systems that are in the network. This is currently undefined.

We claim:

1. A method for providing information from a local agent, said method comprising the steps of:

(a) receiving an information request from a remote requester attached to an information processing network, said information request containing a plurality of parameters;

(b) constructing a hash key from said plurality of parameters;

(c) using said hash key to access an entry in a hash function table, said hash function table containing a plurality of entries, each said entry containing a respective function pointer to a corresponding one of a plurality of functions which is invoked to obtain information responsive to said information request;

(d) executing a function identified by said function pointer to obtain information responsive to said information request; and (e) transmitting said information responsive to said information request to said requester via said information processing network.

2. The method for providing information from a local agent of claim 1, wherein said information request contains at least one wild card parameter, said method further comprising the steps of:

accessing an entry in a wild card parameter table, said entry specifying a plurality of parameter values associated with said wild card parameter, constructing a plurality of expanded information requests, each request of said plurality of expanded information requests corresponding to a respective one of said plurality of parameter values associated with said wild card parameter; and performing steps (b) through (d) for each of said plurality of expanded information requests, each respective hash key constructed from a plurality of parameters being constructed using the respective one of said plurality of parameter values associated with said wild card parameter.

3. The method for providing information from a local agent of claim 1, further comprising the steps of:

constructing a structured data representation of an entity to be monitored, said structured data representation comprising a plurality of records, said records being linked in a relationship corresponding to a configuration of said entity to be monitored; and accessing said structured data representation to obtain information responsive to said request.

4. The method for providing information from a local agent of claim 3, wherein said entity to be monitored is a storage network comprising a plurality of data storage devices, there being at least one said record corresponding to each respective data storage device.

5. The method for providing information from a local agent of claim 1, wherein said information request contains one of a set of commands, said set comprising a plurality of types of commands, and wherein said step of using said hash key to access an entry in a hash function table comprises:

(i) selecting a first hash function table from a plurality of hash function tables, said selection being dependent on the type of command contained in said information request; and (ii) using said hash key to access an entry in said first hash function table.

6. The method for providing information from a local agent of claim 5, wherein said set of commands contains a first command having a first number of parameters and a second command having a second number of parameters, said first number being different from said second number.

7. The method for providing information from a local agent of claim 5, wherein a first hash key function is used to construct a hash key for accessing an entry in said first hash function table, and a second hash key function is used to construct a hash key for accessing an entry in a second hash function table, said first and second hash key functions being different.

8. A computer program product for providing information from a local agent, said computer program product including a plurality of computer executable instructions stored on a computer readable medium, wherein said instructions, when executed by said computer, cause the computer to perform the steps of:

(a) receiving an information request from a remote requester attached to an information processing network, said information request containing a plurality of parameters;

(b) constructing a hash key from said plurality of parameters;

(c) using said hash key to access an entry in a hash function table, said hash function table containing a plurality of entries, each said entry containing a respective function pointer to a corresponding one of a plurality of functions which is invoked to obtain information responsive to said information request;

(d) executing a function identified by said function pointer to obtain information responsive to said information request; and (e) transmitting said information responsive to said information request to said requester via said information processing network.

9. The computer program product of claim 8, wherein said information request contains at least one wild card parameter, and wherein said instructions, when executed by said computer, further cause the computer to perform the steps of:

accessing an entry in a wild card parameter table, said entry specifying a plurality of parameter values associated with said wild card parameter;

constructing a plurality of expanded information requests, each request of said plurality of expanded information requests corresponding to a respective one of said plurality of parameter values associated with said wild card parameter; and performing steps (b) through (d) for each of said plurality of expanded information requests, each respective hash key constructed from a plurality of parameters being constructed using the respective one of said plurality of parameter values associated with said wild card parameter.

10. The computer program product of claim 8, wherein said instructions, when executed by said computer, further cause the computer to perform the step of:

constructing a structured data representation of an entity to be monitored, said structured data representation comprising a plurality of records, said records being linked in a relationship corresponding to a configuration of said entity to be monitored; and accessing said structured data representation to obtain information responsive to said request.

11. The computer program product of claim 10, wherein said entity to be monitored is a storage network comprising a plurality of data storage devices, there being at least one said record corresponding to each respective data storage device.

12. The computer program product of claim 8, wherein said information request contains one of a set of commands, said set comprising a plurality of types of commands, and wherein said step of using said hash key to access an entry in a hash function table comprises:

(i) selecting a first hash function table from a plurality of hash function tables, said selection being dependent on the type of command contained in said information request; and (ii) using said hash key to access an entry in said first hash function table.

13. The computer program product of claim 12, wherein said set of commands contains a first command having a first number of parameters and a second command having a second number of parameters, said first number being different from said second number.

14. The computer program product of claim 12, wherein a first hash key function is used to construct a hash key for accessing an entry in said first hash function table, and a second hash key function is used to construct a hash key for accessing an entry in a second hash function table, said first and second hash key functions being different.

15. A method for servicing a remote request in a computer system, comprising the steps of:

(a) receiving a request from a remote requester attached to an information processing network, said request containing a plurality of parameters;

(b) constructing a hash key from said plurality of parameters;

(c) using said hash key to access an entry in a hash function table, said hash function table containing a plurality of entries each said entry containing a respective function pointer to a corresponding one of a plurality of functions which is invoked to obtain information responsive to said information request; and (d) executing a function identified by said function pointer to service said request.

* * * * *